(12) United States Patent
Lee

(10) Patent No.: US 12,059,939 B2
(45) Date of Patent: Aug. 13, 2024

(54) CORNER MODULE APPARATUS FOR VEHICLE

(71) Applicant: HYUNDAI MOBIS CO., LTD., Seoul (KR)

(72) Inventor: Tae Heon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/872,578

(22) Filed: Jul. 25, 2022

(65) Prior Publication Data

US 2023/0219389 A1  Jul. 13, 2023

(30) Foreign Application Priority Data

Jan. 10, 2022 (KR) .................. 10-2022-0003283
Jan. 18, 2022 (KR) .................. 10-2022-0007102

(51) Int. Cl.
*B60K 7/00* (2006.01)
*B60G 3/28* (2006.01)
*B60K 17/30* (2006.01)

(52) U.S. Cl.
CPC ............ *B60G 3/285* (2013.01); *B60K 7/0007* (2013.01); *B60K 17/30* (2013.01); *B60G 2200/422* (2013.01); *B60G 2200/44* (2013.01); *B60G 2200/46* (2013.01); *B60G 2300/50* (2013.01)

(58) Field of Classification Search
CPC ........ B60G 2200/422; B60G 2200/462; B60G 2200/46; B60G 3/285; B60K 17/30
See application file for complete search history.

(56) References Cited

U.S. PATENT DOCUMENTS

| 6,293,561 B1 * | 9/2001 | Goetzen ................ B62D 17/00 |
| | | 280/86.757 |
| 6,336,514 B1 | 1/2002 | Ramacher et al. |
| 10,940,730 B2 * | 3/2021 | Kishida .................... B60G 3/18 |
| 11,267,283 B2 * | 3/2022 | Hsu .................... B60G 17/0157 |
| 2003/0111812 A1 | 6/2003 | Carlstedt et al. |
| 2020/0070891 A1 | 3/2020 | Gunji et al. |

(Continued)

FOREIGN PATENT DOCUMENTS

| CN | 102358121 A * | 2/2012 | .............. B60G 3/26 |
| CN | 107187496 A * | 9/2017 | |

(Continued)

OTHER PUBLICATIONS

CN 107187496 A machine translation from espacenet.com Feb (Year: 2023).*

(Continued)

*Primary Examiner* — Amy R Weisberg
*Assistant Examiner* — Maxwell L Meshaka
(74) *Attorney, Agent, or Firm* — NSIP Law

(57) ABSTRACT

A corner module apparatus for a vehicle includes a driving unit configured to provide driving power to a wheel of the vehicle; a braking unit, coupled with the driving unit, configured to apply or release braking power; an upper arm module, connected to the driving unit, adjustable to vary a camber angle of the wheel; a lower arm module, connected to the driving unit, configured to absorb road surface impact while the vehicle moves; and a steering unit configured to support the upper arm module and the lower arm module, and adjust a steering angle of the wheel.

14 Claims, 58 Drawing Sheets

(56) References Cited

U.S. PATENT DOCUMENTS

| | | | | |
|---|---|---|---|---|
| 2020/0316987 A1* | 10/2020 | Hsu | ........................ | B60K 17/26 |
| 2022/0048316 A1* | 2/2022 | Hsu | ..................... | B60B 33/0039 |
| 2022/0048568 A1* | 2/2022 | Fischer | ................. | B60G 7/008 |
| 2022/0144030 A1* | 5/2022 | Ameye | .................. | B60G 13/14 |
| 2022/0185096 A1* | 6/2022 | Ameye | ................ | B62D 5/0418 |
| 2022/0339963 A2* | 10/2022 | Hsu | .................... | B60G 17/0157 |

FOREIGN PATENT DOCUMENTS

| | | | |
|---|---|---|---|
| EP | 4086090 A1 * | 11/2022 | |
| GB | 2582640 A | 9/2020 | |
| KR | 10-2019-0041855 A | 4/2019 | |
| WO | WO 2020/201984 A1 | 10/2020 | |

OTHER PUBLICATIONS

Extended European search report issued on Nov. 11, 2022, in counterpart European Patent Application No. 22179532.1 (9 pages in English).

Korean Office Action issued on Nov. 29, 2023, in counterpart Korean Patent Application No. 10-2022-0003283 (3 pages in Korean).

* cited by examiner

CORNER MODULE APPARATUS FOR VEHICLE

CROSS-REFERENCE TO RELATED APPLICATIONS

This application claims the benefit under 35 USC 119(a) of Korean Patent Application Nos. 10-2022-0003283 and 10-2022-0007102, filed on Jan. 10, 2022 and Jan. 18, 2022, respectively, in the Korean Intellectual Property Office, the entire disclosures of which are incorporated herein by reference for all purposes.

BACKGROUND

Field

The present disclosure relates to a corner module apparatus for a vehicle, and more particularly, to a corner module apparatus for a vehicle in which driving, braking, steering, and suspension systems are integrated.

Discussion of the Background

In general, an electric vehicle refers to an eco-friendly vehicle devoid of the discharge of exhaust gas. A high-voltage battery for supplying energy for driving, a motor for driving for generating rotatory power from power outputted by the high-voltage battery, etc. are mounted on the electric vehicle. The electric vehicle is driven by the rotation power of the motor being delivered to wheels through a driving shaft.

Recently, an in-wheel motor vehicle in which a motor is directly installed inside a wheel so that power of the motor is directly delivered to the wheel by taking into consideration advantages in which weight of the vehicle can be reduced and an energy loss in a power transfer process can be reduced has been in the spotlight because a power transfer unit of an intermediate stage, such as a decelerator or a differential gear, has been can be omitted. Furthermore, a wheel in which braking, steering, and suspension systems are integrated in addition to a driving system is also being actively developed.

The background technology of the present disclosure is disclosed in Korean Patent "STEERING SYSTEM FOR IN-WHEEL MOTOR VEHICLE."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a corner module apparatus for a vehicle includes a driving unit configured to provide driving power to a wheel of the vehicle; a braking unit, coupled with the driving unit, configured to apply or release braking power; an upper arm module, connected to the driving unit, adjustable to vary a camber angle of the wheel; a lower arm module, connected to the driving unit, configured to absorb road surface impact while the vehicle moves; and a steering unit configured to support the upper arm module and the lower arm module, and adjust a steering angle of the wheel.

The upper arm module, connected to an upper side of the driving unit, may have a variable length in a width direction of the vehicle and configured to adjust an inclination of the wheel relative to ground.

The upper arm module may include a first upper bracket rotatably connected to the driving unit; a second upper bracket, rotatably connected to the steering unit, spaced apart from the first upper bracket; an upper link unit, disposed between the first upper bracket and the second upper bracket, configured to have an adjustable internal angle; and a first driving module, disposed between the first upper bracket and the second upper bracket, configured to vary a relative distance between the first upper bracket and the second upper bracket by adjusting the adjustable internal angle of the upper link unit.

The upper link unit may include a pair of first upper links having first ends rotatably connected to the first upper bracket, and a pair of second upper links having first ends rotatably connected to the second upper bracket and second ends rotatably connected to second ends of the pair of first upper links, respectively.

The pair of first upper links and the pair of second upper links may be connected in a pantograph form.

The first driving module may include a first actuator configured to generate rotatory power from an external power source; a first lead screw, disposed on the first actuator to move forward and backward, configured to widen or narrow a gap between the first upper bracket and the second upper bracket in a moving direction thereof; and a first nut screw configured to convert a rotary motion of the first actuator into a rectilineal and reciprocating motion of the first lead screw.

The first actuator may be fixed to one of the first upper bracket or the second upper bracket, and the first lead screw may have an end fixed to another one of the first upper bracket or the second upper bracket.

The first actuator may be a hollow motor.

An outer circumferential surface of the first lead screw may be threaded into an inner circumferential surface of the first nut screw.

The corner module apparatus may further include an arm control unit configured to control the upper arm module.

In another general aspect, a corner module apparatus for a vehicle includes a driving unit configured to provide driving power to a wheel of the vehicle; a braking unit, coupled with the driving unit, configured to apply or release braking power; an upper arm module, connected to the driving unit, adjustable to vary a camber angle of the wheel; a lower arm module, connected to the driving unit, adjustable to vary a wheel track of the wheel; and a steering unit configured to support the upper arm module and the lower arm module, and adjust a steering angle of the wheel.

The lower arm module, connected to a lower side of the driving unit, may have a variable length in a width direction of the vehicle and configured to adjust a contact location of the wheel relative to ground.

The lower arm module may include a first lower bracket rotatably connected to the driving unit; a second lower bracket rotatably, connected to the steering unit, spaced apart from the first lower bracket; a lower link unit, disposed between the first lower bracket and the second lower bracket, configured to have an adjustable internal angle; and a second driving module, disposed between the first lower bracket and the second lower bracket, configured to vary a relative distance between the first lower bracket and the second lower bracket by adjusting the adjustable internal angle of the lower link unit.

The lower link unit may include a pair of first lower links having first ends rotatably connected to the first lower bracket, and a pair of second lower links having first ends rotatably connected to the second lower bracket and second ends rotatably connected to second ends of the pair of first lower links, respectively.

The pair of first lower links and the pair of second lower links may be connected in a pantograph form.

The second driving module may include a second actuator configured to generate rotatory power from an external power source; a second lead screw, disposed on the second actuator to move forward and backward, configured to widen or narrow a gap between the first lower bracket and the second lower bracket in a moving direction thereof; and a second nut screw configured to convert the rotary motion of the second actuator into a rectilineal and reciprocating motion of the second lead screw.

The second actuator may be fixed to one of the first lower bracket or the second lower bracket, and the second lead screw my have an end fixed to another one of the first lower bracket or the second lower bracket.

An outer circumferential surface of the second lead screw may be threaded into an inner circumferential surface of the second nut screw.

The corner module apparatus may further include an arm control unit configured to control the upper arm module and the lower arm module.

The arm control unit may vary the lower arm module length when the wheel drives.

Other features and aspects will be apparent from the following detailed description, the drawings, and the claims.

DETAILED DESCRIPTION

Figure 1:
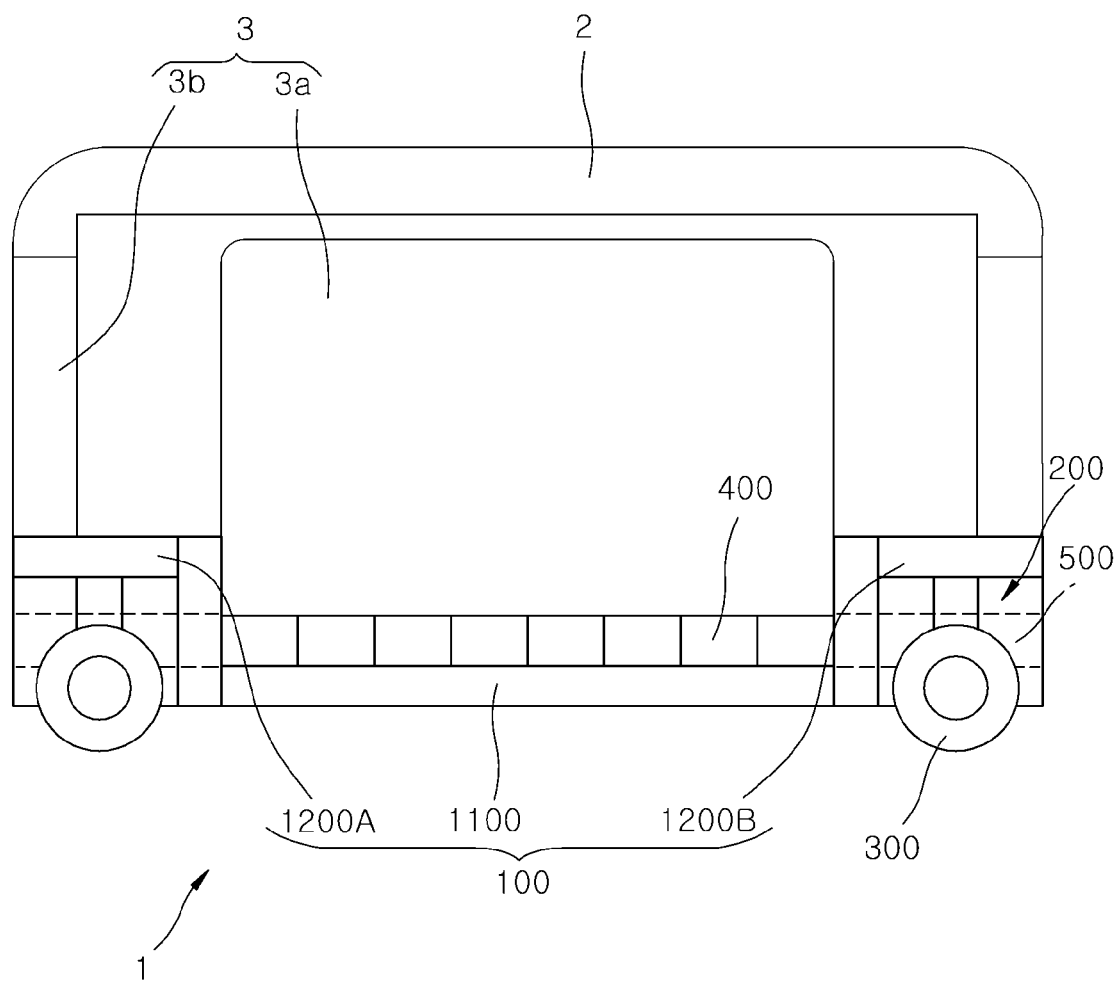
FIG. 1 is a front view schematically illustrating a configuration of a vehicle including a corner module apparatus for a vehicle according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, embodiments of a vehicle including a corner module apparatus for a vehicle and an operating method of the corner module apparatus for a vehicle according to the present disclosure will be described with reference to the accompanying drawings.

Various embodiments are directed to providing a corner module apparatus for a vehicle, which can freely adjust the number and alignment of wheels to suit a purpose of a vehicle.

Furthermore, various embodiments are directed to providing a corner module apparatus for a vehicle, which can independently control operations of each wheel.

1. Structure of Vehicle Including Corner Module Apparatus for Vehicle

Figure 2:
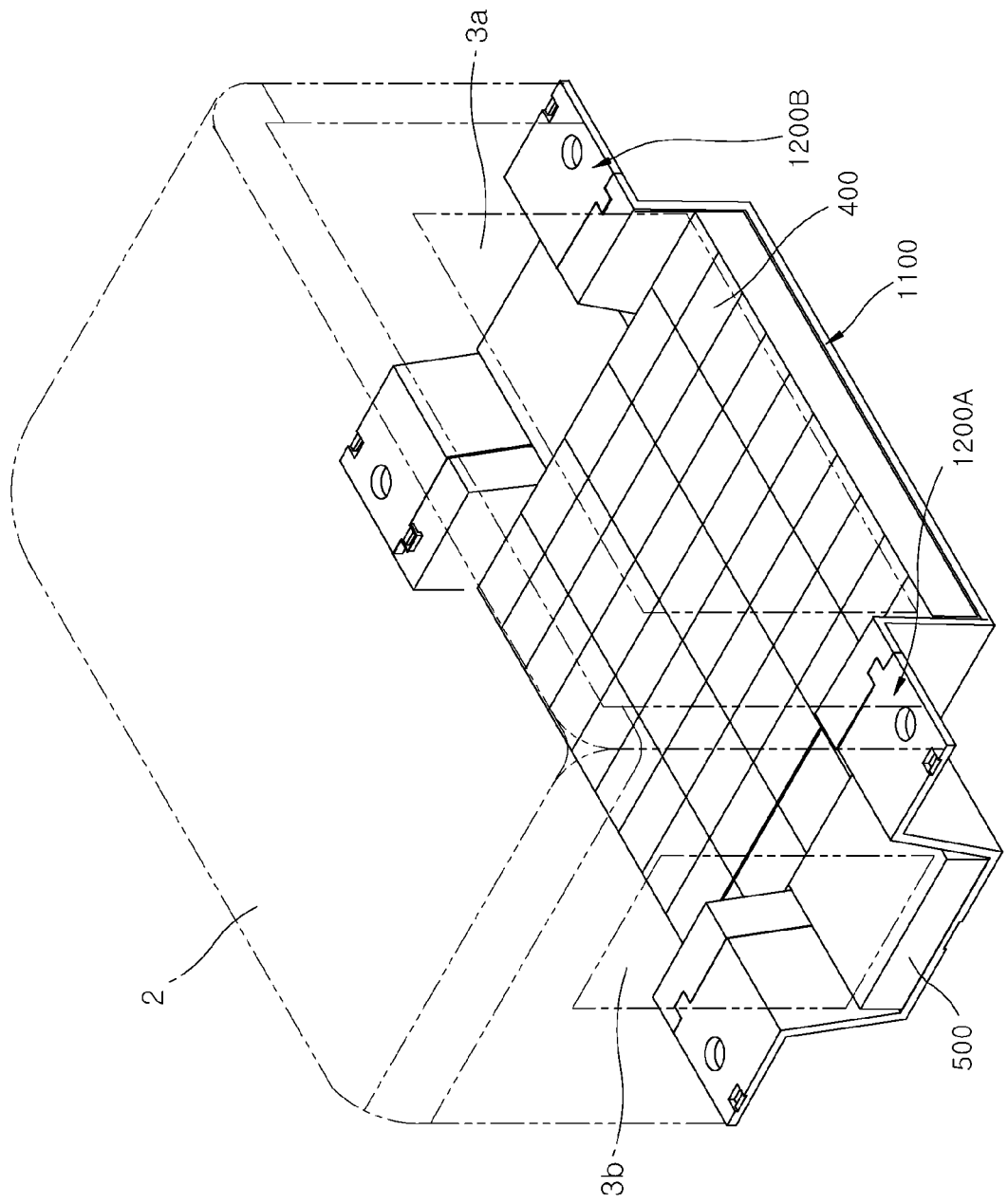
FIG. 2 is a perspective view schematically illustrating a configuration of a vehicle including a corner module apparatus for a vehicle according to an embodiment of the present disclosure.

FIG. 1 is a front view schematically illustrating a configuration of a vehicle including a corner module apparatus for a vehicle according to an embodiment of the present disclosure. FIG. 2 is a perspective view schematically illustrating a configuration of a vehicle including a corner module apparatus for a vehicle according to an embodiment of the present disclosure.

Referring to FIGS. 1 and 2, the vehicle including a corner module apparatus for a vehicle according to an embodiment of the present disclosure includes a corner module apparatus 1 for a vehicle, a top hat 2, and a door part 3.

The corner module apparatus 1 for a vehicle according to an embodiment of the present disclosure includes a frame module 100 and a corner module 200.

The frame module 100 is installed on the lower side of a vehicle body, and generally supports the corner module 200, a battery 400, and an inverter 500.

Referring to FIG. 2, the frame module 100 according to the present embodiment includes a main platform 1100, a first corner module platform 1200A, and a second corner module platform 1200B.

The main platform 1100 is installed on the lower side of the vehicle body. The battery 400 for supplying a power source to the corner module 200 described later is mounted within the main platform 1100. The main platform 1100 may have a highly rigid material, such as metal, so that main platform can sufficiently withstand weight applied from the battery 400. The battery 400 is formed to have a lower height than the main platform 1100.

Figure 3:
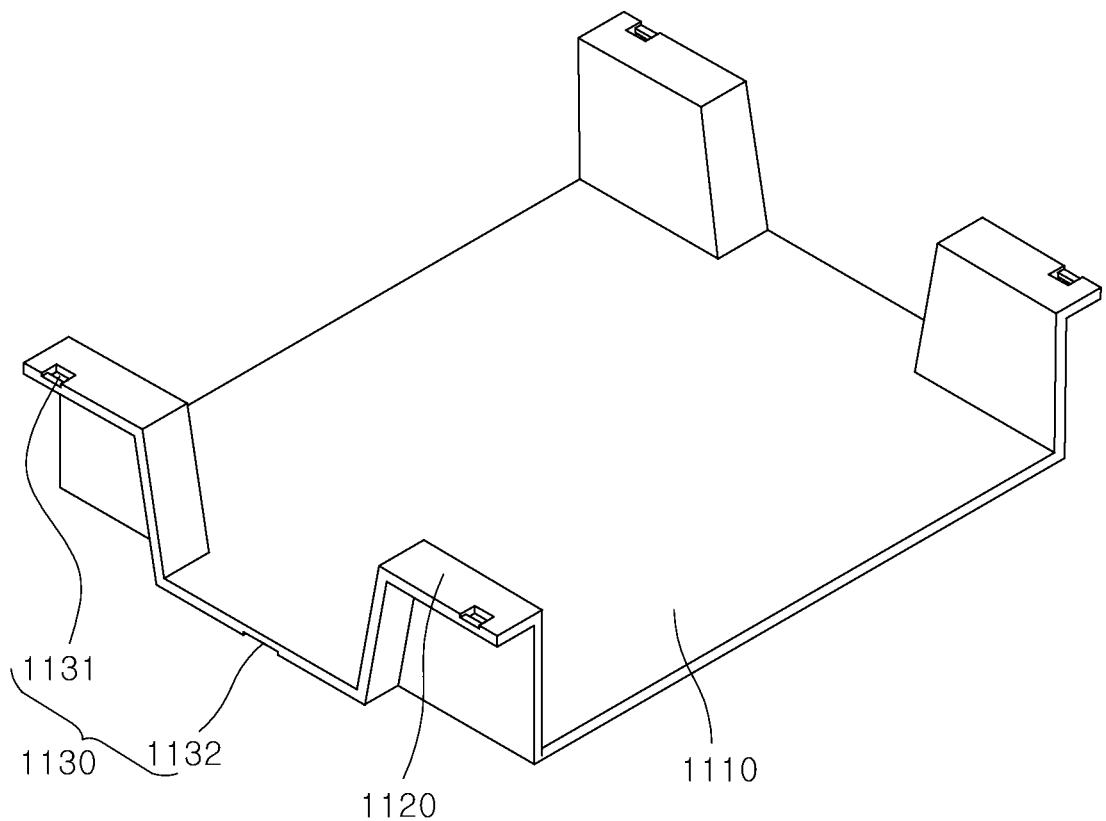
FIG. 3 is a perspective view schematically illustrating a configuration of a main platform according to an embodiment of the present disclosure.

FIG. 3 is a perspective view schematically illustrating a configuration of the main platform 1100 according to an embodiment of the present disclosure.

Referring to FIG. 3, the main platform 1100 according to the present embodiment includes a main plate 1110, a main wheel housing 1120, and a main fastening part 1130.

The main plate 1110 forms an external appearance of a central part of the main platform 1100, and generally supports the main wheel housing 1120 described later. The main plate 1110 according to an embodiment of the present disclosure may be formed to have a form of a flat plate that is disposed in parallel the ground. The battery 400 is seated on the top of the main plate 1110, and the inverter 500 may be seated thereon, if necessary. The design of the area of the main plate 1110 may be variously changed depending on the size of the vehicle body, the size of the battery 400, etc.

The main wheel housing 1120 extends from the main plate 1110, and provides a space in which the corner module 200 is accommodated. The main wheel housing 1120 according to the present embodiment may be formed to have a form of a pillar that is perpendicularly upward extended from the top of the main plate 1110. More specifically, the main wheel housing 1120 is disposed on the corner side of the main plate 1110, and is formed to have an outside surface thereof opened. For example, the main wheel housing 1120 may be extended to the top of the corner of the main plate 1110 with a cross-sectional form of an approximately "¬" form as illustrated in FIG. 3. Accordingly, the main wheel housing 1120 may provide a space in which the corner module 200 is accommodated.

The top of the main wheel housing 1120 is formed to have a form of a flat plate that is disposed in parallel to the main plate 1110. Accordingly, the main wheel housing 1120 may provide a space in which the main fastening part 1130 described later may be formed on the top of the main wheel housing 1120.

The main wheel housing 1120 may be provided in plural. The plurality of main wheel housings 1120 may be disposed on the plurality of corner sides of the main plate 1110, respectively.

The main fastening part 1130 is provided in the main plate 1110 and the main wheel housing 1120, and is fastened to the first corner module platform 1200A and the second corner module platform 1200B described later.

Figure 4:
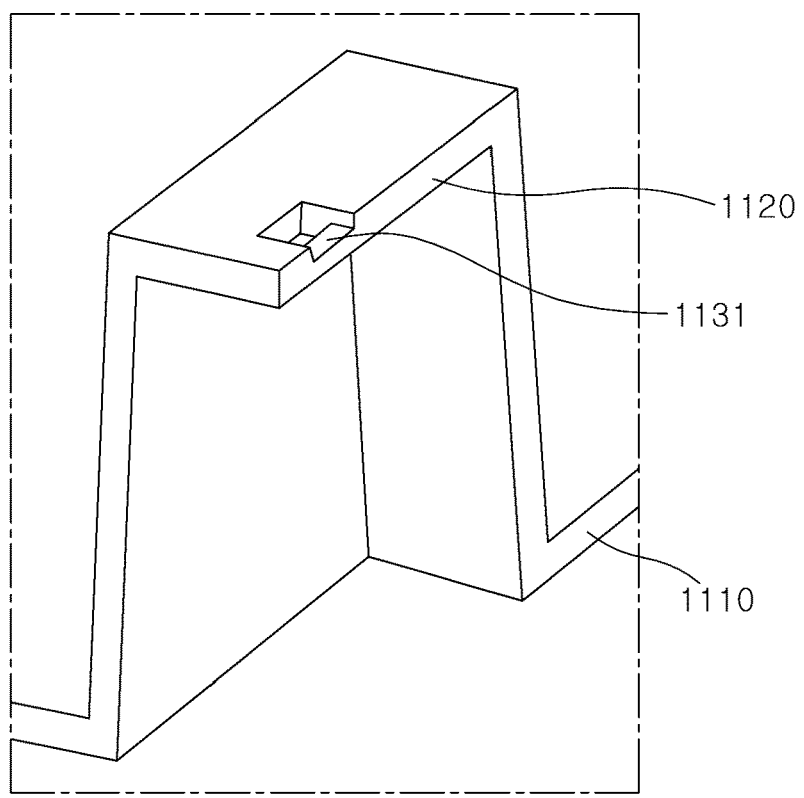
FIGS. 4 and 5 are enlarged views schematically illustrating configurations of a main fastening part according to an embodiment of the present disclosure.
Figure 5:
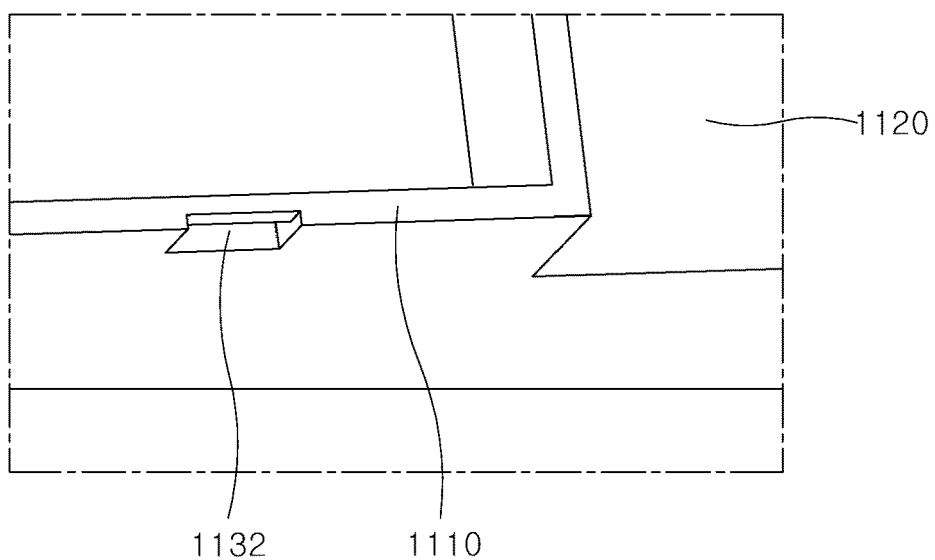

FIGS. 4 and 5 are enlarged views schematically illustrating configurations of the main fastening part according to an embodiment of the present disclosure.

Referring to FIGS. 3 to 5, the main fastening part 1130 according to the present embodiment includes an upper main fastening part 1131 and a lower main fastening part 1132.

The upper main fastening part 1131 according to the present embodiment may be formed to have a form of a groove that is concavely recessed and formed from an outside surface of the main wheel housing 1120. The upper main fastening part 1131 is perpendicularly downward extended from the top of the main wheel housing 1120. The upper main fastening part 1131 may have a cross-sectional form having a step form so that the upper main fastening part 1131 is locked and coupled with a first corner module upper-fastening part 1231A and a second corner module upper-fastening part 1231B described later. The upper main fastening part 1131 is disposed at the end of the main wheel housing 1120 disposed to face the first corner module platform 1200A and the second corner module platform 1200B described later. The upper main fastening part 1131 may be provided in plural, and may be individually provided in the main wheel housings 1120, respectively.

The lower main fastening part 1132 according to the present embodiment may be formed to have a form of a groove that is concavely recessed and formed from the outside surface of the main plate 1110. The lower main fastening part 1132 may have a cross-sectional form having a step form so that lower main fastening part 1132 is locked and coupled with a first corner module lower-fastening part 1232A and a second corner module lower-fastening part 1232B described later.

The lower main fastening part 1132 is extended in a direction opposite to a direction of the upper main fastening part 1131. More specifically, the lower main fastening part 1132 is perpendicularly upward extended from the lower side of the main plate 1110. Accordingly, when being fastened to a first corner module fastening part 1230A and a second corner module fastening part 1230B described later, the upper main fastening part 1131 and the lower main fastening part 1132 can prevent the first corner module fastening part 1230A and the second corner module fastening part 1230B from deviating in any one direction.

The lower main fastening part 1132 is provided in pair, and is disposed at the ends of the main plate 1110 disposed to face the first corner module platform 1200A and the second corner module platform 1200B described later, respectively.

The first corner module platform 1200A and the second corner module platform 1200B are detachably coupled to both sides of the main platform 1100, respectively. The first corner module platform 1200A and the second corner module platform 1200B have the corner modules 200 described later coupled to lower sides thereof, respectively, and support the corner modules 200. The corner module 200 and the inverter 500 that converts DC power supplied from the battery 400 into AC power and transmits the AC power to the corner module 200 are mounted within each of the first corner module platform 1200A and the second corner module platform 1200B. The inverter 500 is formed to have a lower height than the first corner module platform 1200A and the second corner module platform 1200B. The first corner module platform 1200A and the second corner module platform 1200B may have a highly rigid material, such as metal, so that the first corner module platform 1200A and the second corner module platform 1200B can sufficiently withstand weight applied from the corner module 200 and the battery 400.

Figure 6:
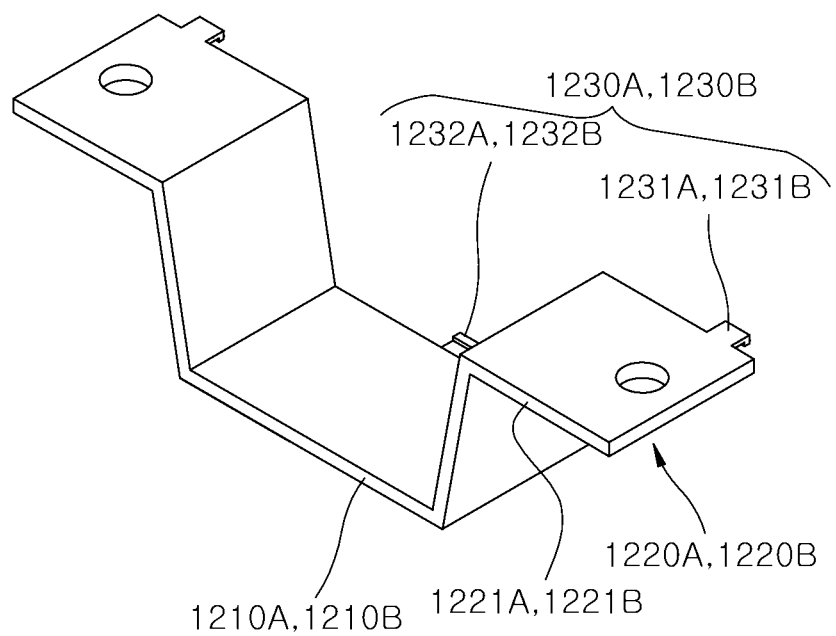
FIG. 6 is a perspective view schematically illustrating a configuration of a first corner module platform and a second corner module platform according to an embodiment of the present disclosure.

FIG. 6 is a perspective view schematically illustrating a configuration of the first corner module platform and the second corner module platform according to an embodiment of the present disclosure.

Referring to FIG. 6, the first corner module platform 1200A according to the present embodiment includes a first corner module plate 1210A, a first corner module housing 1220A, and the first corner module fastening part 1230A.

The first corner module plate 1210A forms an external appearance of a central part of the first corner module platform 1200A, and generally supports the first corner module housing 1220A described later. The first corner module plate 1210A according to the present embodiment may be formed to have a form of a flat plate that is disposed in parallel to the ground. The inverter 500 is seated on the top of the first corner module plate 1210A, and the battery 400 may be seated thereon, if necessary. The design of the area of the first corner module plate 1210A may be variously changed the size of the main plate 1110, the size of the inverter 500, etc.

The first corner module housing 1220A extends from the first corner module plate 1210A and provides a space in which the corner module 200 is accommodated. The first corner module housing 1220A according to the present embodiment may be formed to have a form of a plate that extends upward from the top of the main plate 1110. The first corner module housing 1220A may be provided in pair, and may be disposed at the ends of the first corner module plate 1210A in a width direction thereof, respectively.

The first corner module housing 1220A is provided with a first mounting plate 1221A that supports the corner module 200. The first mounting plate 1221A may be formed to have a form of a flat plate that extends in the width direction of the first corner module plate 1210A from the top of the first corner module housing 1220A. The first mounting plate 1221A is disposed in parallel to the first corner module plate 1210A. The lower side of the first mounting plate 1221A is detachably coupled to the corner module 200 by bolting coupling, etc.

In this case, the first corner module housing 1220A may be extended to the outside of the first corner module plate 1210A in the width direction thereof with a cross-sectional form having an approximately "¬" form as illustrated in FIG. 6. Accordingly, the first corner module housing 1220A may provide a space in which the corner module 200 is accommodated.

The first corner module fastening part 1230A is provided in the first corner module plate 1210A and the first corner module housing 1220A, and is fastened to the main fastening part 1130 disposed on one side of the main platform 1100. When the main platform 1100 and the first corner module platform 1200A are assembled, the first corner module fastening part 1230A is disposed at a location that faces the main fastening part 1130 disposed on the one side of the main platform 1100. The first corner module fastening part 1230A is locked and coupled with the main fastening part 1130 disposed on the one side of the main platform 1100 as the first corner module platform 1200A mutually comes into contact with the main platform 1100 in a direction parallel to the length direction of a vehicle. Accordingly, the main fastening part 1130 and the first corner module fastening part 1230A can improve assembly performance of the main platform 1100 and the first corner module platform 1200A.

Figure 7:
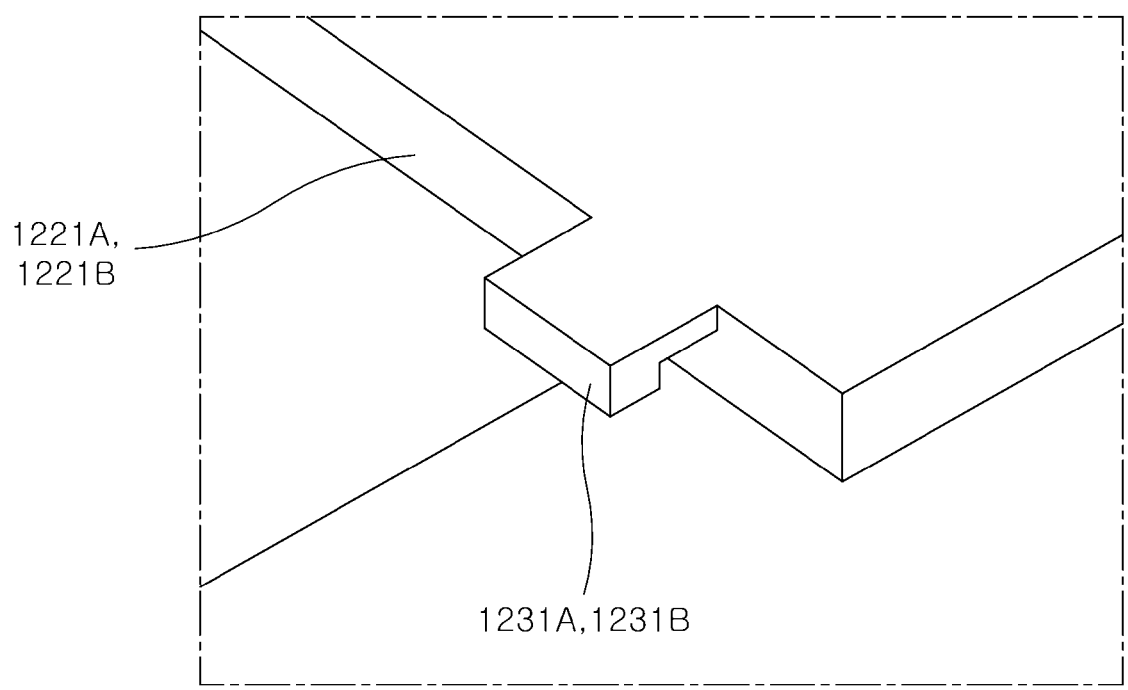
FIGS. 7 and 8 are enlarged views schematically illustrating configurations of a first corner module fastening part and a second corner module fastening part according to an embodiment of the present disclosure.
Figure 8:
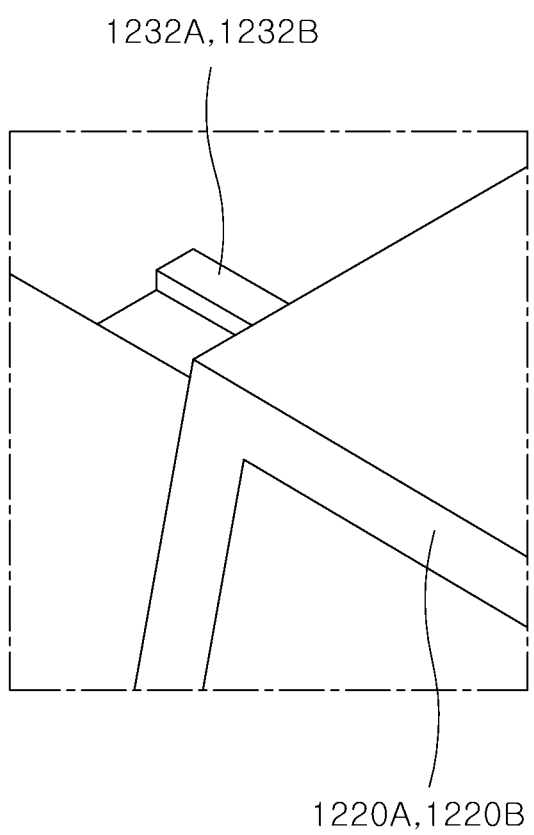

FIGS. 7 and 8 are enlarged views schematically illustrating configurations of the first corner module fastening part and the second corner module fastening part according to an embodiment of the present disclosure.

Referring to FIGS. 6 to 8, the first corner module fastening part 1230A according to an embodiment of the present disclosure includes the first corner module upper-fastening part 1231A and the first corner module lower-fastening part 1232A.

The first corner module upper-fastening part 1231A according to the present embodiment may be formed to have a form of a protrusion that protrudes from the outside surface of the first corner module housing 1220A. More specifically, the first corner module upper-fastening part 1231A is transversely extended from the end of the front or rear of the first mounting plate 1221A, more specifically, an end disposed to face the end of the main platform 1100 on one side thereof. The first corner module upper-fastening part 1231A is inserted into the upper main fastening part 1131 disposed on the one side of the main platform 1100 as the first corner module platform 1200A comes into contact with the main platform 1100 in the direction parallel to the length direction of the vehicle. In this case, the first corner module upper-fastening part 1231A may have a shape having an end bent in a hook form so that the first corner module upper-fastening part 1231A is locked and coupled with the upper main fastening part 1131 disposed on the one side of the main platform 1100. The first corner module upper-fastening part 1231A may be provided in plural, and may be individually provided in the first corner module housings 1220A, respectively.

The first corner module lower-fastening part 1232A according to the present embodiment may be formed to have a form of a protrusion that protrudes from the outside surface of the first corner module plate 1210A. More specifically, the first corner module lower-fastening part 1232A is transversely extended from any one end of the front or rear of the first corner module plate 1210A, more specifically, an end disposed to face the end of the main platform 1100 on the one side thereof. The first corner module lower-fastening part 1232A is inserted into the lower main fastening part 1132 disposed on the one side of the main platform 1100 as the first corner module platform 1200A comes into contact with the main platform 1100 in the direction parallel to the length direction of the vehicle.

The first corner module lower-fastening part 1232A may have a shape having an end bent in a hook form so that the first corner module lower-fastening part 1232A is locked and coupled with the lower main fastening part 1132. In this case, the end of the first corner module lower-fastening part 1232A is bent in a direction opposite to a direction of the end of the first corner module upper-fastening part 1231A. For example, the end of the first corner module upper-fastening part 1231A may be downward bent, and the end of the first corner module lower-fastening part 1232A may be upward bent. Accordingly, when being fastened to the main fastening part 1130, the first corner module upper-fastening part 1231A and the first corner module lower-fastening part 1232A can prevent the upper main fastening part 1131 and the lower main fastening part 1132 from deviating in any direction thereof.

The second corner module platform 1200B includes a second corner module plate 1210B, a second corner module housing 1220B, and the second corner module fastening part 1230B.

Detailed shapes of the second corner module plate 1210B and the second corner module housing 1220B may be formed to have the same forms as the above-mentioned first corner module plate 1210A and the second corner module housing 1220A, respectively.

The second corner module fastening part 1230B is provided in the second corner module plate 1210B and the second corner module housing 1220B, and is fastened to the main fastening part 1130 disposed on the other side of the main platform 1100. When the main platform 1100 and the second corner module platform 1200B are assembled, the second corner module fastening part 1230B is disposed at a location that faces the main fastening part 1130 disposed on the other side of the main platform 1100. The second corner module fastening part 1230B is locked and coupled with the main fastening part 1130 disposed on the other side of the main platform 1100 as the second corner module platform 1200B comes into contact with the main platform 1100 in the direction parallel to the length direction of the vehicle.

The second corner module fastening part 1230B according to the present embodiment includes the second corner module upper-fastening part 1231B and the second corner module lower-fastening part 1232B.

The second corner module upper-fastening part 1231B according to the present embodiment may be formed to have a form of a protrusion that protrudes from an outside surface of the second corner module housing 1220B. More specifically, the second corner module upper-fastening part 1231B is transversely extended from the end of the front or rear of a second mounting plate 1221B, more specifically, an end disposed to face the end of the main platform 1100 on the other side thereof. The second corner module upper-fastening part 1231B is inserted into the upper main fastening part 1131 disposed on the one side of the main platform 1100 as the second corner module platform 1200B comes into contact with the main platform 1100 in the direction parallel to the length direction of the vehicle. In this case, the second corner module upper-fastening part 1231B may have a shape having an end bent in a hook form so that the second corner module upper-fastening part 1231B is locked and coupled with the upper main fastening part 1131 disposed on the one side of the main platform 1100. The second corner module upper-fastening part 1231B may be provided in plural, and may be individually provided in the second corner module housings 1220B, respectively.

The second corner module lower-fastening part 1232B according to the present embodiment may be formed to have a form of a protrusion that protrudes from an outside surface of the second corner module plate 1210B. More specifically, the second corner module lower-fastening part 1232B is transversely extended from any one end of the front and rear of the second corner module plate 1210B, more specifically, an end disposed to face the end of the main platform 1100 on the other side thereof. The second corner module lower-fastening part 1232B is inserted into the lower main fastening part 1132 disposed on the other side of the main platform 1100 as the first corner module platform 1200B comes into contact with the main platform 1100 in the direction parallel to the length direction of the vehicle.

The second corner module lower-fastening part 1232B may have a shape having an end bent in a hook form so that the second corner module lower-fastening part 1232B is locked and coupled with the lower main fastening part 1132. In this case, the end of the second corner module lower-fastening part 1232B is bent in a direction opposite to that of the end of the second corner module upper-fastening part 1231B. For example, the end of the second corner module upper-fastening part 1231B may be downward bent, and the end of the second corner module lower-fastening part 1232B may be upward bent. Accordingly, when being fastened to the main fastening part 1130, the second corner module upper-fastening part 1231B and the second corner module lower-fastening part 1232B can prevent the upper main fastening part 1131 and the lower main fastening part 1132 from deviating in any one direction.

The corner module 200 is supported by the frame module 100 and connected to a wheel of the vehicle 300, and generally performs an operation, such as driving, braking, steering, or suspension. The corner module 200 may be provided in plural, and may be individually connected to each of the wheels 300. Each of the plurality of corner modules 200 may independently perform an operation, such as driving, braking, steering, or suspension, on each of the wheels 300. A detailed embodiment of the corner module 200 is described later.

The top hat 2 is mounted on the top of the corner module apparatus 1 for the vehicle. A boarding space for a passenger is provided within the top hat 2.

Referring to FIGS. 1 and 2, the top hat 2 according to the present embodiment may be formed to have a form of a box whose interior is empted and bottom is opened. Various articles and devices suitable for a purpose of a passenger, such as a seat, a manipulation panel, and a table, may be installed within the top hat 2. The opened bottom of the top hat 2 is disposed to face the top of the frame module 100, that is, the top of the main platform 1100, the first corner module platform 1200A, and the second corner module platform 1200B. The bottom of the top hat 2 may be coupled to the top of the main wheel housing 1120, the first corner module housing 1220A, and the second corner module housing 1220B through bolting, and may be detachably fixed to the frame module 100. The design of the area and length of the top hat 2 may be variously changed depending on the area, length, etc. of the frame module 100.

The door part 3 is installed in the top hat 2 in a way to be opened and closed, and enables a passenger to get in the top hat 2 when opened.

The door part 3 according to the present embodiment includes a first door 3a and a second door 3b.

The first door 3a is installed on one side of the top hat 2 in a way to be opened and closed, and is disposed on the top of the main platform 1100. Referring to FIGS. 1 and 2, the first door 3a according to the present embodiment is installed on the side of the top hat 2 in a width direction thereof in a way to be opened and closed. The first door 3a may be installed on the top hat 2 in a way to be opened and closed by using various methods, such as an open and close method and a sliding method. The first door 3a may be provided in pair, and may be installed on both sides of the top hat 2, respectively, in the width direction thereof in a way to be opened and closed. Both ends of the first door 3a are disposed between the pair of main wheel housings 1120 spaced apart from each other in the length direction of the main plate 1110. The bottom of the first door 3a is disposed to face the top of the battery 400 seated on the top of the main plate 1110. As the battery 400 is formed to have a lower height than the main platform 1100, the bottom of the first door 3a may be disposed close to the ground, thereby inducing smooth boarding of a passenger.

The second door 3b is installed on the other side of the top hat 2 in a way to be opened and closed, and is disposed on the top of at least one of the first corner module platform 1200A and the second corner module platform 1200B. Hereinafter, an example in which the second door 3b is disposed on both the tops of the first corner module platform 1200A and the second corner module platform 1200B will be described, but the second door 3b is not limited to the example. It is also possible for the second door 3b to be disposed on the top of any one of the first corner module platform 1200A and the second corner module platform 1200B.

Referring to FIGS. 1 and 2, the second door 3b according to the present embodiment is provided in pair, and is installed on the sides of the top hat 2 in forward and backward directions in a way to be opened and closed. Accordingly, the second door 3b may be disposed in a direction perpendicular to the first door 3a. The second door 3b may be installed in the top hat 2 in a way to be opened and closed by using various methods, such as an open and close method and a sliding method. Both ends of each of the pair of second doors 3b is disposed between the pair of first corner module housing 1220A and second corner module housing 1220B. The bottom of each of the pair of second doors 3b is disposed to face the top of the inverter 500 seated on the top of each of the first corner module plate 1210A and the second corner module plate 1210B. As the inverter 500 is formed to have a lower height than the first corner module platform 1200A and the second corner module platform 1200B, the bottom of the second door 3b may be disposed close to the ground, thereby inducing smooth boarding of a passenger.

Hereinafter, a configuration of a corner module 200 according to a first embodiment of the present disclosure is described.

Figure 9:
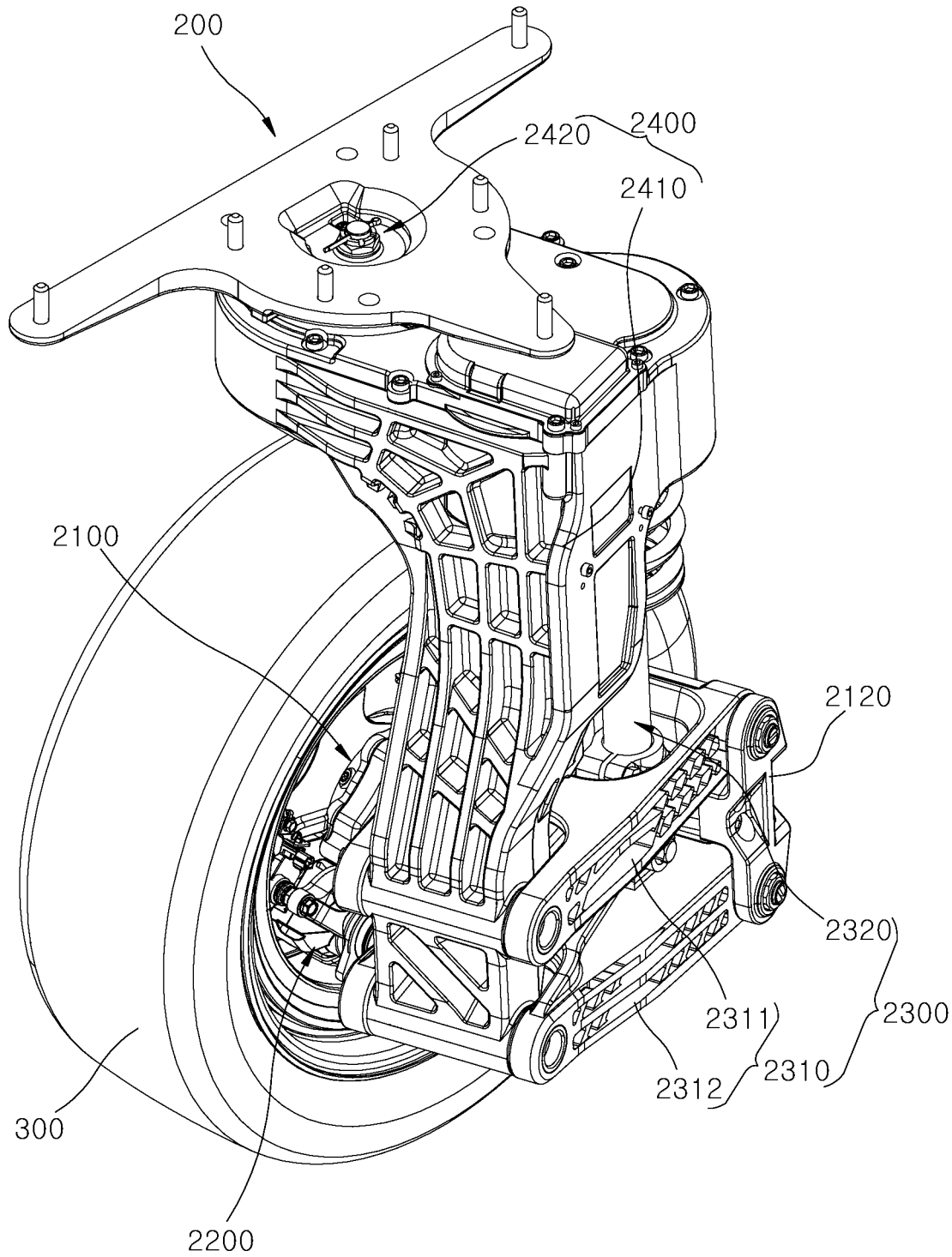
FIG. 9 is a perspective view schematically illustrating a configuration of a corner module according to a first embodiment of the present disclosure.
Figure 10:
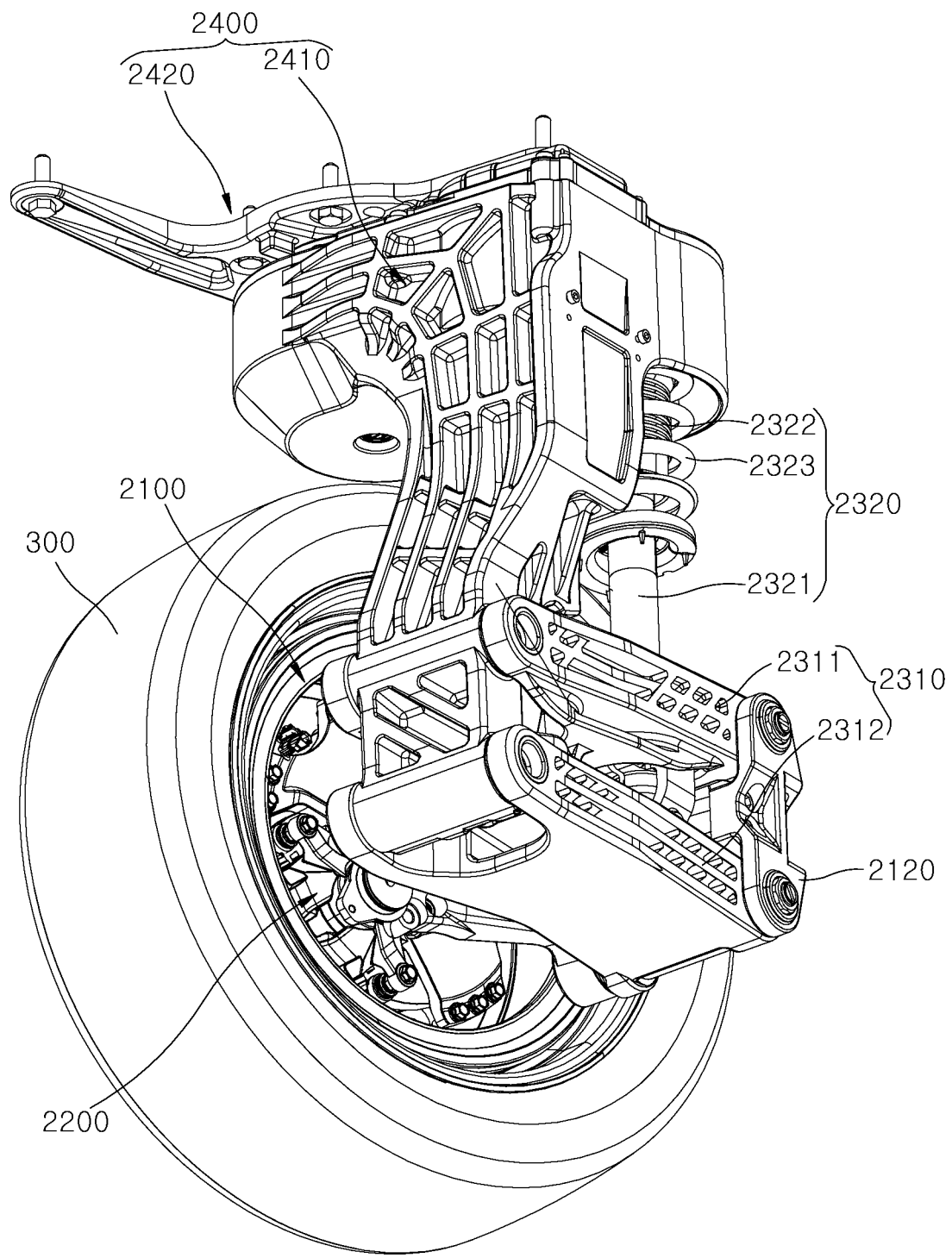
FIG. 10 is a perspective view illustrating a configuration of the corner module according to the first embodiment of the present disclosure at a view different from that of the configuration of FIG. 9.
Figure 11:
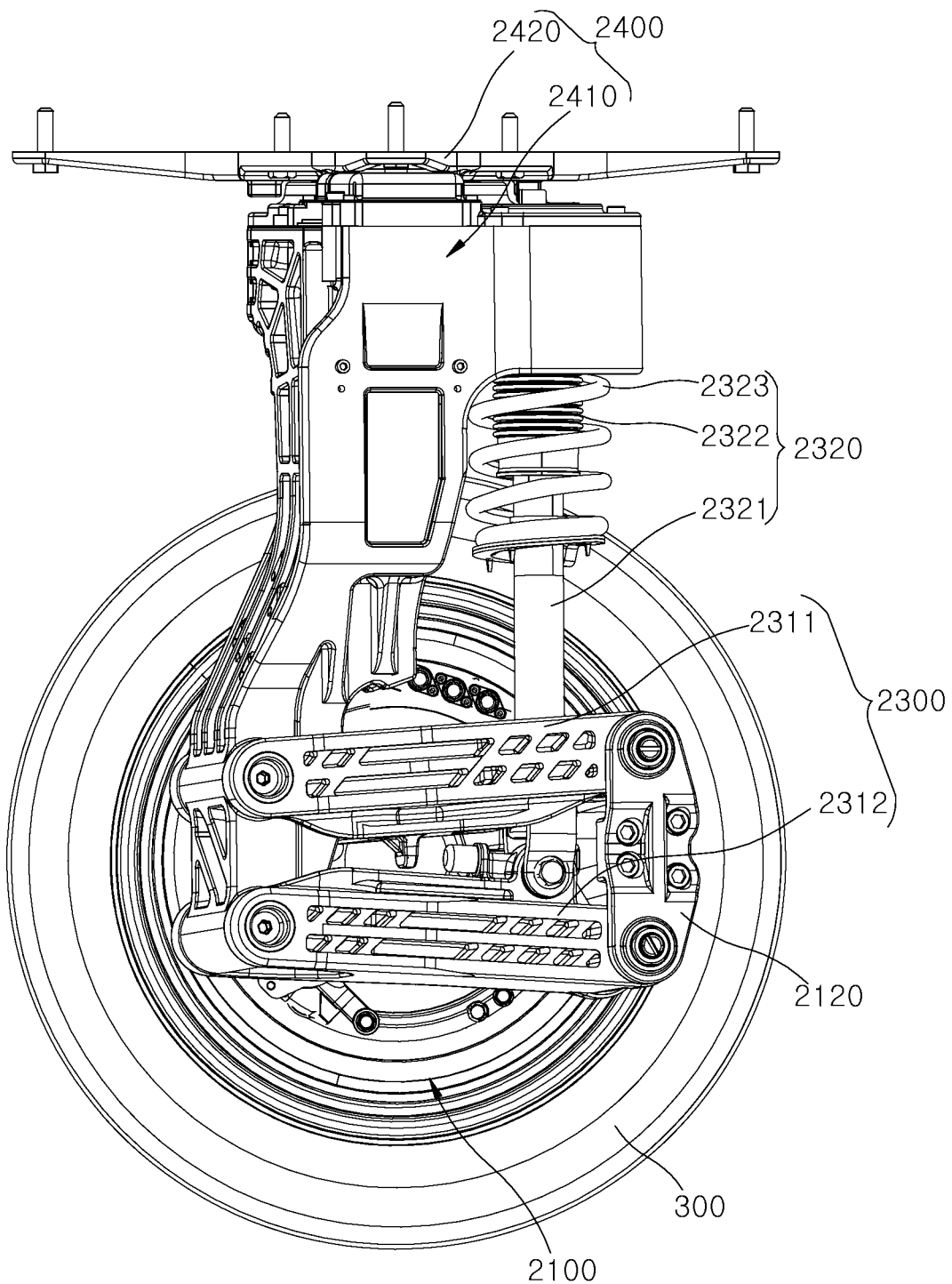
FIG. 11 is a front view schematically illustrating a configuration of the corner module according to the first embodiment of the present disclosure.
Figure 12:
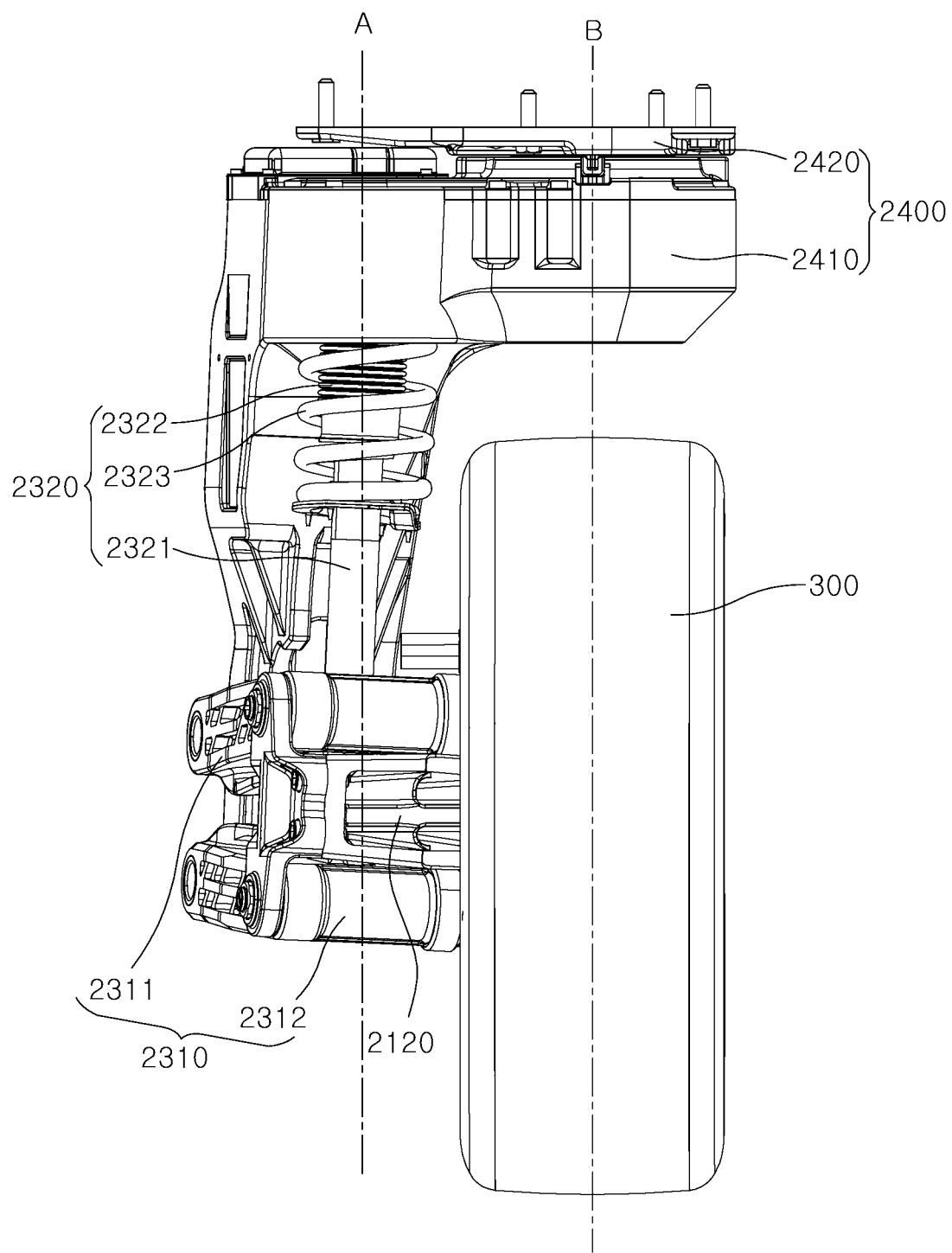
FIG. 12 is a side view schematically illustrating a configuration of the corner module according to the first embodiment of the present disclosure.
Figure 13:
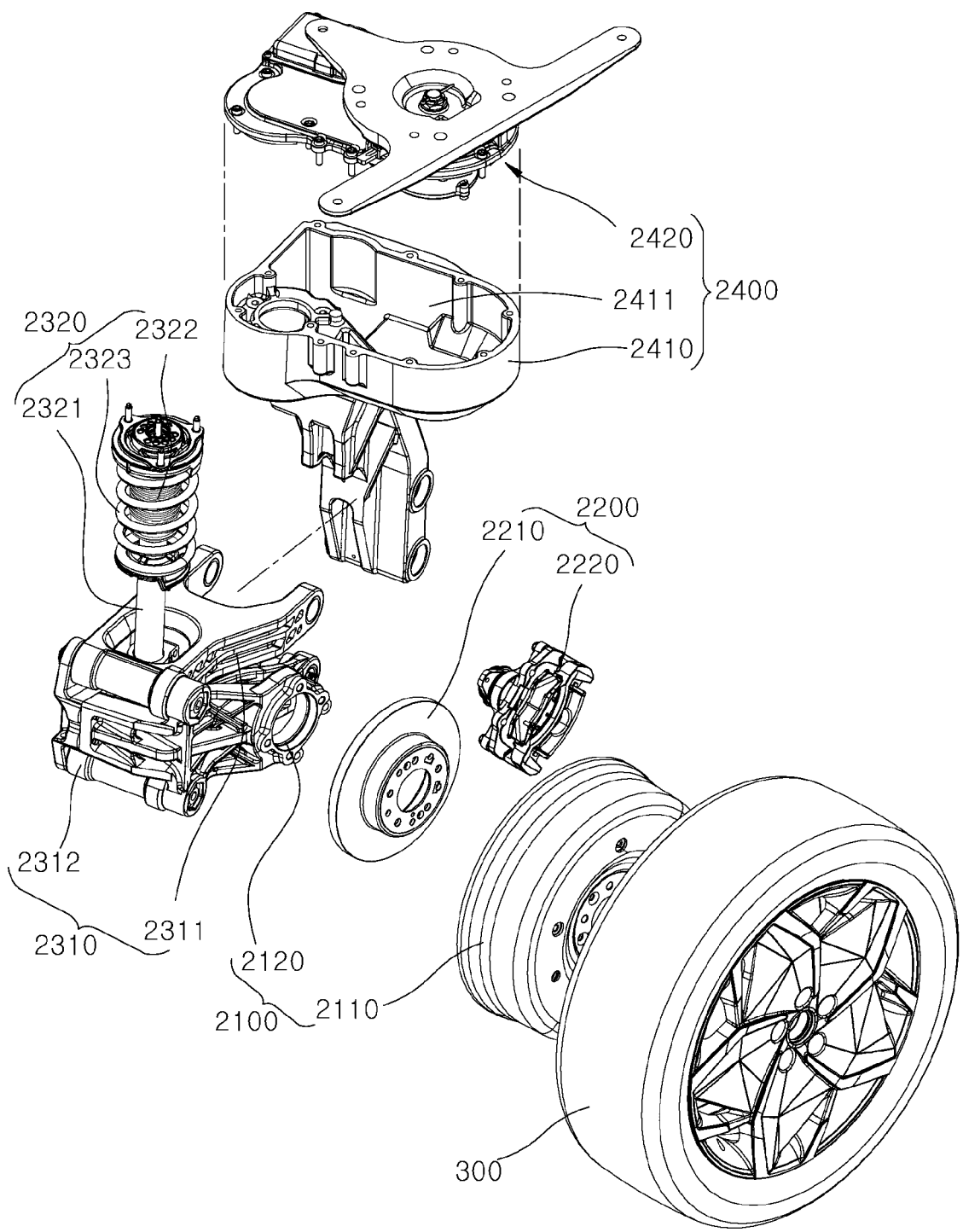
FIG. 13 is an exploded perspective view schematically illustrating a configuration of the corner module according to the first embodiment of the present disclosure.

FIG. 9 is a perspective view schematically illustrating a configuration of the corner module according to the first embodiment of the present disclosure. FIG. 10 is a perspective view illustrating a configuration of the corner module according to the first embodiment of the present disclosure at a view different from that of the configuration of FIG. 9. FIG. 11 is a front view schematically illustrating a configuration of the corner module according to the first embodiment of the present disclosure. FIG. 12 is a side view schematically illustrating a configuration of the corner module according to the first embodiment of the present disclosure. FIG. 13 is an exploded perspective view schematically illustrating a configuration of the corner module according to the first embodiment of the present disclosure.

Referring to FIGS. 9 to 13, the corner module 200 according to the first embodiment of the present disclosure includes a driving unit 2100, a braking unit 2200, a suspension unit 2300, and a steering unit 2400.

The driving unit 2100 rotates the wheel 300 by providing driving power to the wheel 300.

The driving unit 2100 according to the present embodiment includes an in-wheel motor 2110 and a knuckle 2120.

The in-wheel motor 2110 is installed in the inner side of the wheel 300, and generates the driving power. The in-wheel motor 2110 according to the present embodiment may be configured to include a stator that is fixed in the inner side of the wheel 300 and that forms a magnetic field by receiving a power source from the battery 400 and a rotor that is rotatably installed in the inner side of the wheel 300 and that rotates the wheel 300 by an electromagnetic interaction with the stator. The stator and the rotor may have their central axis disposed on the same line as the central axis of the wheel 300, and may be disposed in a concentric form from the inner side of the wheel 300 in a way to be stacked with each other.

The knuckle 2120 is coupled with the in-wheel motor 2110, and provides a mechanical connection to the driving unit 2100 between the braking unit 2200 and the suspension unit 2300 described later. The knuckle 2120 according to the present embodiment may be coupled and supported by the stator of the in-wheel motor 2110 by bolting, etc. The knuckle 2120 may rotatably support the rotor of the in-wheel motor 2110 through the medium of a wheel bearing etc. The knuckle 2120 may be fabricated by molding a metal-series material through casting, etc. in order to secure sufficient stiffness. A detailed shape of the knuckle 2120 is not limited to a shape illustrated in FIG. 13. The design of the knuckle 2120 may be changed in various shapes capable of supporting the in-wheel motor 2110.

The braking unit 2200 applies or releases braking power by being interrupted by the rotation of the wheel 300.

The braking unit 2200 according to the present embodiment includes a brake disk 2210 and a brake caliper 2220.

The brake disk 2210 is connected to the wheel 300 or the in-wheel motor 2110 and is rotated while being interlocked with the rotation of the wheel 300. The brake disk 2210 according to the present embodiment is formed to have a disc shape and installed in the inner side of the wheel 300. The brake disk 2210 is disposed to have its central axis placed on the same line as the central axis of the wheel 300. The brake disk 2210 may be integratedly connected with the wheel 300 or the rotor of the in-wheel motor 2110 by bolting, etc. Accordingly, when the wheel 300 is rotated, the brake disk 2210 may be rotated by using the central axis as an axis along with the wheel 300. The design of the diameter of the brake disk 2210 may be variously changed depending on the diameter of the wheel 300, the size of the in-wheel motor 2110, etc.

Upon braking of the vehicle, the brake caliper 2220 applies braking power by pressurizing the brake disk 2210. The brake caliper 2220 according to the present embodiment may be configured to include a brake pad disposed to face the brake disk 2210, a caliper housing coupled with the knuckle 2120 and movably supporting the brake pad, and a piston that is movably installed in the caliper housing in a way to advance and retreat and that pressurizes the brake pad toward the brake disk 2210 or releases the pressing of the brake pad in a moving direction thereof.

The suspension unit 2300 is connected to the driving unit 2100, and absorbs an impact delivered from a road surface while the vehicle drives.

The suspension unit 2300 according to the present embodiment includes a suspension arm 2310 and a shock absorber module 2320.

The suspension arm 2310 is provided between the driving unit 2100 and the steering unit 2400 described later, and supports the wheel 300. More specifically, the suspension arm 2310 absorbs weight applied from the wheel 300 while the vehicle drives by its own stiffness simultaneously with connecting the wheel 300 with the vehicle body, and plays a role in adjusting a movement of the wheel 300.

The suspension arm 2310 according to the present embodiment may include a first arm 2311 and a second arm 2312.

The first arm 2311 and the second arm 2312 have one ends rotatably connected to a steering body 2410 of the steering unit 2400 and the other ends rotatably connected to the knuckle 2120 of the driving unit 2100. In this case, the first arm 2311 and the second arm 2312 may be rotatably coupled to the steering body 2410 and the knuckle 2120 through the medium of a bush, a ball joint, a pin etc. The first arm 2311 and the second arm 2312 are spaced apart from each other in up and down directions and are disposed to face each other. The first arm 2311 and the second arm 2312 may be formed to have a double wishbone form. Accordingly, the first arm 2311 and the second arm 2312 are able to set negative camber of the wheel 300 to improve the cornering performance of the vehicle, and to set a low floor configuration that lowers the height of the vehicle. The first arm 2311 and the second arm 2312 may be slantly disposed to form a predetermined angle. Accordingly, the first arm 2311 and the second arm 2312 may set the length and center of a side view swing arm (SVSA) corresponding to the type of vehicle, a driving condition etc. through a relative angle formed by the first arm 2311 and the second arm 2312.

The shock absorber module 2320 is provided in a way to be retractile in a length direction thereof, and absorbs an impact or vibration delivered from a road surface to the vehicle body through the wheel 300. The shock absorber module 2320 according to the present embodiment includes a cylinder 2321, a rod 2322, and an elastic body 2323.

The cylinder 2321 is extended in up and down directions and is filled with a fluid. The bottom of the cylinder 2321 may penetrate the first arm 2311, and the cylinder 2321 may be rotatably connected to the top of the second arm 2312.

The rod 2322 is extended in the length direction of the cylinder 2321. The rod 2322 has a lower side inserted into the upper end of the cylinder 2321, and is installed in a way to slidingly move in the length direction of the cylinder 2321. The rod 2322 has an upper side coupled to the steering body 2410 by bolting, etc. The rod 2322 slidingly moves in the length direction of the cylinder 2321 by being interlocked by pressure of a fluid filled into the cylinder 2321.

The elastic body 2323 is disposed to surround outside surfaces of the cylinder 2321 and the rod 2322. The length of the elastic body 2323 is changed by being interlocked with a slide movement of the rod 2322. The elastic body 2323 according to the present embodiment may be formed to have a form of a coil spring capable of being retractile in the length direction thereof. The elastic body 2323 may have both ends coupled and supported by a lower sheet fixed to the cylinder 2321 and an upper sheet fixed to the rod 2322. The elastic body 2323 may be compressed or extended when the rod 2322 slidingly moves, may accumulate an elastic restoring force, and may offset an impact applied from a road surface by the accumulated elastic restoring force.

The steering unit 2400 is connected to the suspension unit 2300 and is rotatably installed on the lower side of the frame module 100. The steering unit 2400 is rotated clockwise or counterclockwise by using the frame module 100 as an axis, and adjusts a steering angle of the wheel 300. The steering unit 2400 is installed on the lower side of the frame module 100, and can prevent a part of the structure of the corner module 200 from protruding upward from the frame module 100. Accordingly, a spatial or shape problem upon vehicle body mounting design, package, and vehicle design can be solved.

The steering unit 2400 according to the present embodiment includes the steering body 2410 and a steering driving unit 2420.

The steering body 2410 is disposed to face the bottom of the frame module 100, and supports the suspension unit 2300. The steering body 2410 according to the present embodiment has a length direction extended in a direction parallel to the height direction of the vehicle, and is disposed between the frame module 100 and the suspension unit 2300. An area of the top of the steering body 2410 is formed to be greater than an area of the bottom thereof. Accordingly, the steering body 2410 is formed to have an approximately "-7" cross-sectional form. The bottom of the steering body 2410 is coupled with one ends of the first arm 2311 and the second arm 2312 through the medium of a bush, a ball joint, a pin, etc., and rotatably supports the first arm 2311 and the second arm 2312. The lower side of the top of the steering body 2410 is coupled with the top of the rod 2322 by bolting, etc., and supports the shock absorber module 2320.

An accommodation part 2411 in which the steering driving unit 2420 described later is accommodated is provided in the steering body 2410. The accommodation part 2411 according to the present embodiment may be formed to have a form of a groove that is concavely recessed and formed downward from the upper side of the top of the steering body 2410. The design of a detailed cross-sectional form of the accommodation part 2411 may be variously changed depending on a shape of the steering driving unit 2420.

The steering driving unit 2420 is installed in the steering body 2410, and rotatably supports the steering body 2410 with respect to the frame module 100. The steering driving unit 2420 is rotated by using the frame module 100 as an axis upon steering of the vehicle, and rotates the steering body 2410 clockwise or counterclockwise. Accordingly, a steering angle of the wheel 300 connected to the steering body 2410 through the medium of the suspension unit 2300 can be adjusted.

The steering driving unit 2420 according to the present embodiment includes a power generation module 2421, a rotation module 2422, and a power transfer module 2423.

Figure 14:
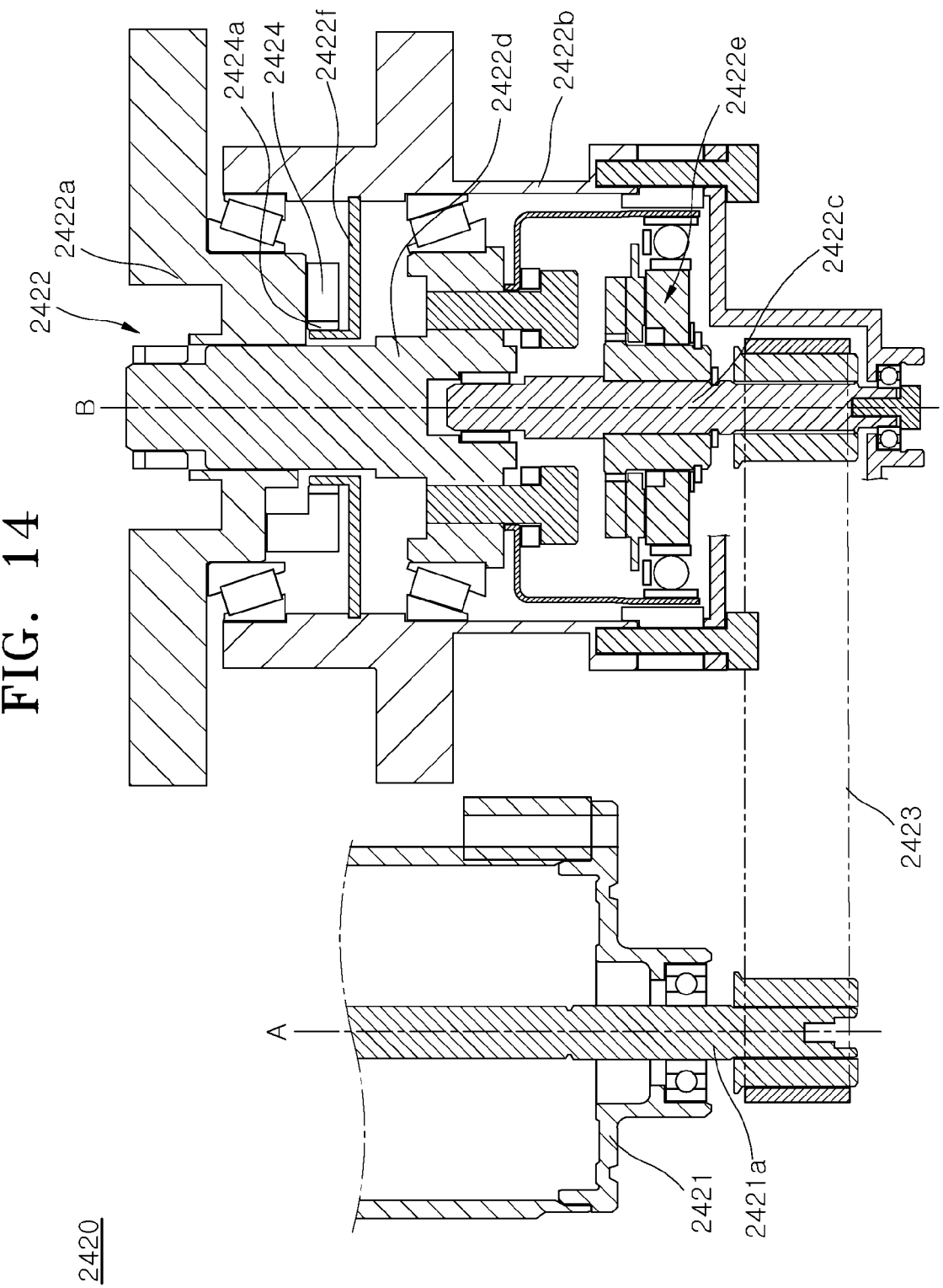
FIG. 14 is a cross-sectional view schematically illustrating a configuration of a steering driving unit according to the first embodiment of the present disclosure.

FIG. 14 is a cross-sectional view schematically illustrating a configuration of the steering driving unit according to the first embodiment of the present disclosure.

Referring to FIG. 14, the steering driving unit 2420 according to the present embodiment includes a power generation module 2421, a rotation module 2422, and a power transfer module 2423.

The power generation module 2421 generates rotatory power by receiving a power source. The power generation module 2421 according to the first embodiment of the present disclosure may be exemplified as various types of electric motors which convert, into rotatory power, a power source applied from the outside and output the rotatory power through a driving shaft 2421a. The power generation module 2421 may be connected to the battery 400 installed in the frame module 100, and may be supplied with the power source from the battery 400.

The power generation module 2421 may be seated on one side of the accommodation part 2411, and may be detachably fixed to the steering body 2410 by bolting, etc. The driving shaft 2421a of the power generation module 2421 is disposed to be placed on the same axis as the central axis A of the power generation module 2421. The central axis A of the power generation module 2421 may be disposed in parallel to the central axis B of the rotation module 2422 described later. However, the power generation module 2421 is not limited to such an example. The power generation module 2421 may be disposed perpendicularly to the central axis B of the rotation module 2422 depending on a detailed structure of the power transfer module 2423 described later.

The rotation module 2422 is rotated by using the frame module 100 as an axis by being interlocked with rotatory power generated by the power generation module 2421. As the rotation module 2422 is rotated by using the frame module 100 as an axis, the rotation module 2422 adjusts a steering angle of the wheel 300 by performing an orbital motion on the power generation module 2421 around the rotation module 2422. Such a detailed operation process of the power generation module 2421 is described later.

The rotation module 2422 is seated on the other side of the accommodation part 2411, and is disposed in a way to be spaced apart from the power generation module 2421. The rotation module 2422 may be detachably fixed to the steering body 2410 by bolting, etc. The rotation module 2422 is connected to the power generation module 2421 through the medium of the power transfer module 2423 described later. The rotation module 2422 may be installed in the steering body 2410 in the state in which the rotation module 2422 has been integratedly accommodated in the same case, etc. along with the power generation module 2421 and the power transfer module 2423 as illustrated in FIG. 14, and may be installed in the steering body 2410 separately from the power generation module 2421 and the power transfer module 2423.

The central axis B of the rotation module 2422 may be disposed on the same plane as a central surface of the wheel 300. In this case, the central surface of the wheel 300 may be exemplified as a plane that belongs to a plane through which the central axis of the wheel 300 perpendicularly penetrates and that symmetrically divides the wheel 300 in the width direction of the vehicle. Accordingly, the central axis of rotation of the rotation module 2422 may coincide with an actual steering axis of the wheel 300, thereby inducing stable steering of the wheel 300.

The rotation module 2422 according to the present embodiment includes a mounting part 2422a, a rotation module body 2422b, an input shaft 2422c, an output shaft 2422d, a deceleration module 2422e, and a steering guide 2422f.

The mounting part 2422a forms an upper external appearance of the rotation module 2422, and is fixed to the lower side of the frame module 100. The mounting part 2422a according to the present embodiment may be formed to have a form of a plate facing parallel to the frame module 100, more specifically, the first mounting plate 1221A or the second mounting plate 1221B. The top of the mounting part 2422a is detachably coupled to the bottom of the first mounting plate 1221A or the second mounting plate 1221B by bolting, etc. The mounting part 2422a is fixed to the bottom of the frame module 100, and generally supports the corner module 200 with respect to the frame module 100.

The rotation module main body 2422b forms a lower external appearance of the rotation module 2422, and is relatively rotatably installed along with the mounting part 2422a. The rotation module main body 2422b according to the present embodiment is formed to have a cylindrical shape having the inside empted, and is installed on the lower side of the mounting part 2422a. The top of the rotation module main body 2422b is rotatably connected to the bottom of the mounting part 2422a through the medium of a bearing, etc. The bottom of the rotation module main body 2422b is seated on the other side of the accommodation part 2411 and supported by the accommodation part 2411. The rotation module main body 2422b may be assembled in a case in which the rotation module main body 2422b is integratedly accommodated along with the power generation module 2421 and the power transfer module 2423, and may be fixed to the steering body 2410. The rotation module main body 2422b may be directly assembled and fixed to the steering body 2410.

The input shaft 2422c is rotatably installed within the rotation module main body 2422b, and is rotated by rotatory power delivered from the power transfer module 2423. The input shaft 2422c according to the present embodiment may be formed to have a form of a shaft in which the central axis thereof is disposed on the same axis as the central axis B of the rotation module 2422. The bottom of the input shaft 2422c protrudes downward from the rotation module main body 2422b, and is connected to the power transfer module 2423.

The output shaft 2422d is rotatably supported by the mounting part 2422a. The output shaft 2422d is rotated by being interlocked with the rotation of the input shaft 2422c, and rotates the steering body 2410 by using the mounting part 2422a as an axis. The output shaft 2422d according to the present embodiment may be formed to have a form of a shaft in which the central axis thereof is disposed on the same axis as the central axis B of the rotation module 2422. The bottom of the output shaft 2422d is relatively rotatably connected to the top of the input shaft 2422c through the medium of a bearing. The top of the output shaft 2422d is rotatably inserted into the bottom of the mounting part 2422a by using the mounting part 2422a as an axis. The output shaft 2422d is connected to the deceleration module 2422e described later, and is rotated by rotatory power delivered from the deceleration module 2422e when the input shaft 2422c is rotated.

The deceleration module 2422e is provided between the input shaft 2422c and the output shaft 2422d, and delivers rotatory power of the input shaft 2422c to the output shaft 2422d. More specifically, the deceleration module 2422e amplifies the size of rotatory power delivered to the output shaft 2422d by decelerating a rotation speed of the input shaft 2422c at a set deceleration ratio, and rotates the output shaft 2422d by outputted rotatory power. The deceleration module 2422e according to the present embodiment may be exemplified as strain wave gearing including a wave generator, a flex spline, or a circular spline.

The steering guide 2422f is extended from the rotation module main body 2422b and is connected to a measurement module 2424 described later. The steering guide 2422f according to the present embodiment may be formed to have a disc shape having a hollow form in which an end of an inner circumference thereof is bent upward, and may be disposed between the rotation module main body 2422b and the output shaft 2422d. The steering guide 2422f has an outer circumferential surface fixed to the inner circumferential surface of the rotation module main body 2422b, and is rotated by using the central axis thereof as an axis along with the rotation module main body 2422b when the rotation module main body 2422b is rotated. An end of the inner circumference of the steering guide 2422f is coupled to an inner diameter part 2424a of the measurement module 2424 described later. The steering guide 2422f rotates the inner diameter part 2424a by being interlocked with the rotation of the rotation module main body 2422b.

The power transfer module 2423 is provided between the power generation module 2421 and the rotation module 2422, and delivers, to the rotation module 2422, rotatory power generated by the power generation module 2421. The power transfer module 2423 according to the present embodiment may be formed to have a form of a belt or chain formed to form a closed curve. The power transfer module 2423 has both ends connected to the ends of the driving shaft 2421a of the power generation module 2421 and the input shaft 2422c of the rotation module 2422, respectively. In this case, the power transfer module 2423 can be prevented from twisting, etc. as the central axis A of the power generation module 2421 is disposed in parallel to the central axis B of the rotation module 2422. When the driving shaft 2421a is rotated, the power transfer module 2423 is moved in a caterpillar way and delivers rotatory power to the input shaft 2422c. However, the power transfer module 2423 is not limited to such a structure. The design of the power transfer module 2423 may be changed in various types of power transfer means which can deliver, to the rotation module 2422, rotatory power generated by the power generation module 2421, such a worm or a worm wheel.

The measurement module 2424 measures a rotation angle of the rotation module 2422 according to the steering of the wheel 300. The measurement module 2424 according to the present embodiment is disposed within the rotation module main body 2422b and fixed to the bottom of the mounting part 2422a. The inner diameter part 2424a capable of being rotated by using the central axis of the measurement module 2424 as an axis is provided in the inner circumferential surface of the measurement module 2424. The inner diameter part 2424a is connected to the steering guide 2422f and rotated along with the steering guide 2422f when the output shaft 2422d is rotated. Upon steering of the vehicle, the measurement module 2424 measures a rotation angle of the rotation module 2422 by measuring an angle at which the inner diameter part 2424a has been rotated on the basis of an initial location of the output shaft 2422d. A detailed form of the measurement module 2424 is not limited to any one, and may be exemplified as various types of steering angle sensors capable of detecting a rotation angle of the output shaft 2422d. The measurement module 2424 transmits data about a measured rotation angle of the rotation module 2422 to a control unit, such as the ECU of the vehicle, that is, a control unit 20 described later, so that the control unit performs rolling control, rotation control, etc. of the vehicle.

Hereinafter, an operating process of the corner module 200 according to the first embodiment of the present disclosure is described in detail.

Figure 15:
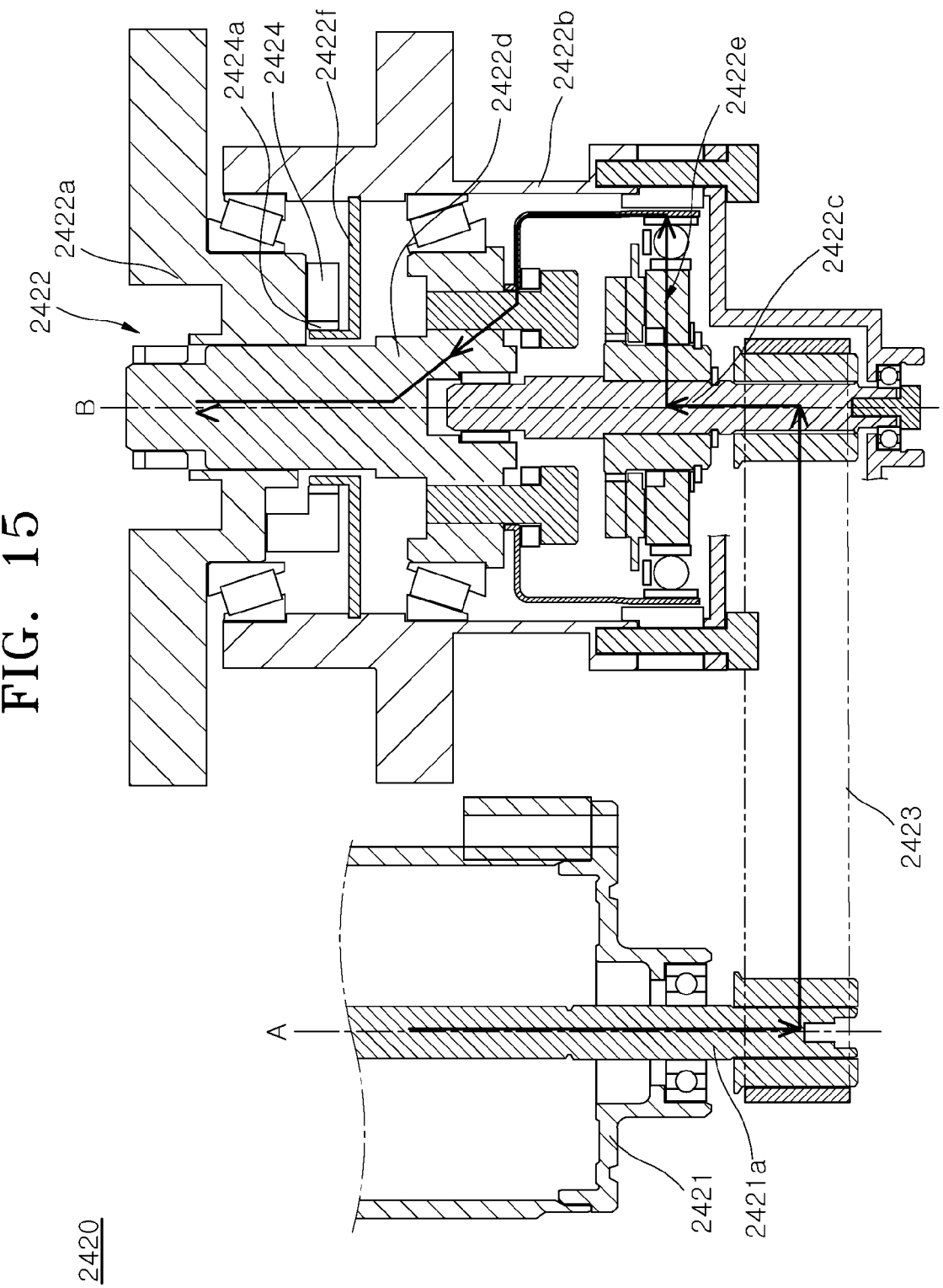
FIGS. 15, 16A and 16B are operation diagrams schematically illustrating an operating process of the corner module according to the first embodiment of the present disclosure.
Figure 16A:
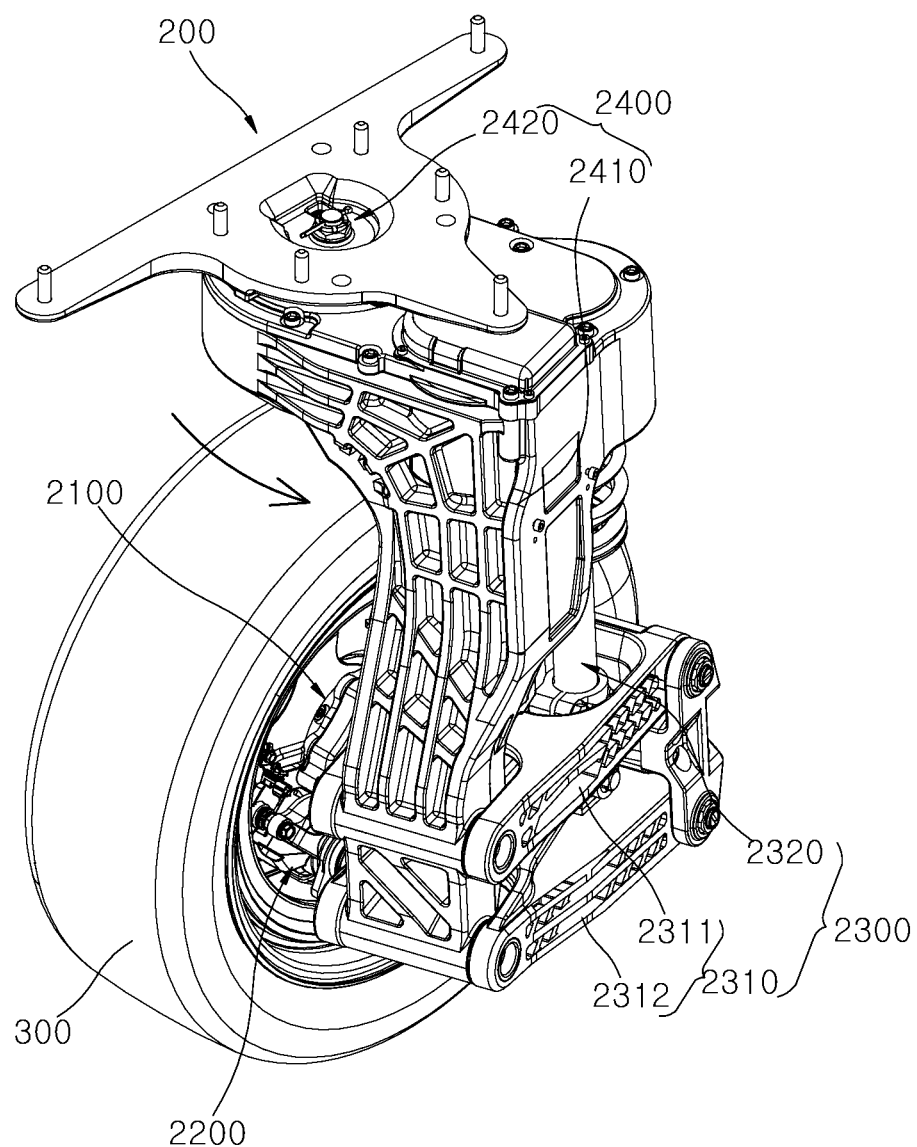
Figure 16B:
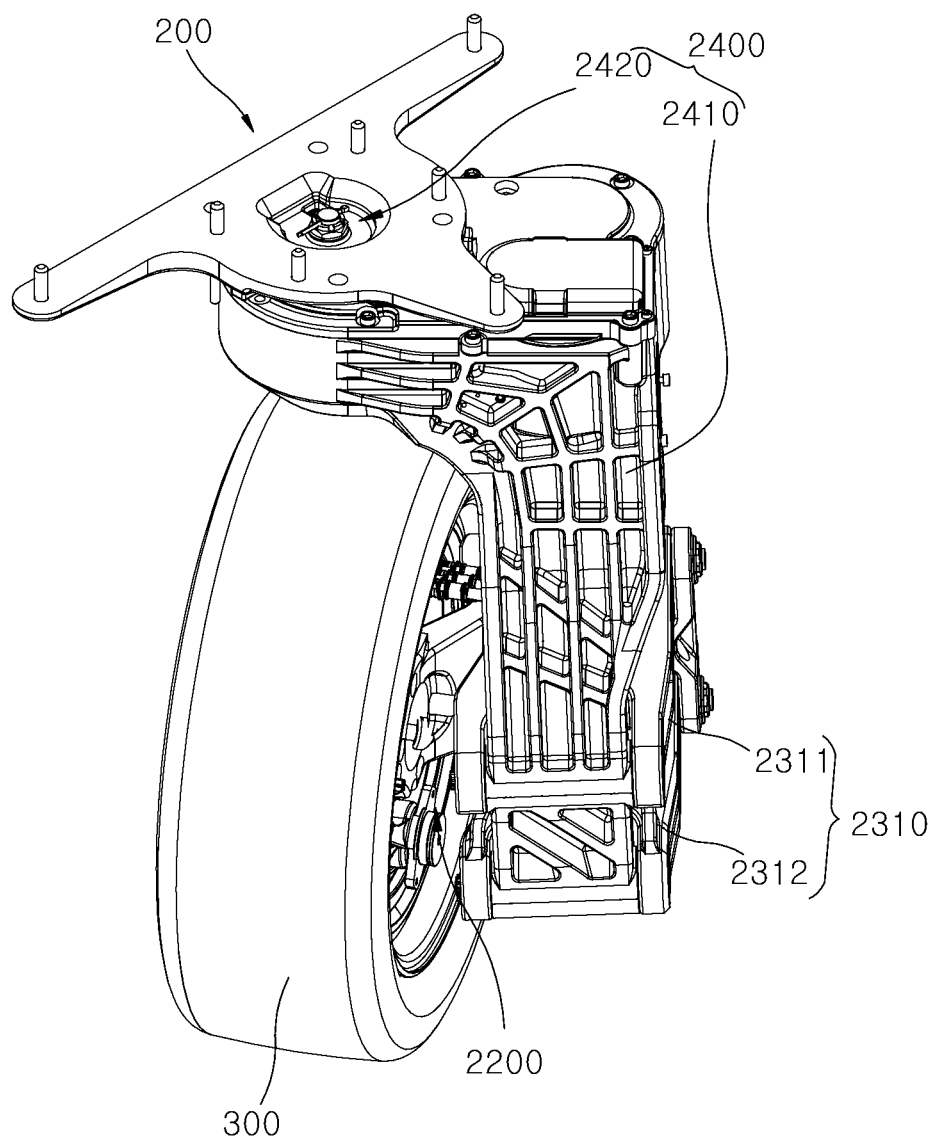

FIGS. 15, 16A and 16B are operation diagrams schematically illustrating an operating process of the corner module according to the first embodiment of the present disclosure.

When a vehicle requires rotation driving while driving, the driving shaft 2421a is rotated by the power generation module 2421, and rotatory power is generated.

The power transfer module 2423 is moved in a caterpillar way by the rotation of the driving shaft 2421a, and delivers the rotatory power of the power generation module 2421 to the rotation module 2422.

The rotatory power delivered to the rotation module 2422 is delivered to the output shaft 2422d sequentially through the input shaft 2422c and the deceleration module 2422e.

More specifically, the elliptical cam of a wave generator of the deceleration module 2422e is rotated by the rotatory power of the input shaft 2422c.

Thereafter, the flex spline is rotated while generating elastic deformation. Accordingly, locations of the teeth of a gear on the outer circumferential surface of the flex spline partially engaged with the teeth of a gear on the inner circumferential surface of the circular spline are sequentially moved.

When the elliptical cam is rotated once, the flex spline is moved in a direction opposite to the rotation direction of the elliptical cam by a difference between the number of teeth of the gear on the outer circumferential surface of the flex spline and the number of teeth of the gear on the inner circumferential surface of the flex spline.

Accordingly, the output shaft 2422d coupled with the flex spline is rotated in a direction opposite to the rotation direction of the input shaft 2422c at a reduced rotation speed than a rotation speed of the input shaft 2422c.

The output shaft 2422d is rotated by using the mounting part 2422a fixed to the first mounting plate 1221A or the second mounting plate 1221B, more specifically, the central axis B of the rotation module 2422 as an axis.

As the output shaft 2422d is rotated by using the central axis B of the rotation module 2422 as an axis, the rotation module main body 2422b integrated with the output shaft 2422d and the steering body 2410 are also rotated by using the central axis B of the rotation module 2422 as an axis.

Accordingly, the power generation module 2421 spaced apart from the central axis B of the rotation module 2422 at a predetermined interval performs an orbital motion around the central axis B of the rotation module 2422.

Rotatory power generated as the steering body 2410 is rotated is delivered to the wheel 300 sequentially through the suspension unit 2300 and the driving unit 2100.

As the central axis B of the rotation module 2422 is disposed on the same plane as the central surface of the wheel 300, the wheel 300 is rotated by the delivered rotatory power by using the central axis B of the rotation module 2422 as an axis. The wheel 300 has its steering angle adjusted and rotates and drives the vehicle.

Hereinafter, a configuration of the corner module 200 according to a second embodiment of the present disclosure is described in detail.

Figure 17:
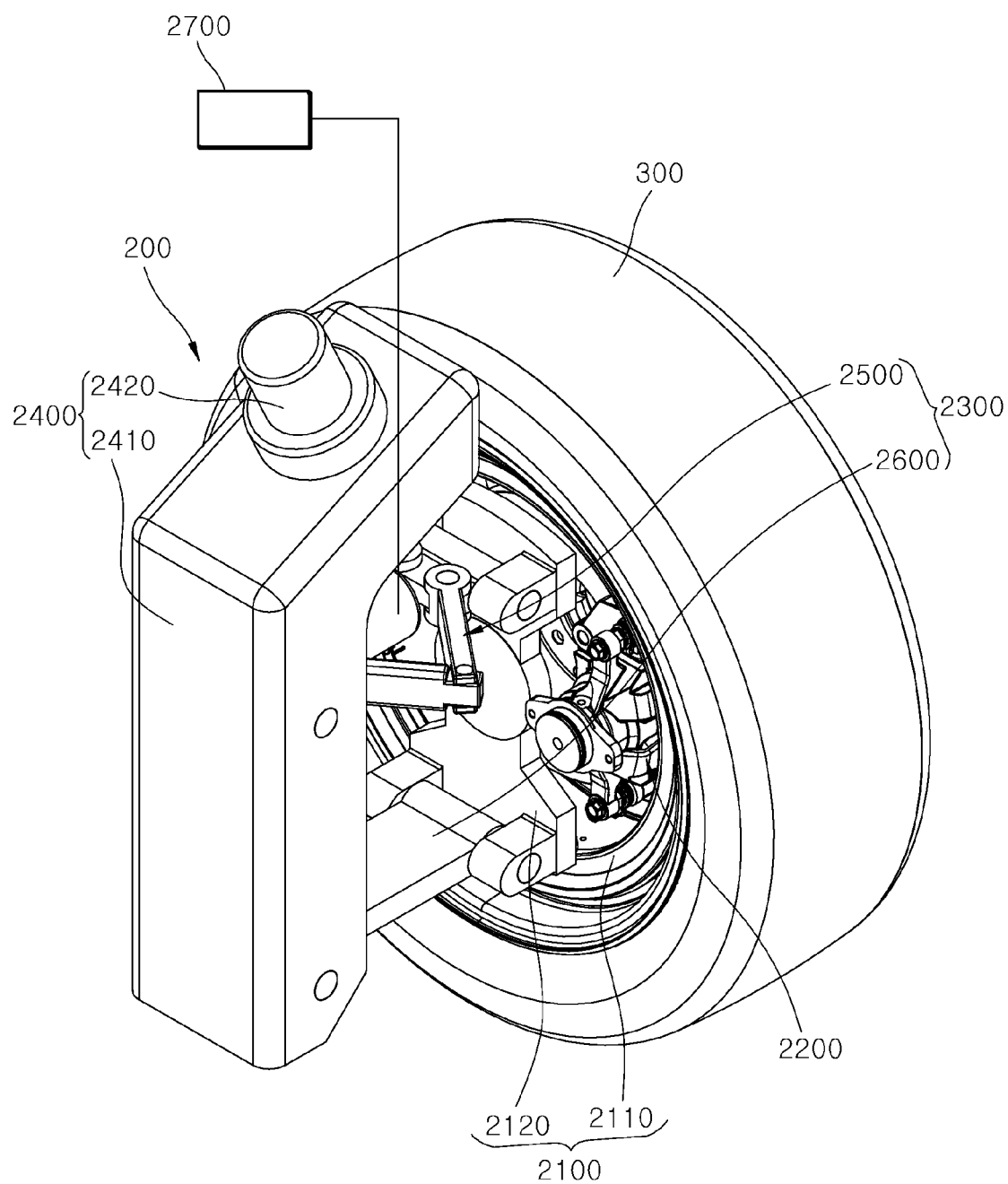
FIG. 17 is a perspective view schematically illustrating a configuration of a corner module according to a second embodiment of the present disclosure.
Figure 18:
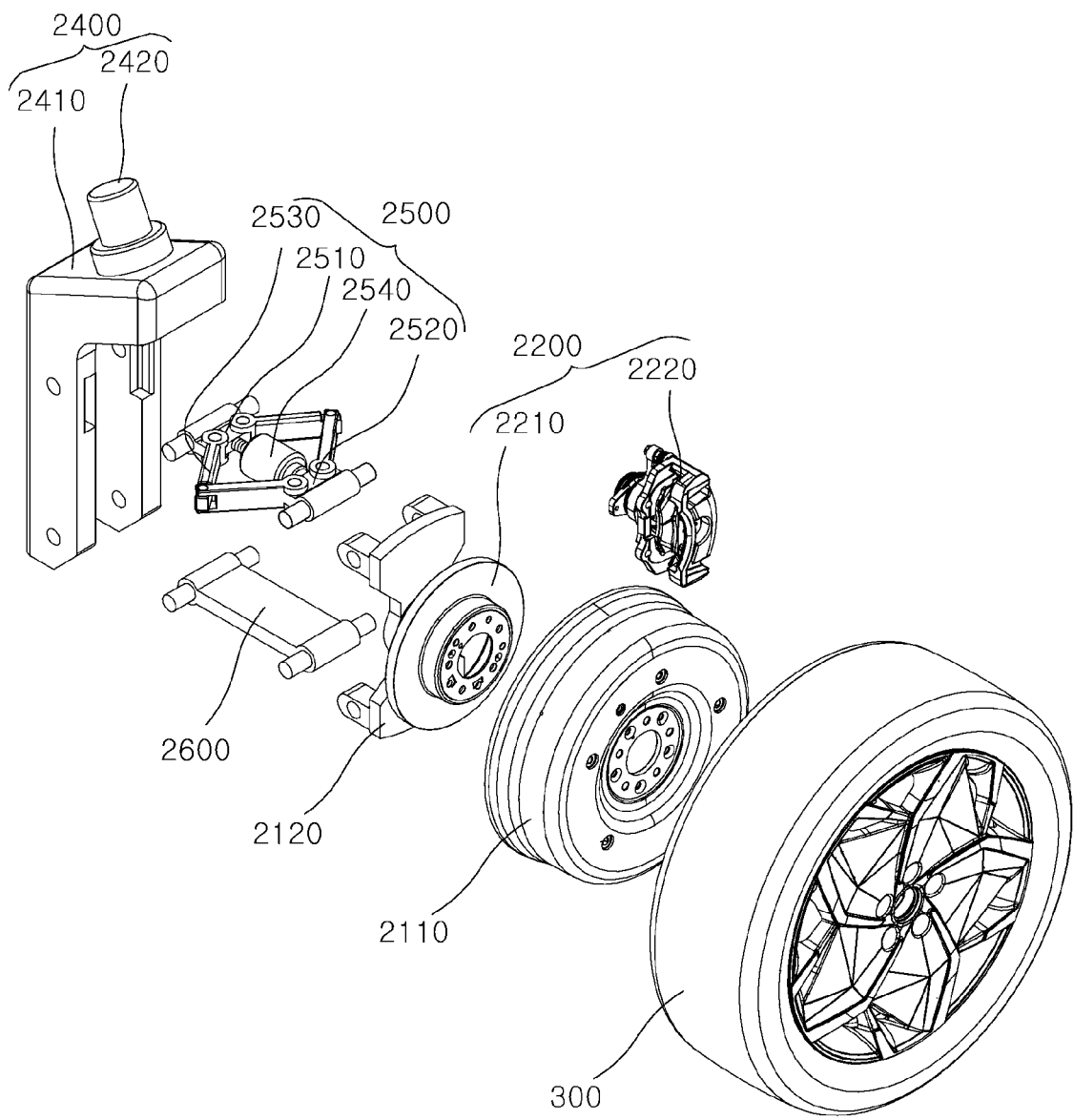
FIG. 18 is an exploded perspective view schematically illustrating a configuration of the corner module according to the second embodiment of the present disclosure.
Figure 19:
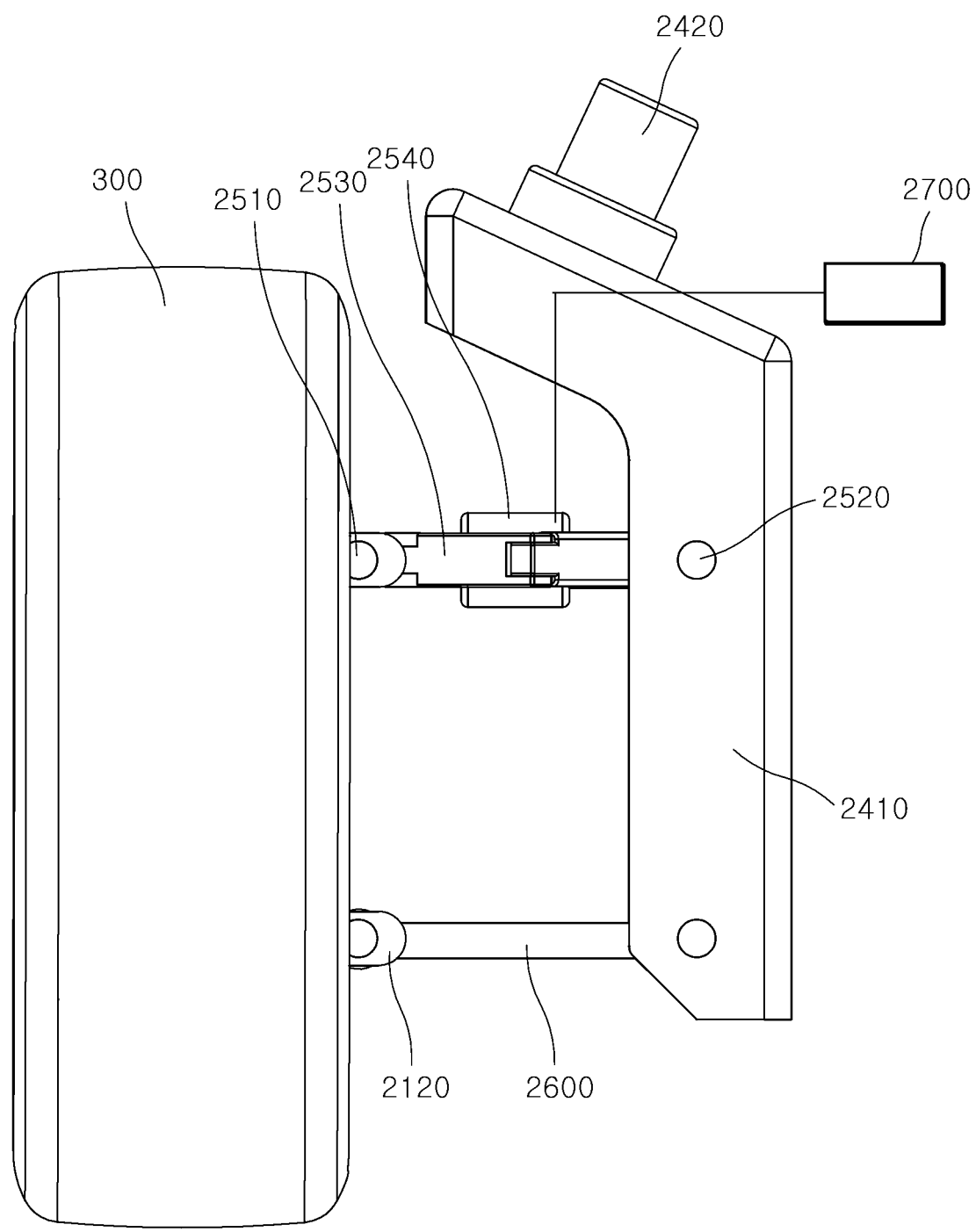
FIG. 19 is a front view schematically illustrating a configuration of the corner module according to the second embodiment of the present disclosure.

FIG. 17 is a perspective view schematically illustrating a configuration of the corner module according to the second embodiment of the present disclosure. FIG. 18 is an exploded perspective view schematically illustrating a configuration of the corner module according to the second embodiment of the present disclosure. FIG. 19 is a front view schematically illustrating a configuration of the corner module according to the second embodiment of the present disclosure.

Referring to FIGS. 17 to 19, the corner module 200 according to the second embodiment of the present disclosure includes a driving unit 2100, a braking unit 2200, a suspension unit 2300, a steering unit 2400, and an arm control unit 2700.

The driving unit 2100 rotates a wheel 300 by providing driving power to the wheel 300.

The driving unit 2100 according to the second embodiment of the present disclosure includes an in-wheel motor 2110 and a knuckle 2120.

The in-wheel motor 2110 is installed in the inner side of the wheel 300 and generates driving power. The in-wheel motor 2110 according to the present embodiment may be configured to include a stator that is fixed within the wheel 300 and that forms a magnetic field by receiving a power source from the battery 400 and a rotor that is rotatably installed within the wheel 300 and that rotates the wheel 300 by an electromagnetic interaction with the stator. The stator and the rotor may have their central axis disposed on the same line as the central axis of the wheel 300, and may be disposed in a concentric form from the inner side of the wheel 300 in a way to be stacked with each other.

The knuckle 2120 is coupled with the in-wheel motor 2110, and is provided to mechanically connect the driving unit 2100, and the braking unit 2200 and the suspension unit 2300 described later. The knuckle 2120 according to the present embodiment may be coupled and supported by the stator of the in-wheel motor 2110 through by bolting, etc. The knuckle 2120 may rotatably support the rotor of the in-wheel motor 2110 through the medium of a wheel bearing etc. The knuckle 2120 may be fabricated by molding a metal-series material through casting, etc. in order to secure sufficient stiffness. The knuckle 2120 is disposed in a way that both ends thereof are spaced apart from each other in up and down directions on the basis of the central axis of the wheel 300, that is, in a direction perpendicular to the ground. The up and down ends of the knuckle 2120 rotatably support an upper arm module 2500 and a lower arm module 2600 described later, respectively. A detailed shape of the knuckle 2120 is not limited to the shape illustrated in FIG. 18. The design of the knuckle 2120 may be changed in various shapes which are coupled with the in-wheel motor 2110 and can support the upper arm module 2500 and the lower arm module 2600 described later.

The braking unit 2200 applies or releases braking power by being interrupted by the rotation of the wheel 300.

The braking unit 2200 according to the second embodiment of the present disclosure includes a brake disk 2210 and a brake caliper 2220.

The brake disk 2210 is connected to the wheel 300 or the in-wheel motor 2110 and is rotated while being interlocked with the rotation of the wheel 300. The brake disk 2210 according to the second embodiment of the present disclosure is formed to have a disc shape and installed in the inner side of the wheel 300. The brake disk 2210 is disposed to have its central axis placed on the same line as the central axis of the wheel 300. The brake disk 2210 may be integratedly connected with the wheel 300 or the rotor of the in-wheel motor 2110 by bolting, etc. Accordingly, when the wheel 300 is rotated, the brake disk 2210 may be rotated by using the central axis as an axis along with the wheel 300. The design of the diameter of the brake disk 2210 may be variously changed depending on the diameter of the wheel 300, the size of the in-wheel motor 2110, etc.

Upon braking of the vehicle, the brake caliper 2220 applies braking power by pressurizing the brake disk 2210. The brake caliper 2220 according to the present embodiment may be configured to include a brake pad disposed to face the brake disk 2210, a caliper housing coupled with the knuckle 2120 and movably supporting the brake pad, and a piston that is movably installed in the caliper housing in a way to advance and retreat and that pressurizes the brake pad toward the brake disk 2210 or releases the pressing of the brake pad in a moving direction thereof.

The suspension unit 2300 is connected to the driving unit 2100, and is provided to absorb an impact delivered from a road surface while the vehicle drives and also adjust a camber angle of the wheel 300.

The suspension unit 2300 according to the present embodiment includes an upper arm module 2500 and a lower arm module 2600.

The upper arm module 2500 is connected to the driving unit 2100, and absorbs an impact applied from a road surface to the wheel 300 while the vehicle drives along with the lower arm module 2600 described later. That is, the upper arm module 2500 connects the wheel 300 to a vehicle body, and also plays a role in absorbing weight applied from the wheel 300 while the vehicle drives by its own stiffness and adjusting a movement of the wheel 300. The upper arm module 2500 is provided to be adjustable in length to vary a camber angle of the wheel 300. More specifically, the upper arm module 2500 is connected to the upper side of the driving unit 2100. The upper arm module 2500 has its length varied in the width direction of the vehicle and adjusts an inclination of the wheel 300 to the ground.

Figure 20:
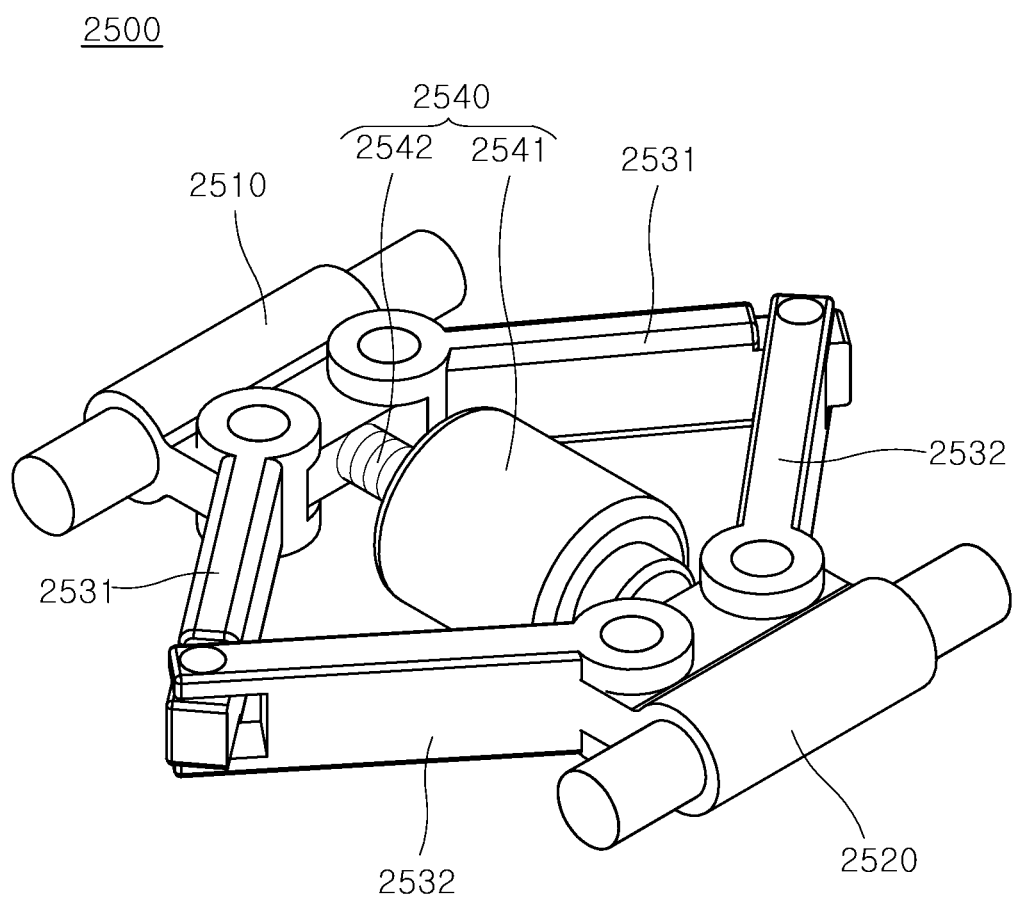
FIG. 20 is a perspective view schematically illustrating a configuration of an upper arm module according to the second embodiment of the present disclosure.

FIG. 20 is a perspective view schematically illustrating a configuration of the upper arm module according to the second embodiment of the present disclosure.

Referring to FIGS. 17 to 20, the upper arm module 2500 according to the present embodiment includes a first upper bracket 2510, a second upper bracket 2520, an upper link unit 2530, and a first driving module 2540.

The first upper bracket 2510 is rotatably connected to the driving unit 2100. The first upper bracket 2510 according to the present embodiment is rotatably connected to the top of the knuckle 2120 provided in the driving unit 2100. The first upper bracket 2510 may be rotatably connected to the top of the knuckle 2120 by hinge coupling, pin coupling, etc. In this case, the first upper bracket 2510 is rotatably supported by using, as an axis, a direction parallel to the length direction of the vehicle so that the first upper bracket 2510 can be rotated in accordance with up and down movements of the wheel 300. A detailed shape of the first upper bracket 2510 is not limited to the shape illustrated in FIG. 20. The design of the first upper bracket 2510 may be variously changed within the technical spirit of a shape which may be rotatably connected to the top of the knuckle 2120.

The second upper bracket 2520 is rotatably connected to the steering unit 2400 and is disposed to be spaced apart from the first upper bracket 2510. The second upper bracket 2520 according to the present embodiment is rotatably connected to the inside of a steering body 2410 provided in the steering unit 2400. The second upper bracket 2520 may be rotatably connected to the inside of the steering body 2410 by hinge coupling, pin coupling, etc. In this case, the second upper bracket 2520 is rotatably supported by using, as an axis, a direction parallel to the length direction of the vehicle so that the second upper bracket 2520 is rotated in accordance with up and down movements of the wheel 300. The second upper bracket 2520 is spaced apart from the first upper bracket 2510 at a predetermined interval in the width direction of the vehicle, and is disposed to face the first upper bracket 2510. The second upper bracket 2520 may be disposed at the same height as the first upper bracket 2510. A detailed shape of the second upper bracket 2520 is not limited to the shape illustrated in FIG. 20. The design of the second upper bracket 2520 may be variously changed within the technical spirit of a shape which may be rotatably connected to the inside of the steering body 2410.

The upper link unit 2530 is installed between the first upper bracket 2510 and the second upper bracket 2520, and the size of an internal angle thereof is adjustably provided. As the size of the internal angle of the upper link unit 2530 is changed by the first driving module 2540 described later, the upper link unit 2530 varies a relative distance between the first upper bracket 2510 and the second upper bracket 2520.

The upper link unit 2530 according to the present embodiment includes a pair of first upper links 2531 and a pair of second upper links 2532.

The pair of first upper links 2531 is formed to have a rod form, and has one ends rotatably connected to the first upper bracket 2510. The pair of first upper links 2531 may have the one ends rotatably connected to the first upper bracket 2510 by pin coupling, hinge coupling, etc. The pair of first upper links 2531 may be rotatably supported by using, as an axis, a direction that perpendicularly penetrates the top and bottom surfaces of the first upper bracket 2510. The pair of first upper links 2531 may be formed to have the same length. The pair of first upper links 2531 may be slantly disposed in opposite directions on the basis of a central part of the first upper bracket 2510 or a first lead screw 2542 described later. In this case, angles of the pair of first upper links 2531 that are inclined on the basis of the central part of the first upper bracket 2510 may be identically set. The pair of first upper links 2531 is rotated in opposite directions by an operation of the first driving module 2540 described later, and varies a relative distance between the first upper bracket 2510 and the second upper bracket 2520.

The pair of second upper links 2532 is formed to have a rod form, and has one ends rotatably connected to the second upper bracket 2520. The pair of second upper links 2532 may have the one ends rotatably connected to the second upper bracket 2520 by pin coupling, hinge coupling, etc. The pair of second upper links 2532 may be rotatably supported by using, as an axis, a direction that perpendicularly penetrates the top and bottom surfaces of the second upper bracket 2520. The pair of second upper links 2532 may be formed to have the same length. The pair of second upper links 2532 may be slantly disposed in opposite directions on the basis of a central part of the second upper bracket 2520 or the first lead screw 2542 described later. In this case, angles of the pair of second upper links 2532 that are inclined on the basis of the central part of the second upper bracket 2520 may be identically set. The pair of second upper links 2532 is rotated in opposite directions by an operation of the driving module 2540 described later, and varies a relative distance between the first upper bracket 2510 and the second upper bracket 2520. The other ends of the pair of second upper links 2532 are rotatably connected to the other ends of the pair of first upper links 2531, respectively, by pin coupling, hinge coupling, etc. Accordingly, the pair of first upper links 2531 and the pair of second upper links 2532 may be connected to form an approximately pantograph form.

The first driving module 2540 is installed between the first upper bracket 2510 and the second upper bracket 2520. The first driving module 2540 varies a relative distance between the first upper bracket 2510 and the second upper bracket 2520 by adjusting the size of an internal angle of the upper link unit 2530 by its own driving power.

Figure 21:
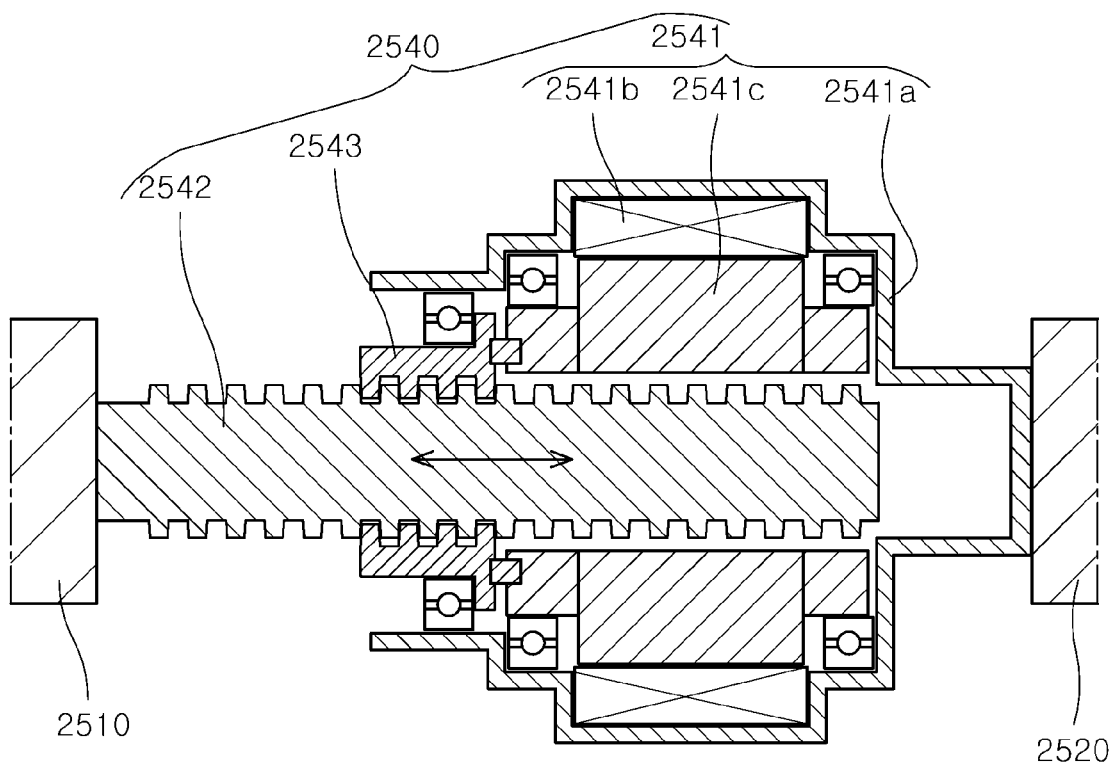
FIG. 21 is a cross-sectional view schematically illustrating a configuration of a first driving module according to the second embodiment of the present disclosure.

FIG. 21 is a cross-sectional view schematically illustrating a configuration of the first driving module according to the second embodiment of the present disclosure.

Referring to FIGS. 17 to 21, the first driving module 2540 according to the present embodiment includes a first actuator 2541, the first lead screw 2542, and a second nut screw 2543.

The first actuator 2541 generates rotatory power by receiving a power source from the outside. The first actuator 2541 according to the present embodiment generates the rotatory power by receiving the power source from a battery 400, etc. of a vehicle.

The first actuator 2541 may be exemplified as a hollow motor. More specifically, in the present embodiment, the first actuator 2541 may include a first motor housing 2541a, a first stator 2541b fixed to the first motor housing 2541a, and a first rotor 2541c having a hollow form, which is disposed on the same axis as the first stator 2541b and is rotated by using a central axis thereof as an axis by an electromagnetic interaction with the first stator 2541b.

The first actuator 2541 may be fixed to any one of the first upper bracket 2510 or the second upper bracket 2520. Hereinafter, as illustrated in FIGS. 20 and 21, an example in which the first actuator 2541 is fixed to the second upper bracket 2520 will be described, but the first actuator 2541 may be fixed to the first upper bracket 2510. The first actuator 2541 may be directly fixed to the second upper bracket 2520 by welding, bolting, etc. and may be fixed to the second upper bracket 2520 by separate fixing means (not illustrated).

The first lead screw 2542 is installed in the first actuator 2541 in a way to advance and retreat. The first lead screw 2542 advances and retreats in a direction parallel to an axial direction of the first actuator 2541 by being interlocked with rotatory power generated from the first actuator 2541. The first lead screw 2542 widens or narrows an interval between the first upper bracket 2510 and the second upper bracket 2520 in a moving direction thereof.

The first lead screw 2542 according to the present embodiment may be formed to have a rod form equipped with screw threads on an outer circumferential surface thereof. A rear end (a right end on the basis of FIG. 21) of the first lead screw 2542 is inserted into the first rotor 2541c. In this case, the outer circumferential surface of the first lead screw 2542 may be disposed to be spaced apart from an inner circumferential surface of the first rotor 2541c at a predetermined interval. A front end (a left end on the basis of FIG. 21) of the first lead screw 2542 is fixed to the other of the first upper bracket 2510 or the second upper bracket 2520. In the present embodiment, as the first actuator 2541 is fixed to the second upper bracket 2520, the front end of the first lead screw 2542 may be fixed to the first upper bracket 2510. The front end of the first lead screw 2542 may be directly fixed to the first upper bracket 2510 by welding, bolting, etc., and may be fixed to the first upper bracket 2510 by separate fixing means (not illustrated).

The length of the front end of the first lead screw 2542 that protrudes from the first actuator 2541 is varied by the first nut screw 2543 described later when the first actuator 2541 operates. An interval between the first upper bracket 2510 and the second upper bracket 2520 is widened or narrowed in proportion to the length of the front end of the first lead screw 2542 that protrudes form the first actuator 2541.

The first nut screw 2543 converts a rotary motion of the first actuator 2541 in a rectilineal and reciprocating motion of the lead screw 2542. The first nut screw 2543 according to the present embodiment may be formed to have a cylindrical shape having a hollow form equipped with screw threads on an inner circumferential surface thereof. The first nut screw 2543 is disposed to have a central axis disposed on the same axis as the central axis of the first rotor 2541c. A rear end (a right end on the basis of FIG. 21) of the first nut screw 2543 is connected to the front end (a left right end on the basis of FIG. 21) of the first rotor 2541c, and is rotated by using the central axis as an axis along with the first rotor 2541c when the first rotor 2541c is rotated. An inner circumferential surface of the first nut screw 2543 is screwed to the outer circumferential surface of the first lead screw 2542. Accordingly, the first lead screw 2542 is rotated along with the first rotor 2541c, and may straightly move the first lead screw 2542 forward or backward. Furthermore, although an operation of the first actuator 2541 is stopped, the interval between the first upper bracket 2510 and the second upper bracket 2520 can be prevented from being randomly changed because the backlashing of the first lead screw 2542 is limited due to a friction force according to the screwing to the first nut screw 2543.

The lower arm module 2600 is connected to the driving unit 2100, and is disposed to be spaced apart from the upper arm module 2500. The lower arm module 2600 absorbs an impact applied from a road surface to the wheel 300 while the vehicle drives along with the upper arm module 2500. More specifically, the lower arm module 2600 connects the wheel 300 to a vehicle body, and also plays a role in absorbing weight applied to the wheel 300 while the vehicle drives by its own stiffness and adjusting a movement of the wheel 300.

The lower arm module 2600 according to the present embodiment may be formed to have a rod form having a length direction extended in the width direction of the vehicle. The lower arm module 2600 may have both ends rotatably connected to the bottom of the knuckle 2120 provided in the driving unit 2100 and the inside of a steering body 2410 provided in the steering unit 2400, respectively, by hinge coupling, pin coupling, etc. The lower arm module 2600 is disposed to be spaced apart from the upper arm module 2500 in up and down directions, that is, a direction perpendicular to the ground. Both ends of the lower arm module 2600 are rotatably supported by using, as an axis, a direction parallel to the length direction of the vehicle so that the lower arm module 2600 is rotated in accordance with up and down movements of the wheel 300.

Although not illustrated in FIGS. 17 to 19, the suspension module 2300 according to the present embodiment may further include the shock absorber module 2320 illustrated in FIGS. 9 to 13.

The contents of the shock absorber module 2320 described on the basis of the contents illustrated in FIGS. 9 to 13 according to the first embodiment of the present disclosure may be applied to the shock absorber module 2320 according to the present embodiment without any change, with respect to the remaining elements except arrangement and coupling structures of the shock absorber module 2320.

The shock absorber module 2320 according to the present embodiment is installed within the steering body 2410 described later. The shock absorber module 2320 may have both ends supported within the steering body 2410 by separate support means (not illustrated). The shock absorber module 2320 may be disposed at a location that does not interfere with the upper arm module 2500 and the lower arm module 2600 within the steering body 2410.

The steering unit 2400 supports the suspension unit 2300, and is rotatably connected to the lower side of the frame module 100. The steering unit 2400 is rotated clockwise or counterclockwise by using the frame module 100 as an axis, and adjusts a steering angle of the wheel 300. The steering unit 2400 is disposed under the frame module 100, and can prevent a part of the structure of the corner module 200 from protruding upward from the frame module 100. Accordingly, a spatial or shape problem upon vehicle body mounting design, package, and vehicle design can be solved.

The steering unit 2400 according to the present embodiment includes the steering body 2410 and a steering driving unit 2420.

The steering body 2410 is disposed to face the bottom of the frame module 100, and rotatably supports the suspension unit 2300, more specifically, the upper arm module 2500 and the lower arm module 2600. The steering body 2410 according to the present embodiment has a length direction extended in a direction parallel to the height direction of the vehicle. The area of the top of the steering body 2410 is formed to be larger than the area of the bottom thereof. Accordingly, the steering body 2410 may be formed to have an approximately "i" cross-sectional form. A side of the steering body 2410 that faces the upper arm module 2500 and the lower arm module 2600 is formed to be opened. As described above, one ends of the second upper bracket 2520 provided in the upper arm module 2500 and the lower arm module 2600 may be rotatably connected to the inside of the steering body 2410 at locations in which the one ends have been spaced apart from each other, respectively, in up and down directions.

The steering driving unit 2420 is installed in the steering body 2410, and rotatably supports the steering body 2410 with respect to the frame module 100. Upon steering of the vehicle, the steering driving unit 2420 is rotated by using the frame module 100 as an axis, and rotates the steering body 2410 clockwise or counterclockwise. Accordingly, a steering angle of the wheel 300 connected to the steering body 2410 through the medium of the suspension unit 2300 can be adjusted.

The steering driving unit 2420 according to the present embodiment may have the same configuration as the steering driving unit 2420 according to the first embodiment of the present disclosure. Accordingly, the contents of the steering driving unit 2420 described on the basis of the contents illustrated in FIG. 14 according to the first embodiment of the present disclosure may be applied to the steering driving unit 2420 according to the present embodiment without any change.

The arm control unit 2700 adjusts a camber angle of the wheel 300 by controlling an operation of the upper arm module 2500.

Figure 22:
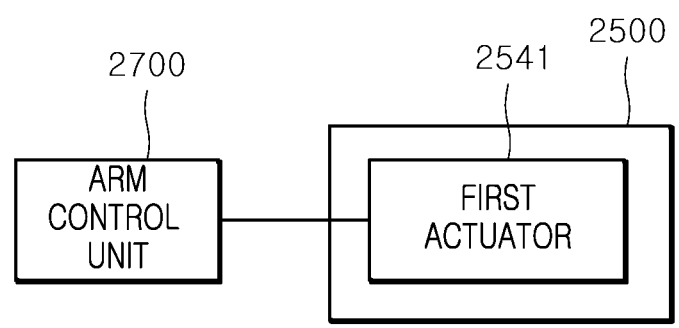
FIG. 22 is a block diagram schematically illustrating a configuration of an arm control unit according to the second embodiment of the present disclosure.

FIG. 22 is a block diagram schematically illustrating a configuration of an arm control unit according to the second embodiment of the present disclosure.

Referring to FIG. 22, the arm control unit 2700 according to the present embodiment is electrically connected to the first actuator 2541, and adjusts a camber angle of the wheel 300 by controlling whether to operate the first actuator 2541 and a direction, size, etc. of rotatory power generated from the first actuator 2541. The arm control unit 2700 is connected to a manipulation panel of a vehicle, a terminal of a user, etc. in a wired or wireless way, and may receive an input of a user about the adjustment of a camber angle of the wheel 300. The arm control unit 2700 may be implemented as an electronic control unit (ECU), a central processing unit (CPU), a processor, or a system on chip (SoC), and may control a plurality of hardware or software components by driving an operating system or an application and perform various data processing and operations. The arm control unit 2700 may be configured to execute at least one instruction stored in a memory and store data, that is, a result of the execution, in the memory.

Hereinafter, an operating process of the corner module 200 according to the second embodiment of the present disclosure is described in detail.

Figure 23:
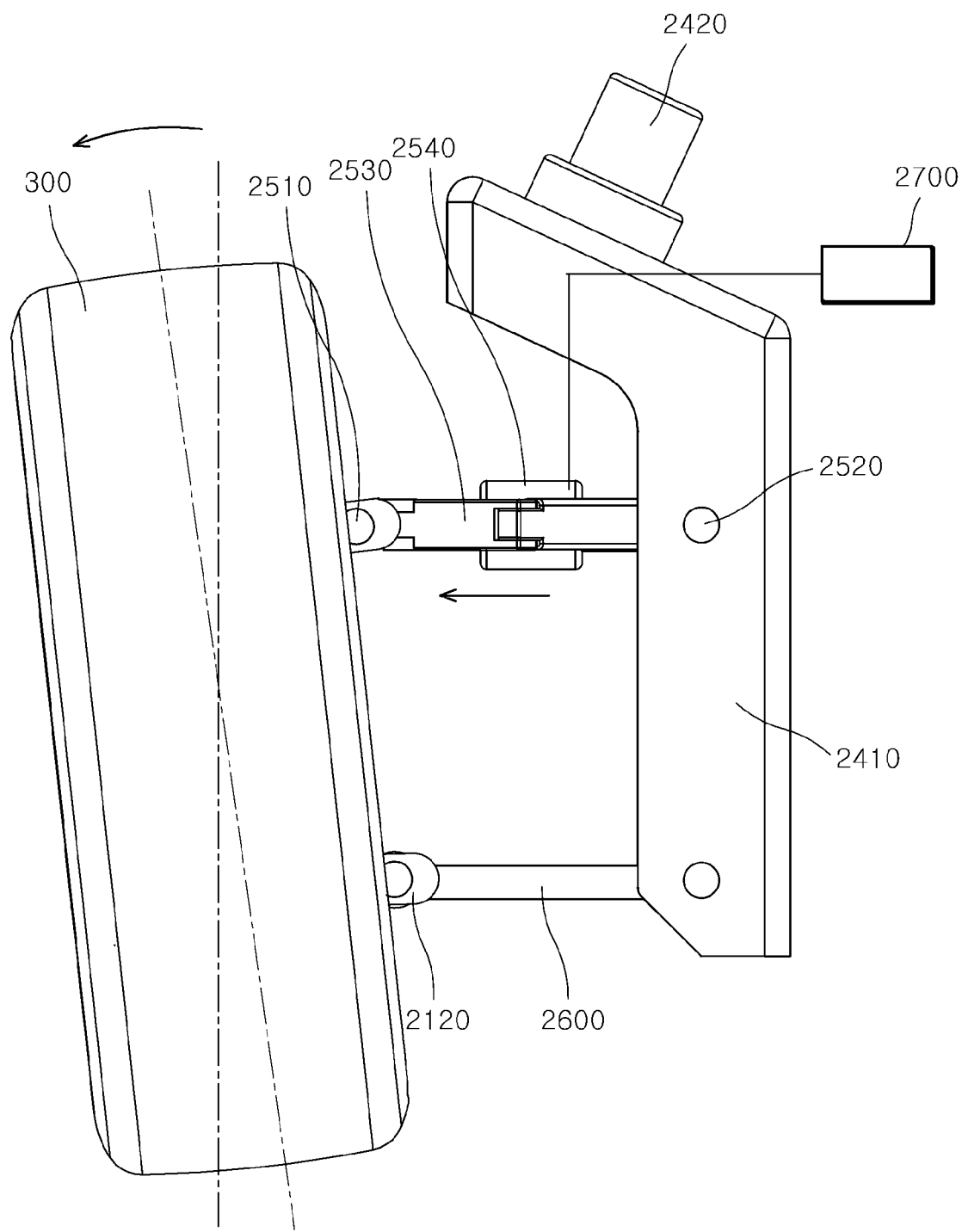
FIGS. 23 and 24 are operation diagrams schematically illustrating an operating process of the corner module according to the second embodiment of the present disclosure.
Figure 24:
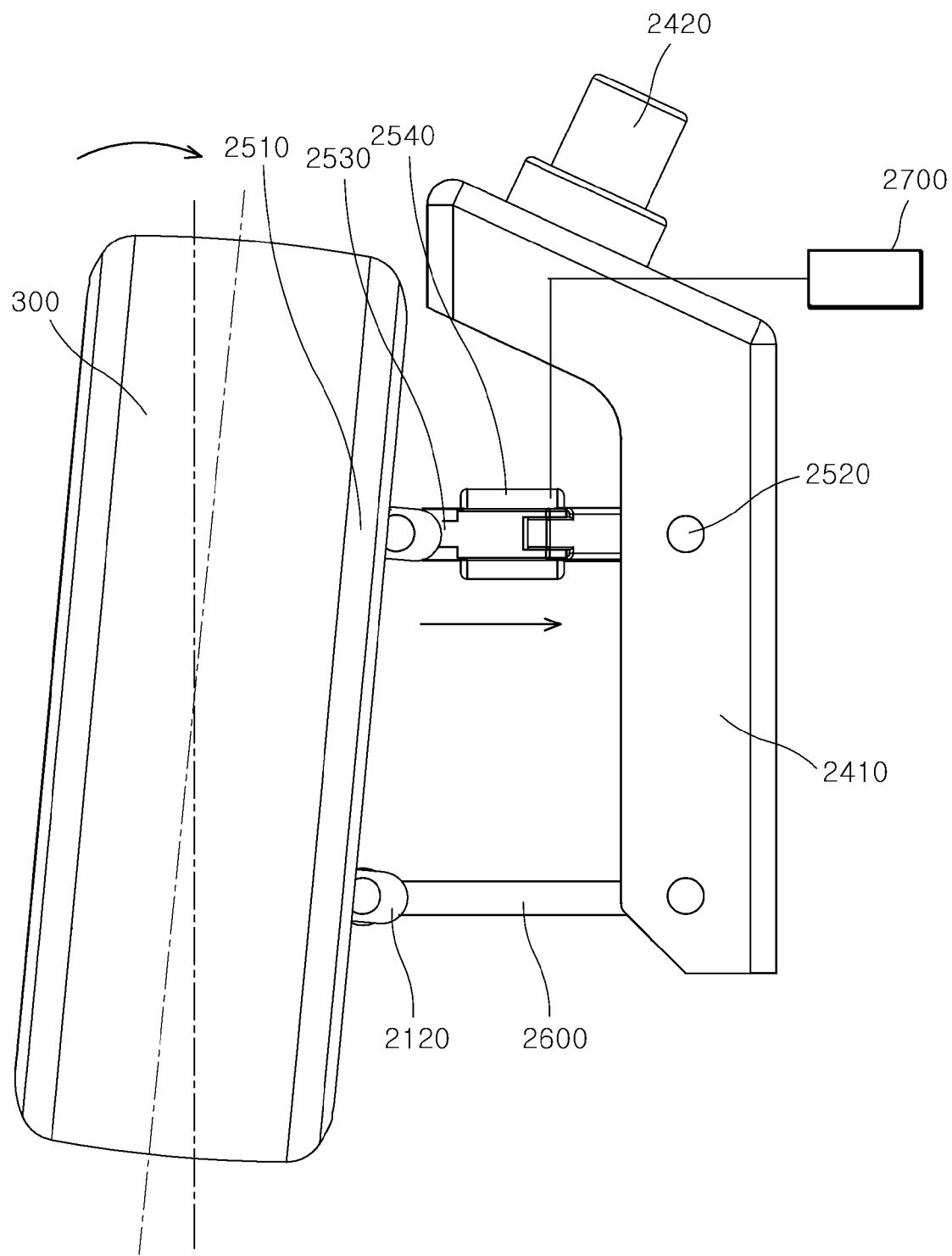

FIGS. 23 and 24 are operation diagrams schematically illustrating an operating process of the corner module according to the second embodiment of the present disclosure.

Referring to FIG. 23, if a camber angle of the wheel 300 is to be increased, the arm control unit 2700 drives the first actuator 2541 by receiving an input signal from a user.

The first actuator 2541 rotates the first nut screw 2543 in any one of clockwise and counterclockwise directions by generating rotatory power.

The front end of the first lead screw 2542 is linearly moved toward the outside of a vehicle in the width direction thereof by being interlocked with the rotation of the first nut screw 2543. That is, the first lead screw 2542 is linearly moved in a direction in which the length of the front end protruding from the first actuator 2541 is increased, and varies the size of an internal angle of the upper link unit 2530.

More specifically, an angle between the one ends of the pair of first upper links 2531 connected to the first upper bracket 2510 and an angle between the one ends of the pair of second upper links 2532 connected to the second upper bracket 2520 are decreased by the linear movement of the first lead screw 2542. At the same time, angles formed by the other ends of the first upper links 2531 and the second upper links 2532 are increased.

By such a change in the angles of the first upper links 2531 and the second upper links 2532, the first upper bracket 2510 is relatively moved toward the outside of the vehicle in the width direction thereof with respect to the second upper bracket 2520, and a relative distance between the first upper bracket 2510 and the second upper bracket 2520 is increased.

As the first upper bracket 2510 connected to the top of the knuckle 2120 is moved toward the outside of the vehicle in the width direction thereof, the first upper bracket 2510 pressurizes the top of the wheel 300 toward the outside of the vehicle in the width direction thereof.

By the pressure applied from the first upper bracket 2510, the wheel 300 is inclined toward the outside of the vehicle in the width direction thereof on the basis of an axis perpendicular to the ground and a camber angle thereof is increased.

Referring to FIG. 24, if a camber angle of the wheel 300 is to be decreased, the arm control unit 2700 drives the first actuator 2541 by receiving an input signal from a user.

The first actuator 2541 rotates the first nut screw 2543 in any one of clockwise and counterclockwise directions by generating rotatory power.

The front end of the first lead screw 2542 is linearly moved toward the inside of the vehicle in the width direction thereof by being interlocked with the rotation of the first nut screw 2543. That is, the first lead screw 2542 is linearly moved in a direction in which the length of the front end protruding from the first actuator 2541 is decreased, and varies the size of an internal angle of the upper link unit 2530.

More specifically, an angle between the one ends of the pair of first upper links 2531 connected to the first upper bracket 2510 and an angle between the one ends of the pair of second upper links 2532 connected to the second upper bracket 2520 are increased by the linear movement of the first lead screw 2542. At the same time, angles formed by the other ends of the first upper links 2531 and the second upper links 2532 are decreased.

By such a change in the angles of the first upper links 2531 and the second upper links 2532, the first upper bracket 2510 is relatively moved toward the inside of the vehicle in the width direction thereof with respect to the second upper bracket 2520, and a relative distance between the first upper bracket 2510 and the second upper bracket 2520 is decreased.

As the first upper bracket 2510 connected to the top of the knuckle 2120 is moved toward the inside of the vehicle in the width direction thereof, the first upper bracket 2510 pulls the top of the wheel 300 toward the inside of the vehicle in the width direction thereof.

By the tensile force applied from the first upper bracket 2510, the wheel 300 is inclined toward the inside of the vehicle in the width direction thereof on the basis of an axis perpendicular to the ground, and a camber angle thereof is decreased.

Hereinafter, a configuration of the corner module 200 according to a third embodiment of the present disclosure is described in detail.

Figure 25:
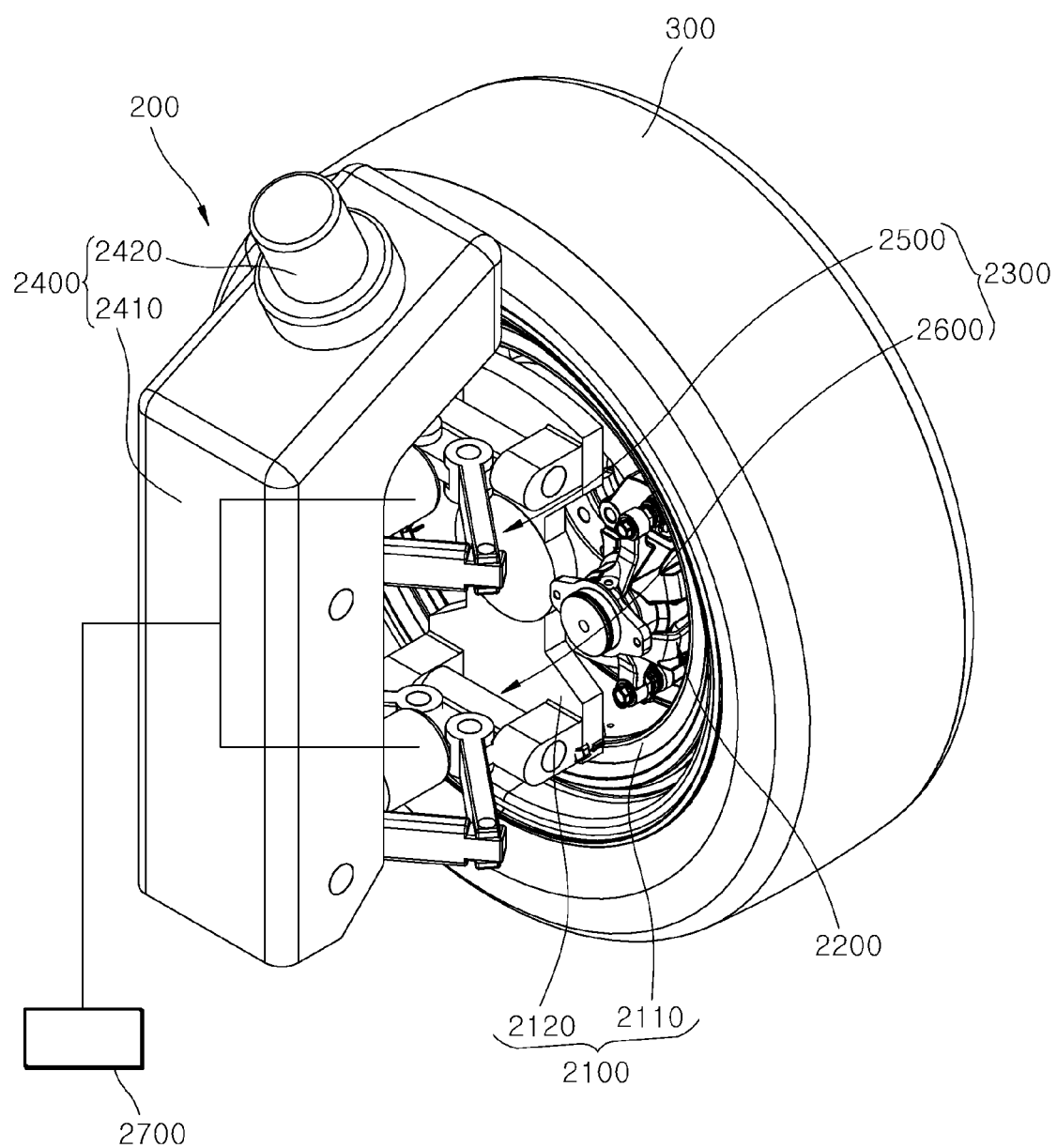
FIG. 25 is a perspective view schematically illustrating a configuration of a corner module according to a third embodiment of the present disclosure.
Figure 26:
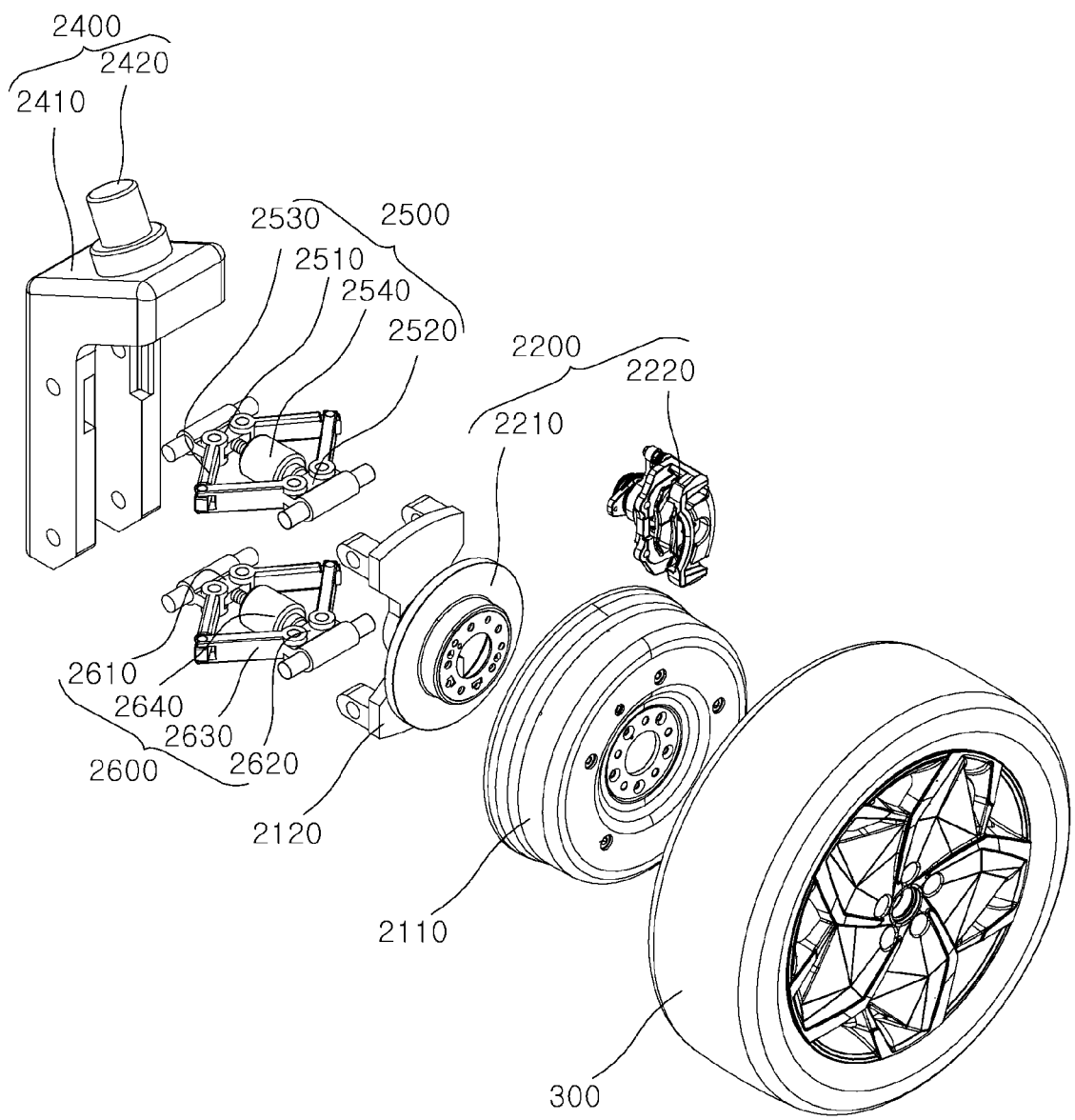
FIG. 26 is an exploded perspective view schematically illustrating a configuration of the corner module according to the third embodiment of the present disclosure.
Figure 27:
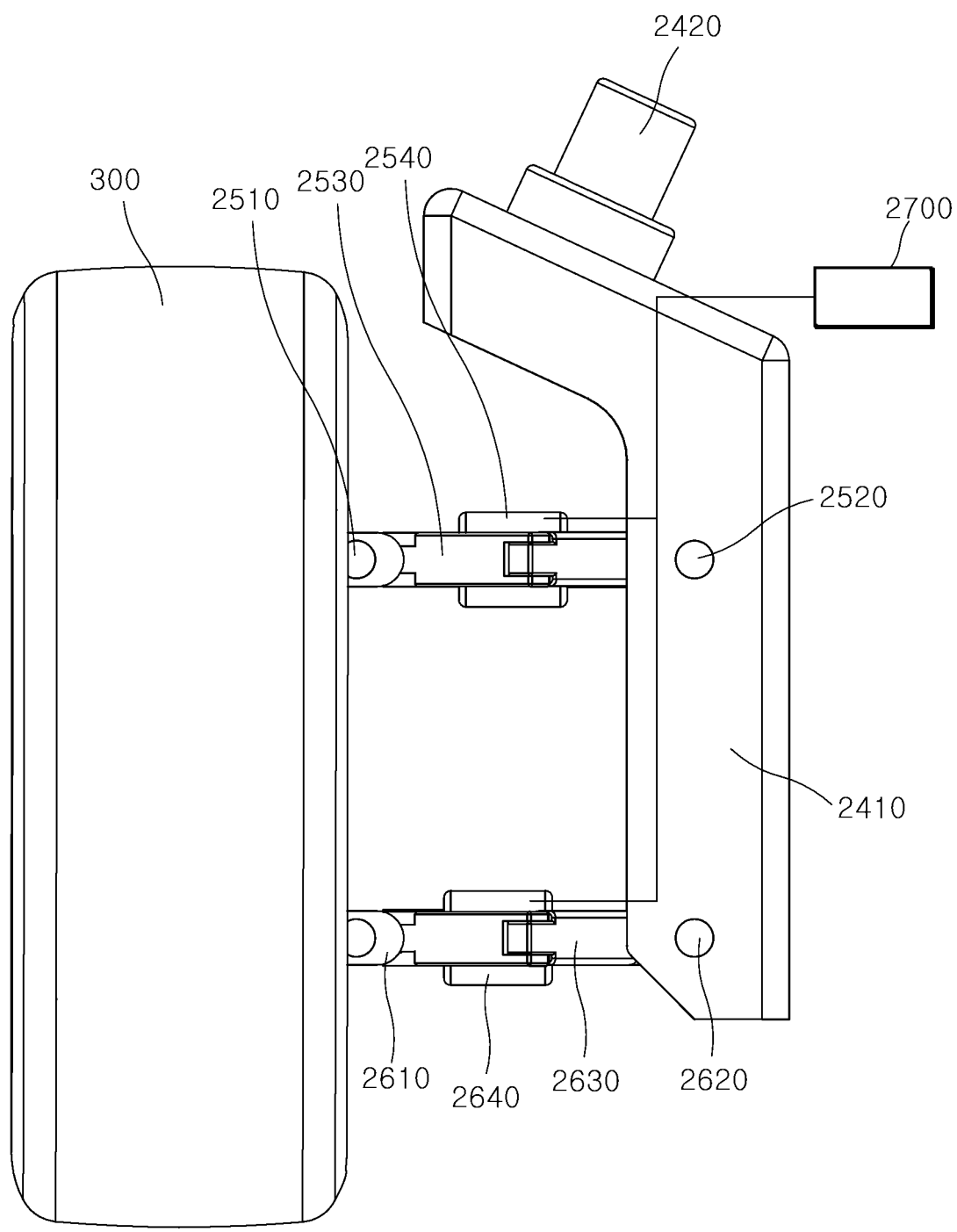
FIG. 27 is a front view schematically illustrating a configuration of the corner module according to the third embodiment of the present disclosure.

FIG. 25 is a perspective view schematically illustrating a configuration of the corner module according to the third embodiment of the present disclosure. FIG. 26 is an exploded perspective view schematically illustrating a configuration of the corner module according to the third embodiment of the present disclosure. FIG. 27 is a front view schematically illustrating a configuration of the corner module according to the third embodiment of the present disclosure.

Referring to FIGS. 25 to 27, the corner module 200 according to the third embodiment of the present disclosure includes a driving unit 2100, a braking unit 2200, a suspension unit 2300, a steering unit 2400, and an arm control unit 2700.

In the corner module 200 according to the third embodiment of the present disclosure, only detailed structures and functions of a lower arm module 2600 and an arm control unit 2700 are different from those of the corner module 200 according to the second embodiment of the present disclosure. Accordingly, in describing the configuration of the corner module 200 according to the third embodiment of the present disclosure, only the lower arm module 2600 and the arm control unit 2700 different from those of the corner module 200 according to the second embodiment of the present disclosure are described. The contents of the corner module 200 according to the second embodiment of the present disclosure may be applied to the remaining elements of the corner module 200 according to the third embodiment of the present disclosure without any change.

The lower arm module 2600 is connected to the driving unit 2100, and absorbs an impact applied from a road surface to a wheel 300 while a vehicle drives along with an upper arm module 2500. That is, the lower arm module 2600 plays a role in connecting the wheel 300 to a vehicle body, absorbing weight applied from the wheel 300 while the vehicle drives by its own stiffness, and adjusting a movement of the wheel 300. The lower arm module 2600 is provided to have a length adjustable, and varies a wheel track of the wheel 300. More specifically, the lower arm module 2600 is connected to the bottom of the driving unit 2100, and has the length varied in the width direction of the vehicle and adjusts a contact location of the wheel 300 for the ground.

Figure 28:
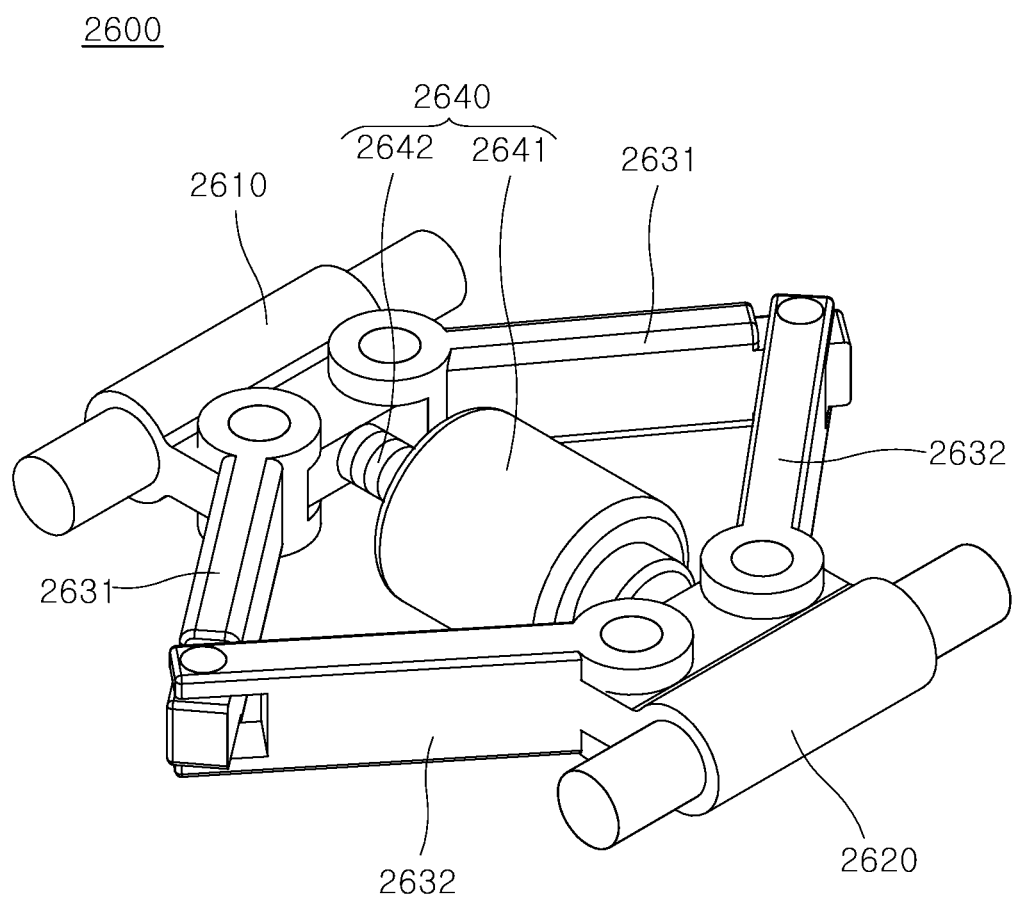
FIG. 28 is a perspective view schematically illustrating a configuration of a lower arm module according to the third embodiment of the present disclosure.

FIG. 28 is a perspective view schematically illustrating a configuration of the lower arm module according to the third embodiment of the present disclosure.

Referring to FIGS. 25 to 28, the lower arm module 2600 according to the present embodiment includes a first lower bracket 2610, a second lower bracket 2620, a lower link unit 2630, and a second driving module 2640.

The first lower bracket 2610 is rotatably connected to the driving unit 2100. The first lower bracket 2610 according to the present embodiment is rotatably connected to the bottom of the knuckle 2120 provided in the driving unit 2100. The first lower bracket 2610 is disposed to be spaced apart from a first upper bracket 2510 in up and down directions and to face the first upper bracket 2510. The first lower bracket 2610 may be rotatably connected to the bottom of the knuckle 2120 by hinge coupling, pin coupling, etc. In this case, the first lower bracket 2610 is rotatably supported by using, as an axis, a direction parallel to the length direction of the vehicle so that the first lower bracket 2610 can be rotated in accordance with up and down movements of the wheel 300. A detailed shape of the first lower bracket 2610 is not limited to the shape illustrated in FIG. 28. The design of the first lower bracket 2610 may be variously changed within the technical spirit of a shape which may be rotatably connected to the bottom of the knuckle 2120.

The second lower bracket 2620 is rotatably connected to the steering unit 2400, and is disposed to be spaced apart from the first lower bracket 2610. The second lower bracket 2620 according to the present embodiment is rotatably connected to the inside of a steering body 2410 provided in the steering unit 2400. The second lower bracket 2620 may be rotatably connected to the inside of the steering body 2410 by hinge coupling, pin coupling, etc. In this case, the second lower bracket 2620 is rotatably supported by using, as an axis, a direction parallel to the length direction of the vehicle so that the second lower bracket 2620 can be rotated in accordance with up and down movements of the wheel 300. The second lower bracket 2620 is disposed to be spaced apart from the first lower bracket 2610 at a predetermined interval in the width direction of the vehicle and to face the first lower bracket 2610. The second lower bracket 2620 is disposed to be spaced apart from the first lower bracket 2610 within the steering body 2410 in up and down directions and to face the first lower bracket 2610. The second lower bracket 2620 may be disposed at the same height as the first lower bracket 2610. A detailed shape of the second lower bracket 2620 is not limited to the shape illustrated in FIG. 28. The design of the second lower bracket 2620 may be variously changed within the technical spirit of a shape which may be rotatably connected to the inside of the steering body 2410.

The lower link unit 2630 is installed between the first lower bracket 2610 and the second lower bracket 2620, and the size of an internal angle thereof is adjustably provided. As the size of the internal angle is changed by the second driving module 2640 described later, the lower link unit 2630 varies a relative distance between the first lower bracket 2610 and the second lower bracket 2620.

The lower link unit 2630 according to the present embodiment includes a pair of first lower links 2631 and a pair of second lower links 2632.

The pair of first lower links 2631 is formed to have a rod form, and has one ends rotatably connected to the first lower bracket 2610. The pair of first lower links 2631 may have the one ends rotatably connected to the first lower bracket 2610 by pin coupling, hinge coupling, etc. The pair of first lower links 2631 may be rotatably supported by using, as an axis, a direction that perpendicularly penetrates the top and bottom surfaces of the first lower bracket 2610. The pair of first lower links 2631 may be formed to have the same length. The pair of first lower links 2631 may be slantly disposed in opposite directions on the basis of a central part of the first lower bracket 2610 or a first lead screw 2642 described later. In this case, angles of the pair of first lower links 2631 that are inclined on the basis of the central part of the first lower bracket 2610 may be identically set. The pair of first lower links 2631 is rotated in opposite directions by an operation of the first driving module 2640 described later, and varies a relative distance between the first lower bracket 2610 and the second lower bracket 2620.

The pair of second lower links 2632 is formed to have a rod form, and has one ends rotatably connected to the second lower bracket 2620. The pair of second lower links 2632 may have the one ends rotatably connected to the second lower bracket 2620 by pin coupling, hinge coupling, etc. The pair of second lower links 2632 may be rotatably supported by using, as an axis, a direction that perpendicularly penetrates the top and bottom surfaces of the second lower bracket 2620. The pair of second lower links 2632 may be formed to have the same length. The pair of second lower links 2632 may be slantly disposed in opposite directions on the basis of a central part of the second lower bracket 2620 or the first lead screw 2642 described later. In this case, angles of the pair of second lower links 2632 that are inclined on the basis of the central part of the second lower bracket 2620 may be identically set. The pair of second lower links 2632 is rotated in opposite directions by an operation of the driving module 2640 described later, and varies a relative distance between the first lower bracket 2610 and the second lower bracket 2620. The other ends of the pair of second lower links 2632 are rotatably connected to the other ends of the pair of first lower links 2631, respectively, by pin coupling, hinge coupling, etc. Accordingly, the pair of first lower links 2631 and the pair of second lower links 2632 may be connected to form an approximately pantograph form.

The second driving module 2640 is installed between the first lower bracket 2610 and the second lower bracket 2620. The second driving module 2640 varies a relative distance between the first lower bracket 2610 and the second lower bracket 2620 by adjusting the size of an internal angle of the lower link unit 2630 by its own driving power.

Figure 29:
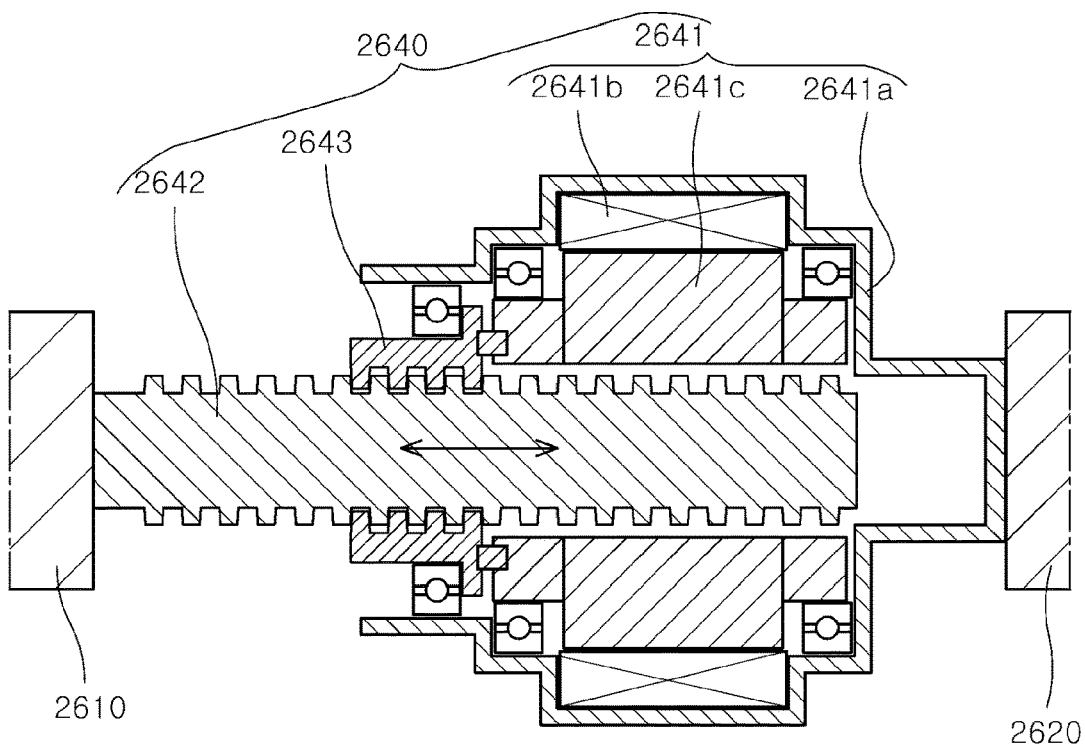
FIG. 29 is a cross-sectional view schematically illustrating a configuration of a second driving module according to the third embodiment of the present disclosure.

FIG. 29 is a cross-sectional view schematically illustrating a configuration of the second driving module according to the third embodiment of the present disclosure.

Referring to FIGS. 25 to 29, the second driving module 2640 according to the present embodiment includes a second actuator 2641, a second lead screw 2642, and a second nut screw 2643.

The second actuator 2641 generates rotary power by receiving a power source from the outside. The second actuator 2641 according to the present embodiment generates the rotary power by receiving the power source from a battery 400, etc. of a vehicle.

The second actuator 2641 may be exemplified as a hollow motor. More specifically, in the present embodiment, the second actuator 2641 may include a second motor housing 2641a, a second stator 2641b fixed to the second motor housing 2641a, and a second rotor 2641c having a hollow form, which is disposed on the same axis as the second stator 2641b and is rotated by using a central axis thereof as an axis by an electromagnetic interaction with the second stator 2641b.

The second actuator 2641 may be fixed to any one of the first lower bracket 2610 or the second lower bracket 2620. Hereinafter, as illustrated in FIGS. 28 and 29, an example in which the second actuator 2641 is fixed to the second lower bracket 2620 will be described, but the second actuator 2641 may be fixed to the first lower bracket 2610. The second actuator 2641 may be directly fixed to the second lower bracket 2620 by welding, bolting, etc. and may be fixed to the second lower bracket 2620 by separate fixing means (not illustrated).

The second lead screw 2642 is installed in the second actuator 2641 in a way to advance and retreat. The second lead screw 2642 advances and retreats in a direction parallel to an axial direction of the second actuator 2641 by being interlocked with rotary power generated from the second actuator 2641. The second lead screw 2642 widens or narrows an interval between the first lower bracket 2610 and the second lower bracket 2620 in a moving direction thereof.

The second lead screw 2642 according to the present embodiment may be formed to have a rod form equipped with screw threads on an outer circumferential surface thereof. A rear end (a right end on the basis of FIG. 29) of the second lead screw 2642 is inserted into the second rotor 2641c. In this case, the outer circumferential surface of the second lead screw 2642 may be disposed to be spaced apart from an inner circumferential surface of the second rotor 2641c at a given interval. A front end (a left end on the basis of FIG. 29) of the second lead screw 2642 is fixed to the other of the first lower bracket 2610 or the second lower bracket 2620. In the present embodiment, as the second actuator 2641 is fixed to the second lower bracket 2620, the front end of the second lead screw 2642 may be fixed to the first lower bracket 2610. The front end of the second lead screw 2642 may be directly fixed to the first lower bracket 2610 by welding, bolting, etc., and may be fixed to the first lower bracket 2610 by separate fixing means (not illustrated).

The length of the front end of the second lead screw 2642 that protrudes from the second actuator 2641 is varied by the first nut screw 2643 described later when the second actuator 2641 operates. An interval between the first lower bracket 2610 and the second lower bracket 2620 is widened or narrowed in proportion to the length of the front end of the second lead screw 2642 that protrudes form the second actuator 2641.

The second nut screw 2643 converts a rotary motion of the second actuator 2641 in a rectilineal and reciprocating motion of the second lead screw 2642. The second nut screw 2643 according to the present embodiment may be formed to have a cylindrical shape having a hollow form equipped with screw threads on an inner circumferential surface thereof. The second nut screw 2643 is disposed to have a central axis disposed on the same axis as the central axis of the second rotor 2641c. A rear end (a right end on the basis of FIG. 29) of the second nut screw 2643 is connected to the front end (a left end on the basis of FIG. 29) of the second rotor 2641c, and is rotated by using the central axis as an axis along with the second rotor 2641c when the second rotor 2641c is rotated. An inner circumferential surface of the second nut screw 2643 is screwed to the outer circumferential surface of the second lead screw 2642. Accordingly, the second lead screw 2642 is rotated along with the second rotor 2641c, and may straightly move the second lead screw 2642 forward or backward. Furthermore, although an operation of the second actuator 2641 is stopped, the interval between the first lower bracket 2610 and the second lower bracket 2620 can be prevented from being randomly changed because the backlashing of the second lead screw 2642 is limited due to a friction force according to the screwing to the second nut screw 2643.

The arm control unit 2700 adjusts a camber angle of the wheel 300 and a wheel track of the wheel 300 by controlling operations of the upper arm module 2500 and the lower arm module 2600.

Figure 30:
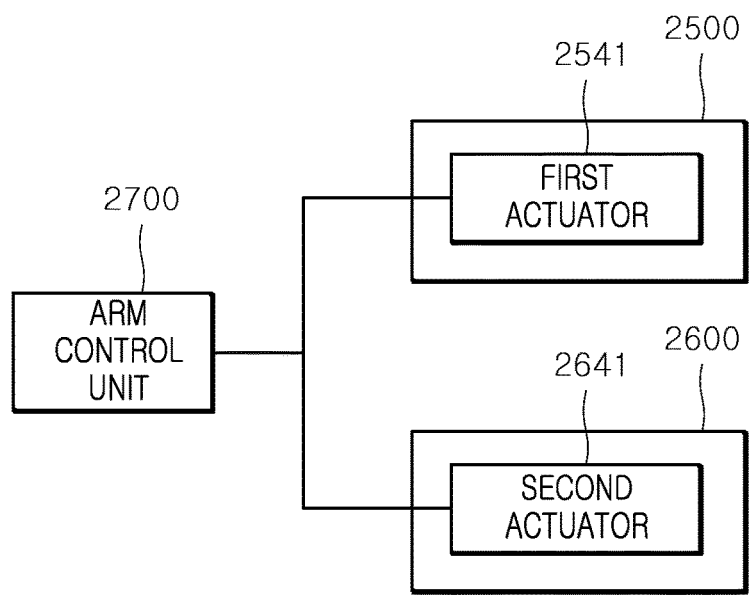
FIG. 30 is a block diagram schematically illustrating a configuration of an arm control unit according to the third embodiment of the present disclosure.

FIG. 30 is a block diagram schematically illustrating a configuration of the arm control unit according to the third embodiment of the present disclosure.

Referring to FIG. 30, the arm control unit 2700 according to the present embodiment is electrically connected to the first actuator 2541, and adjusts a camber angle of the wheel 300 by controlling whether to operate the first actuator 2541 and a direction, size, etc. of rotatory power generated from the first actuator 2541. The arm control unit 2700 according to the present embodiment may be implemented as an electronic control unit (ECU), a central processing unit (CPU), a processor, or a system on chip (SoC), and may control a plurality of hardware or software components by driving an operating system or an application and perform various data processing and operations. The arm control unit 2700 may be configured to execute at least one instruction stored in a memory and store data, that is, a result of the execution, in the memory.

Furthermore, the arm control unit 2700 is electrically connected to the second actuator 2641, and adjusts a camber angle of the wheel 300 by controlling whether to operate the second actuator 2641 and a direction, size, etc. of rotatory power generated from the second actuator 2641. The arm control unit 2700 is connected to a manipulation panel of a vehicle, a terminal of a user, etc. in a wired or wireless way, and may receive an input of a user about the adjustment of a camber angle and wheel track of the wheel 300.

If the arm control unit 2700 attempts to adjust a wheel track of the wheel 300 while maintaining a camber angle of the wheel 300, the arm control unit 2700 varies the upper arm module 2500 and the lower arm module 2600 in the same length. That is, the arm control unit 2700 controls pieces of rotatory power generated from the first actuator 2541 and the second actuator 2542 to have the same size and direction.

Furthermore, if the arm control unit 2700 attempts to simultaneously vary a camber angle and wheel track of the wheel 300, the arm control unit 2700 varies the upper arm module 2500 and the lower arm module 2600 in different lengths. That is, the arm control unit 2700 controls pieces of rotatory power generated from the first actuator 2541 and the second actuator 2542 to have different sizes and directions.

When the wheel 300 drives, the arm control unit 2700 varies the length of the lower arm module 2600 by operating the second actuator 2641. When the wheel 300 is stopped, the size of a stop friction force that acts between the wheel 300 and a road surface is greater than a motion friction force that acts between the wheel 300 and a road surface when the wheel 300 drives. Accordingly, when the wheel 300 on which a relatively small friction force acts drives, the arm control unit 2700 may reduce the size of a load applied to the second actuator 2641 by operating the second actuator 2641.

Hereinafter, an operating process of the corner module 200 according to the third embodiment of the present disclosure is described in detail.

Figure 31:
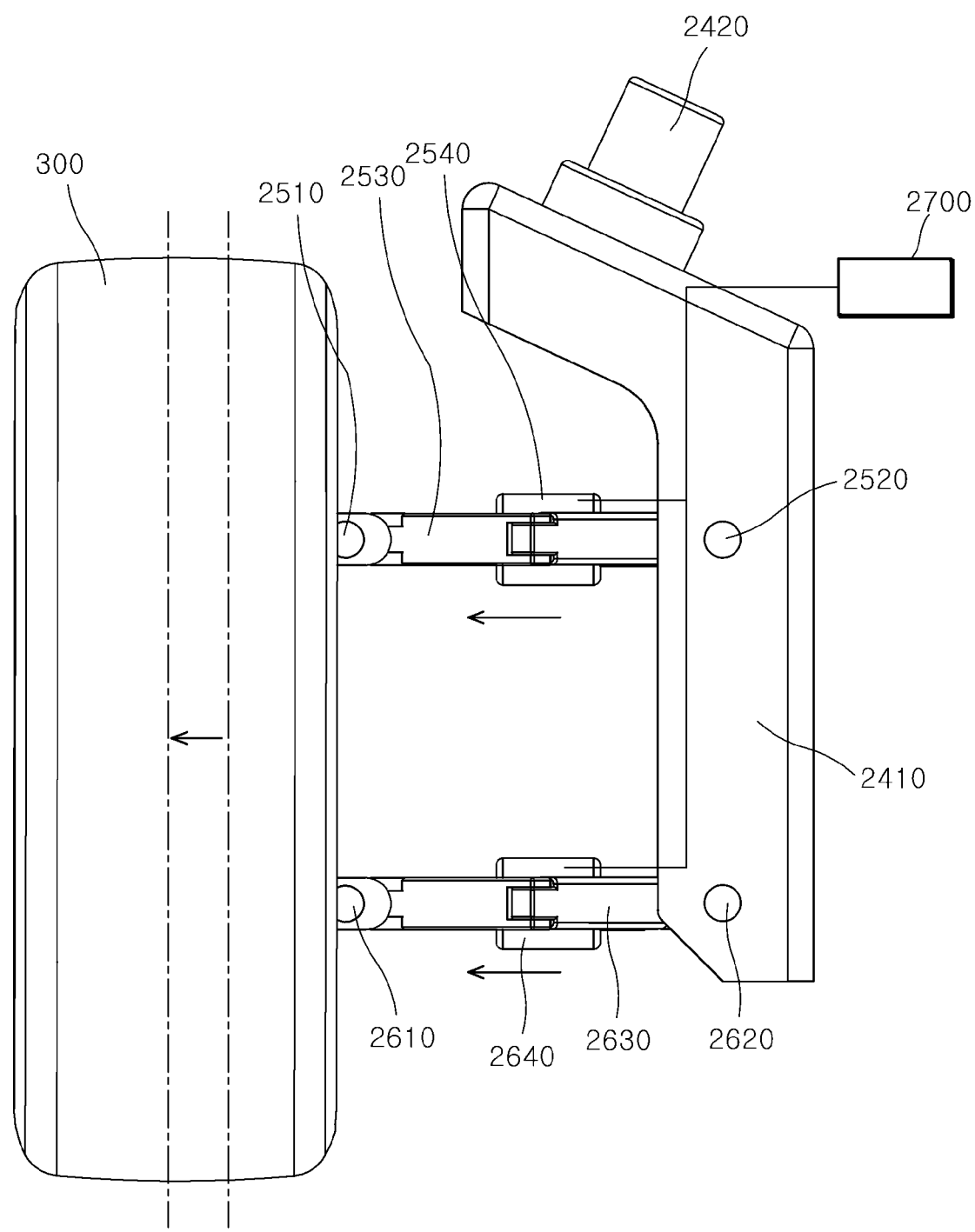
FIGS. 31 and 32 are operation diagrams schematically illustrating an operating process of the corner module according to the third embodiment of the present disclosure.
Figure 32:
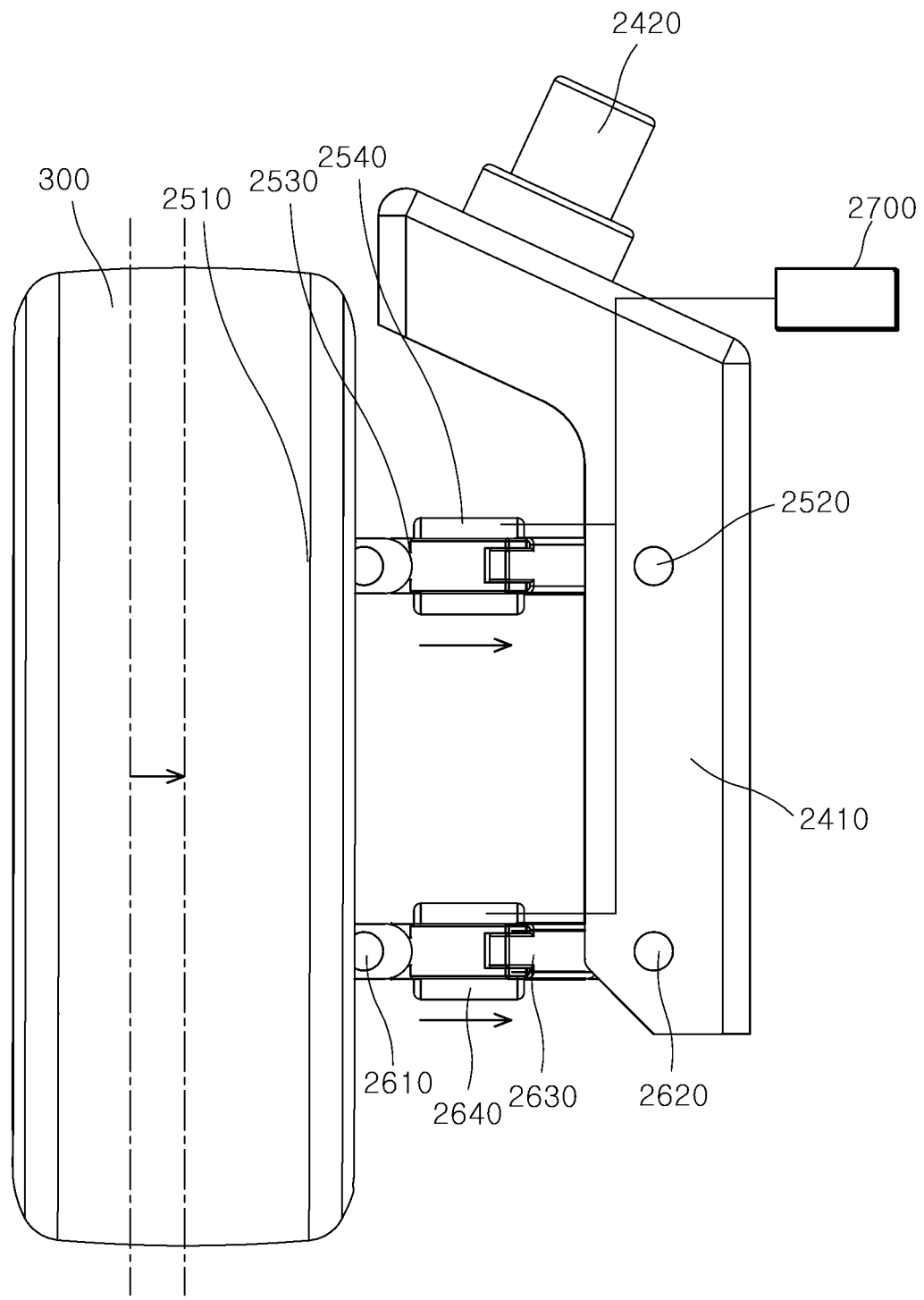

FIGS. 31 and 32 are operation diagrams schematically illustrating an operating process of the corner module according to the third embodiment of the present disclosure.

Referring to FIG. 31, if a wheel track of the wheel 300 is to be increased, the arm control unit 2700 drives the first actuator 2541 and the second actuator 2641 by receiving an input signal from a user.

The second actuator 2641 rotates the second nut screw 2643 in any one of clockwise and counterclockwise directions by generating rotatory power.

The front end of the second lead screw 2642 is linearly moved toward the outside of a vehicle in the width direction thereof by being interlocked with the rotation of the second nut screw 2643. That is, the second lead screw 2642 is linearly moved in a direction in which the length of the front end protruding from the second actuator 2641 is increased, and varies the size of an internal angle of the lower link unit 2630.

More specifically, an angle between the one ends of the pair of first lower links 2631 connected to the first lower bracket 2610 and an angle between the one ends of the pair of second lower links 2632 connected to the second lower bracket 2620 are decreased by the linear movement of the second lead screw 2642. At the same time, angles formed by the other ends of the first lower links 2631 and the second lower links 2632 are increased.

By such a change in the angles of the first lower links 2631 and the second lower links 2632, the first lower bracket 2610 is relatively moved toward the outside of the vehicle in the width direction thereof with respect to the second lower bracket 2620, and a relative distance between the first lower bracket 2610 and the second lower bracket 2620 is increased.

As the first lower bracket 2610 connected to the bottom of the knuckle 2120 is moved toward the outside of the vehicle in the width direction thereof, the first lower bracket 2610 pressurizes the bottom of the wheel 300 toward the outside of the vehicle in the width direction thereof.

By the pressure applied from the first lower bracket 2610, a location of the wheel 300 that comes into contact with the ground is moved toward the outside of the vehicle in the width direction thereof, and a wheel track of the wheel 300 is increased.

If a camber angle of the wheel 300 is to be constantly maintained in a process of adjusting a wheel track of the wheel 300, the arm control unit 2700 relatively moves the first upper bracket 2510 with respect to the second upper bracket 2520 by a moving distance of the first lower bracket 2610 by the operation described with reference to FIGS. 23 and 24.

If a camber angle of the wheel 300 is to be simultaneously adjusted in a process of adjusting a wheel track of the wheel 300, the arm control unit 2700 fixes the first upper bracket 2510 to its original location, but relatively moves the first upper bracket 2510 with respect to the second upper bracket 2520 by a distance different from a moving distance of the first lower bracket 2610 by the operation described with reference to FIGS. 23 and 24.

Referring to FIG. 32, if a wheel track of the wheel 300 is to be decreased, the arm control unit 2700 drives the first actuator 2541 and the second actuator 2641 by receiving an input signal from a user.

The second actuator 2641 rotates the second nut screw 2643 in any one of clockwise and counterclockwise directions by generating rotatory power.

The front end of the first lead screw 2642 is linearly moved toward the inside of the vehicle in the width direction thereof by being interlocked with the rotation of the second nut screw 2643. That is, the first lead screw 2642 is linearly moved in a direction in which the length of the front end protruding from the second actuator 2641 is decreased, and varies the size of an internal angle of the lower link unit 2630.

More specifically, an angle between the one ends of the pair of first lower links 2631 connected to the first lower bracket 2610 and an angle between the one ends of the pair of second lower links 2632 connected to the second lower bracket 2620 are increased by the linear movement of the first lead screw 2642. At the same time, angles formed by the other ends of the first lower links 2631 and the second lower links 2632 are decreased.

By such a change in the angles of the first lower links 2531 and the second lower links 2632, the first lower bracket 2610 is relatively moved toward the inside of the vehicle in the width direction thereof with respect to the second lower bracket 2620, and a relative distance between the first lower bracket 2610 and the second lower bracket 2620 is decreased.

As the first lower bracket 2610 connected to the bottom of the knuckle 2120 is moved toward the inside of the vehicle in the width direction thereof, the first lower bracket 2610 pulls the bottom of the wheel 300 toward the inside of the vehicle in the width direction thereof.

By the tensile force applied from the first lower bracket 2610, a location of the wheel 300 which comes into contact with the ground is moved toward the inside of the vehicle in the width direction thereof, and a wheel track of the wheel 300 is decreased.

If a camber angle of the wheel 300 is to be constantly maintained in a process of adjusting a wheel track of the wheel 300, the arm control unit 2700 relatively moves the first upper bracket 2510 with respect to the second upper bracket 2520 by a moving distance of the first lower bracket 2610 by the operation described with reference to FIGS. 23 and 24.

If a camber angle of the wheel 300 is to be simultaneously adjusted in a process of adjusting a wheel track of the wheel 300, the arm control unit 2700 fixes the first upper bracket 2510 to its original location, but relatively moves the first upper bracket 2510 with respect to the second upper bracket 2520 at a distance different from a moving distance of the first lower bracket 2610 by the operation described with reference to FIGS. 23 and 24.

Hereinafter, a configuration of a vehicle including a corner module apparatus according to another embodiment of the present disclosure is described.

In this process, a description redundant with that of the vehicle including the corner module apparatus according to the aforementioned embodiment of the present disclosure is omitted for convenience of description.

Figure 33:
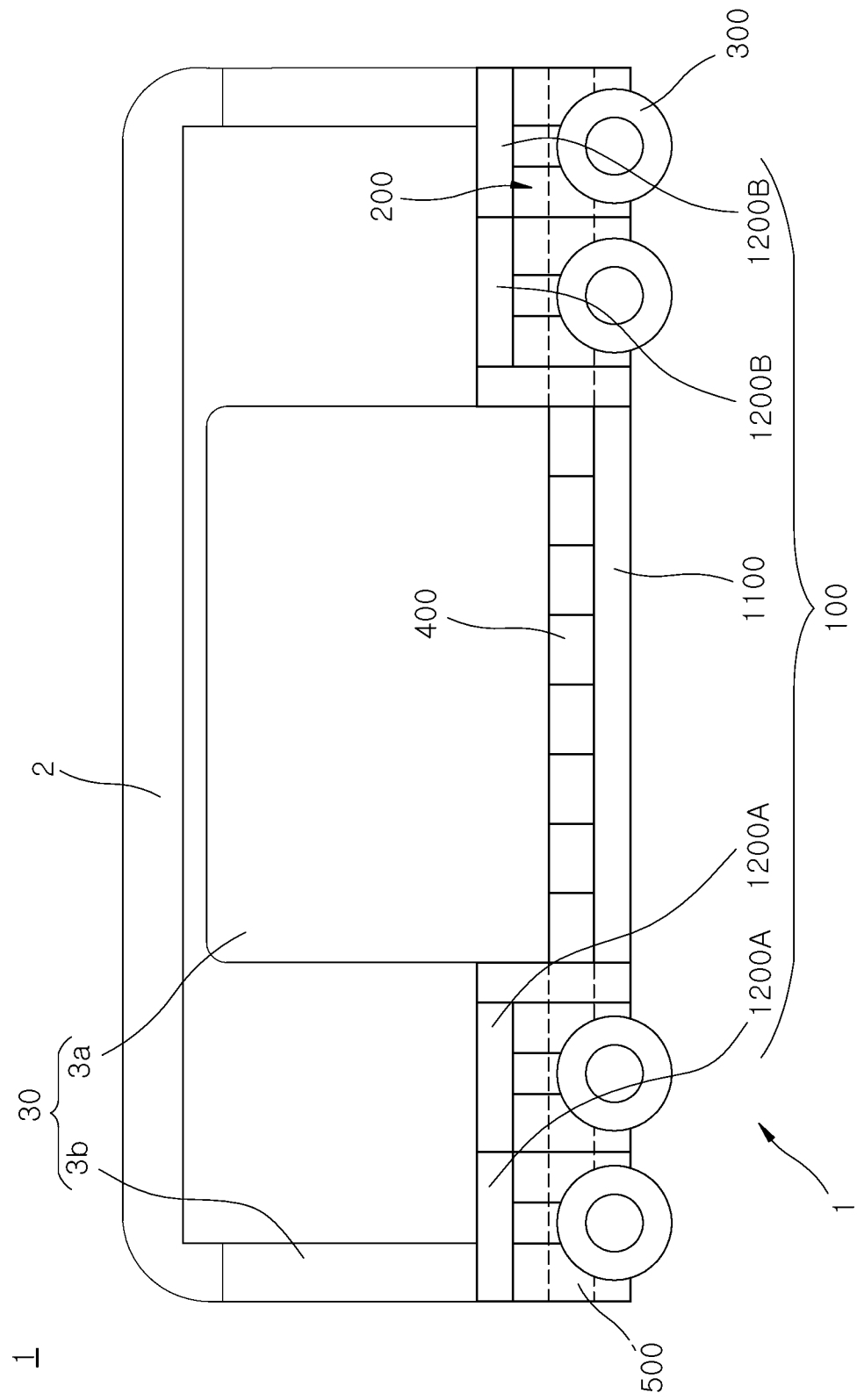
FIG. 33 is a diagram schematically illustrating a configuration of a vehicle including a corner module apparatus for a vehicle according to another embodiment of the present disclosure.

FIG. 33 is a front view schematically illustrating a configuration of a vehicle including a corner module apparatus according to another embodiment of the present disclosure.

Referring to FIG. 33, a frame module 100 according to another embodiment of the present disclosure includes a plurality of first corner module platforms 1200A and a plurality of second corner modules platforms 1200B.

The plurality of first corner module platforms 1200A and the plurality of second corner module platforms 1200B are extended in the length direction of a vehicle body from one side and the other side of a main platform 1100.

More specifically, the neighboring first corner module platforms 1200A are connected in series in the length direction of the vehicle body from one side of the main platform 1100. The neighboring second corner module platforms 1200B are connected in series in the length direction of the vehicle body from the other side of the main platform 1100. In this case, the numbers of plurality of first corner module platforms 1200A and plurality of second corner module platforms 1200B may be identical and may be different. Accordingly, the number of corner modules 200 installed in the frame module 100 according to another embodiment of the present disclosure may be freely expanded to both sides of the main platform 1100 based on a purpose of a vehicle.

Figure 34:
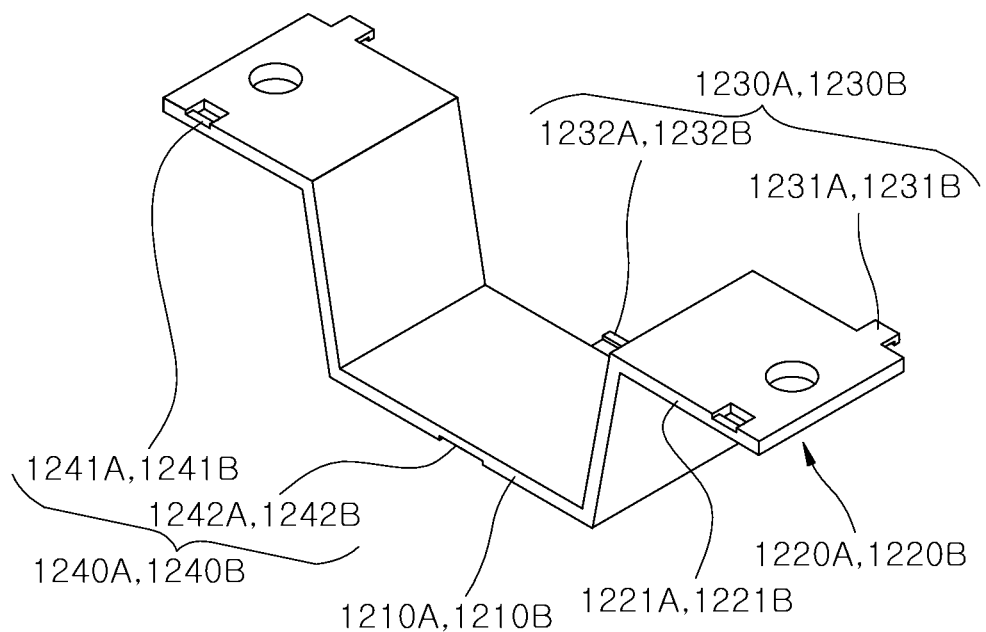
FIG. 34 is a diagram schematically illustrating a configuration of a first corner module platform and a second corner module platform according to another embodiment of the present disclosure.

FIG. 34 is a diagram schematically illustrating a configuration of a first corner module platform and a second corner module platform according to another embodiment of the present disclosure.

Referring to FIG. 34, the first corner module platform 1200A and the second corner module platform 1200B according to the present embodiment further include a first corner module extension fastening part 1240A and a second corner module extension fastening part 1240B, respectively.

The first corner module extension fastening part 1240A includes a first corner module plate 1210A and a first corner module housing 1220A. The first corner module extension fastening part 1240A is disposed on the opposite side of a first corner module fastening part 1230A in the first corner module platform 1200A. That is, the first corner module fastening part 1230A and the first corner module extension fastening part 1240A are disposed at both ends of the first corner module platform 1200A.

The first corner module extension fastening part 1240A provided in any one first corner module platform 1200A is detachably coupled to the first corner module fastening part 1230A provided in a neighbor first corner module platform 1200A. More specifically, the first corner module extension fastening part 1240A is locked and coupled with the first corner module fastening part 1230A as neighbor first corner module platforms 1200A come into contact with each other in a direction parallel to the length direction of a vehicle.

Accordingly, the plurality of first corner module platforms 1200A that are extended in series may be sequentially connected in the length direction of the vehicle.

Figure 35:
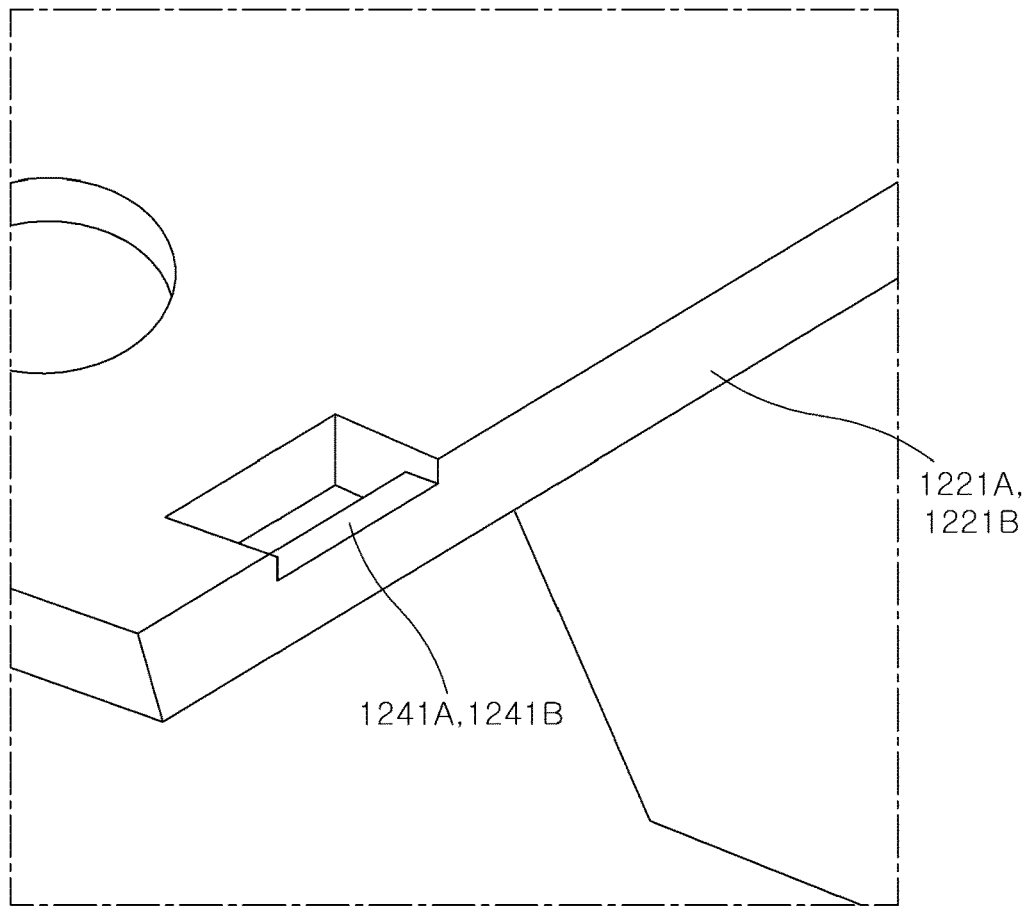
FIGS. 35 and 36 are enlarged views schematically illustrating a configuration of a first corner module extension fastening part and a second corner module extension fastening part according to an embodiment of the present disclosure.
Figure 36:
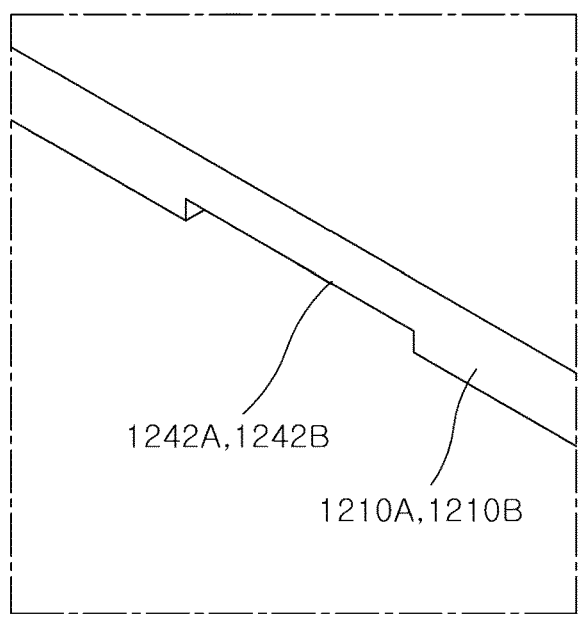

FIGS. 35 and 36 are enlarged views schematically illustrating a configuration of the first corner module extension fastening part and the second corner module extension fastening part according to another embodiment of the present disclosure.

Referring to FIGS. 35 and 36, the first corner module extension fastening part 1240A according to the present embodiment includes a first corner module upper-extension fastening part 1241A and a first corner module lower-extension fastening part 1242A.

The first corner module upper-extension fastening part 1241A according to the present embodiment may be formed to have a form of a groove that is concavely recessed and formed from the first corner module housing 1220A, more specifically, an outside surface of a first mounting plate 1221A. The first corner module upper-extension fastening part 1241A is perpendicularly downward extended from the top of the first corner module housing 1220A. The first corner module upper-extension fastening part 1241A is disposed at the end of the other of the front or rear of the first corner module housing 1220A, that is, on a side opposite to the first corner module upper-fastening part 1231A. The first corner module upper-extension fastening part 1241A may have a cross-sectional form having a step form so that the first corner module upper-extension fastening part 1241A is locked and coupled with a first corner module upper-fastening part 1231A provided in a neighbor first corner module platform 1200A. The first corner module upper-extension fastening part 1241A may be provided in plural, and may be individually provided in the first corner module housings 1220A.

The first corner module lower-extension fastening part 1242A according to the present embodiment may be formed to have a form of a groove that is concavely recessed and formed from an outside surface of the first corner module plate 1210A.

The first corner module lower-extension fastening part 1242A is extended in a direction opposite to a direction of the first corner module upper-extension fastening part 1241A. More specifically, the first corner module lower-extension fastening part 1242A is perpendicularly upward extended from the bottom of the first corner module plate 1210A. Accordingly, when being fastened to the first corner module fastening parts 1230A, the first corner module upper-extension fastening part 1241A and the first corner module lower-extension fastening part 1242A can prevent the first corner module fastening part 1230A from deviating to any one direction.

The first corner module lower-extension fastening part 1242A is disposed at the end of the other of the front or rear of the first corner module plate 1210A, that is, on a side opposite to the first corner module lower-fastening part 1232A. The first corner module lower-extension fastening part 1242A may have a cross-sectional form having a step form so that the first corner module lower-extension fastening part 1242A is locked and coupled with a first corner module lower-fastening part 1232A provided in a neighbor first corner module platform 1200A.

The second corner module extension fastening part 1240B is provided in the second corner module plate 1210B and the second corner module housing 1220B. The second corner module extension fastening part 1240B is disposed on the opposite side of a second corner module fastening part 1230B in the second corner module platform 1200B. That is, the second corner module fastening part 1230B and the second corner module extension fastening part 1240B are disposed at both ends of the second corner module platform 1200B, respectively.

The second corner module extension fastening part 1240B provided in any one second corner module platform 1200B is detachably coupled the second corner module fastening part 1230B provided in a neighbor second corner module platform 1200B. More specifically, when neighbor second corner module platforms 1200B are brought into contact with each other in a direction parallel to the length direction of the vehicle, the second corner module extension fastening part 1240B is locked and coupled with the second corner module fastening part 1230B. Accordingly, a plurality of second corner module platforms 1200B that are extended in series may be sequentially connected in the length direction of the vehicle.

The second corner module extension fastening part 1240B according to the present embodiment includes a second corner module upper-extension fastening part 1241B and a second corner module lower-extension fastening part 1242B.

The second corner module upper-extension fastening part 1241B according to the present embodiment may be formed to have a form of a groove that is concavely recessed and formed from the second corner module housing 1220B, more specifically, an outside surface of a second mounting plate 1221B. The second corner module upper-extension fastening part 1241B is perpendicularly downward extended from the top of the second corner module housing 1220B. The second corner module upper-extension fastening part 1241B is disposed at the end of the other of the front or rear of the second corner module housing 1220B, that is, on the opposite side of a second corner module upper-fastening part 1231B. The second corner module upper-extension fastening part 1241B may have a cross-sectional form having a step form so that the second corner module upper-extension fastening part 1241B can be locked and coupled with the second corner module upper-fastening part 1231B provided in a neighbor second corner module platform 1200B. The second corner module upper-extension fastening part 1241B may be provided in plural and individually provided in the second corner module housing 1220B.

The second corner module lower-extension fastening part 1242B according to the present embodiment may be formed to have a form of a groove that is concavely recessed and formed from the outside surface of the second corner module plate 1210B.

The second corner module lower-extension fastening part 1242B is extended in a direction opposite to the direction of the second corner module upper-extension fastening part 1241B. More specifically, the second corner module lower-extension fastening part 1242B is perpendicularly upward extended from the bottom of the second corner module plate 1210B. Accordingly, when being fastened to the second corner module fastening part 1230B, the second corner module upper-extension fastening part 1241B and the second corner module lower-extension fastening part 1242B can prevent the second corner module fastening part 1230B from deviating in any direction thereof.

The second corner module lower-extension fastening part 1242B is disposed at the end of the other of the front or rear of the second corner module plate 1210B, that is, on the opposite side of the second corner module lower-fastening part 1232B. The second corner module lower-extension fastening part 1242B may have a cross-sectional form having a step form so that the second corner module lower-extension fastening part 1242B can be locked and coupled with the second corner module lower-fastening part 1232B provided in a neighbor second corner module platform 1200B.

A second door 3b according to the present embodiment is provided in pair. The pair of second doors 32b is installed on sides of the top hat 2 in forward and backward directions in a way to be opened and closed. The pair of second doors 3b may be disposed on the first corner module platform 1200A and the second corner module platform 1200B disposed on the outermost side thereof in the length direction of a vehicle body, respectively, among a plurality of first corner module platforms 1200A and second corner module platforms 1200B.

Hereinafter, a configuration of a vehicle including a corner module apparatus for a vehicle according to still another embodiment of the present disclosure is described in detail.

In this process, a description redundant with that of a vehicle including a corner module apparatus for a vehicle according to the embodiment or another embodiment of the present disclosure is omitted for convenience of description.

Figure 37:
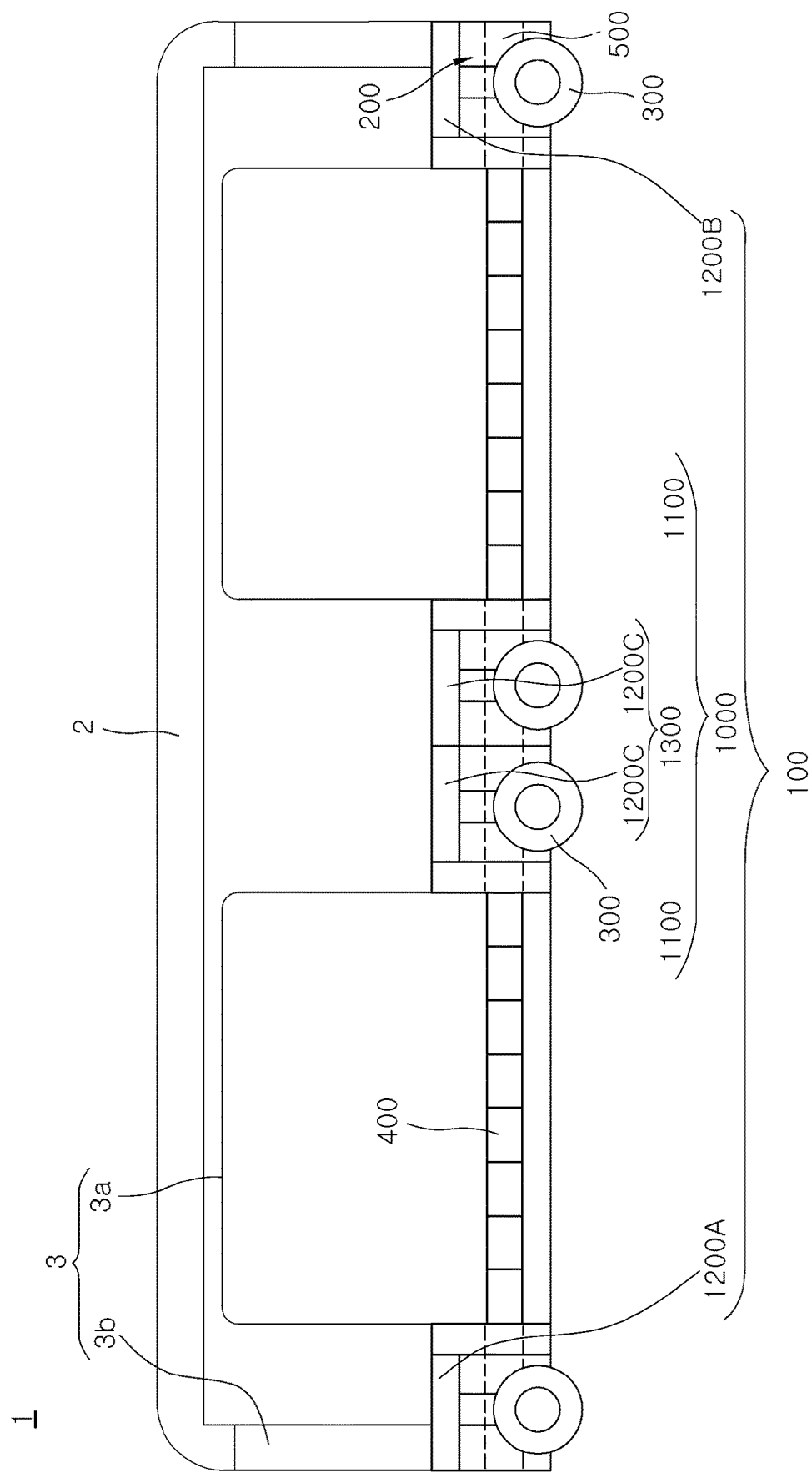
FIG. 37 is a diagram schematically illustrating a configuration of a vehicle including a corner module apparatus for a vehicle according to still another embodiment of the present disclosure.

FIG. 37 is a front view schematically illustrating a configuration of a vehicle including a corner module apparatus for a vehicle according to still another embodiment of the present disclosure.

Referring to FIG. 37, the vehicle including the corner module apparatus for a vehicle according to still another embodiment of the present disclosure includes a main platform assembly 1000, a first corner module platform 1200A, and a second corner module platform 1200B.

The main platform assembly 1000 includes a middle module platform 1300 disposed between at least two main platforms 1100 and a main platform.

Neighbor main platforms 1100 are disposed to be spaced apart from each other at a given interval in a length direction of the vehicle. In this case, the first corner module platform 1200A is detachably coupled to one side (a left side of FIG. 37) of the main platform 1100 disposed on the outermost side of one side (the left side of FIG. 37) among the plurality of main platforms 1100. The second corner module platform 1200A is detachably coupled to the other side (a right side of FIG. 37) of the main platform 1100 disposed on the outermost side of the other side (the right side of FIG. 37) among the plurality of main platforms 1100. Accordingly, the frame module 100 according to still another embodiment of the present disclosure may also be applied to a vehicle having a vehicle body whose length is relatively long, such as a tram, a bus, or a trailer, because weight of a battery 400 can be distributed through the plurality of main platforms 1100.

The middle module platform 1300 includes a third corner module platform 1200C disposed between neighbor main platforms 1100 and supporting a corner module 200.

At least one third corner module platform 1200C may be provided between neighbor main platforms 1100. If the third corner module platform 1200C is provided in plural, the plurality of third corner module platforms 1200C may be connected in series in the length direction of the vehicle body. The third corner module platform 1200C disposed on the outermost side of the plurality of third corner module platforms 1200C is detachably coupled to an end that belongs to the end of a neighbor main platform 1100 and with which the first corner module platform 1200A and the second corner module platform 1200B are not coupled.

The third corner module platform 1200C has a bottom coupled with the corner module 200 described later and supports the corner module 200. The corner module 200 and an inverter 500 for converting, into AC power, DC power supplied from the battery 400 and delivering the AC power to the corner module 200 are mounted within the third corner module platform 1200C.

The third corner module platform 1200C according to the present embodiment includes a third corner module plate, a third corner module housing, and a third corner module fastening part.

Detailed shapes of the third corner module plate, the third corner module housing, the third corner module fastening part, and the third corner module extension fastening part may be identical with the shapes of the first corner module plate 1210A, the first corner module housing 1220A, the first corner module fastening part 1230A, and the first corner module extension fastening part 1240A illustrated in FIG. 10.

For the smooth coupling of the main platform 1100, the third corner module extension fastening part provided in the third corner module platform 1200C disposed at any one end among the plurality of third corner module platforms 1200C disposed between neighbor main platforms 1100 may be formed to have a form of a hook that protrudes from the third corner module plate and the third corner module housing.

The top of a mounting part 2422a provided in the plurality of corner modules 200 according to the present embodiment may be detachably coupled with the bottom of the first mounting plate 1221A, the second mounting plate 1221B, or the third mounting plate by bolting, etc. depending on a location.

An opened bottom of a top hat 2 according to the present embodiment is disposed to face the top of the frame module 100, that is, the tops of the main platform assembly 1000, the first corner module platform 1200A, and the second corner module platform 1200B. The top hat 2 may have the bottom coupled with the tops of the main wheel housing 1120, the first corner module housing 1220A, the second corner module housing 1220B, and the third corner module housing by bolting, and may be detachably fixed to the frame module 100.

A first door 3a according to the present embodiment may be provided in plural. The first doors 3a may be spaced apart from each other at a given interval in the length direction of the top hat 2, and may be individually disposed on the main platform 1100 provided in the main platform assembly 1000.

II. Application of Corner Module Apparatus for Vehicle

Figure 38:
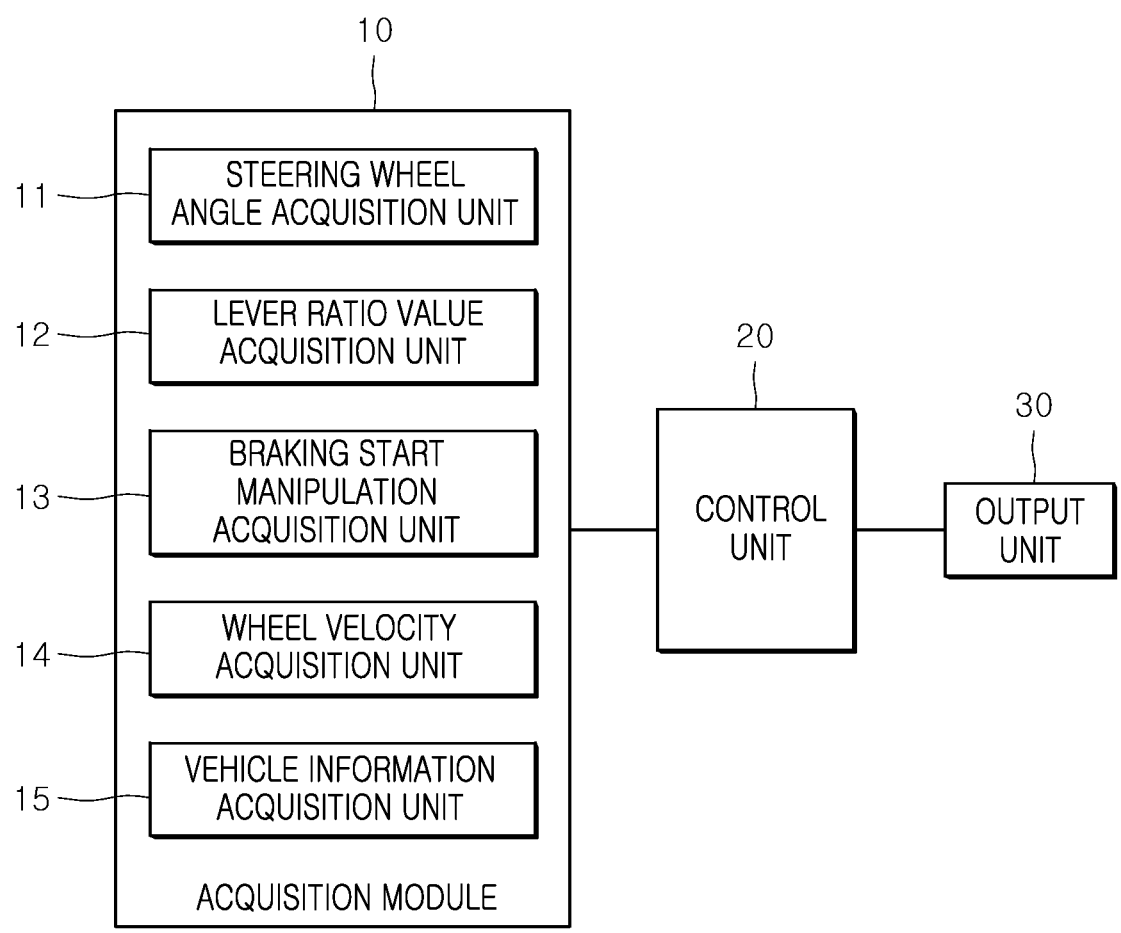
FIG. 38 is a block diagram for describing a function of a corner module apparatus for a vehicle according to an embodiment of the present disclosure.

FIG. 38 is a block diagram for describing a function of a corner module apparatus for a vehicle according to an embodiment of the present disclosure. Referring to FIG. 38, the corner module apparatus for a vehicle according to an embodiment of the present disclosure includes an acquisition module 10, a controller 20, and an output unit 30.

The acquisition module 10 functions as a module for obtaining overall information that is necessary for the controller 20 to implement first to fifth applications described later, and includes a steering wheel angle acquisition part 11, a lever ratio acquisition part 12, a braking initiation manipulation acquisition unit 13, a wheel velocity acquisition part 14, and a vehicle information acquisition unit 15 as illustrated in FIG. 38. The steering wheel angle acquisition part 11 and the lever ratio acquisition part 12 are related to the first application. The braking initiation manipulation acquisition unit 13 is related to the second application. The wheel velocity acquisition part 14 is related to the third and fourth applications. The vehicle information acquisition unit 15 is related to the fifth application.

The steering wheel angle acquisition part 11 may obtain a steering wheel angle. The steering wheel angle may correspond to a steering angle formed through the steering of a driver for a steering wheel or a steering angle command from an ADAS system. Accordingly, the steering wheel angle acquisition part 11 may be implemented as a separate input module for obtaining a steering angle command outputted by a steering angle sensor or the ADAS system mounted on a vehicle.

The lever ratio acquisition part 12 may obtain the lever ratio. In the first application described later, the lever ratio is defined as a parameter indicating whether the front wheel and rear wheel of a bicycle model are inphase or reversed-phased and a steering angle ratio between the front wheel and rear wheel, which are defined with respect to a vehicle, and may have a value of −1 to 1. A sign of the lever ratio indicates whether the front wheel and rear wheel of the bicycle model are inphase or reverse-phased (e.g., an inphase when the sign is a positive value, and a reverse phase when the sign has a negative value). The size of the lever ratio indicates a steering angle ratio between the front wheel and rear wheel of the bicycle model (e.g., when the lever ratio is 0.5, a front wheel steering angle: a rear wheel steering angle=2:1). The lever ratio may be configured to be changed based on a manipulation of a driver. To this end, the lever ratio acquisition part 12 may be implemented as a lever structure (an example of FIG. 39) provided in the interior of a vehicle or a touch screen structure provided in the instrument panel of a vehicle. Accordingly, the lever ratio may be changed by a lever manipulation of a driver or a touch manipulation of a driver on the touch screen.

The braking initiation manipulation acquisition unit 13 may obtain a braking initiation manipulation of a vehicle from a driver. In the second application described later, braking may correspond to a concept including a braking operation (e.g., sudden braking) in the state in which a vehicle drives on a slope S and a braking operation (i.e., parking braking) for maintaining a parked or stopped in a slope S. However, as described later, in the second application, an operation of the present embodiment may be applied when a vehicle moves in a preset low-speed area for the posture stability of the vehicle if a braking operation in the state in which the vehicle drives on the slope S is performed, in that braking is performed through a method of independently controlling the steering of each of the four wheels of the vehicle. The braking initiation manipulation acquisition unit 13 may be implemented in the form of a switch separately provided within a vehicle, and may obtain, as the braking initiation manipulation, a manipulation of a driver for the switch.

The wheel velocity acquisition part 14 may obtain a wheel velocity of the four wheels of a vehicle. The wheel velocity acquisition part 14 may be implemented as a motor sensor for sensing the number of revolutions of an in-wheel motor mounted on each wheel. The wheel velocity acquisition part 14 may obtain wheel velocities of a left front wheel, right front wheel, left rear wheel, and right rear wheel of a vehicle, respectively.

The vehicle information acquisition unit 15 may obtain driving state information and driving environment information of a vehicle. The driving state information may include a vehicle speed and heading angle of a vehicle. The driving environment information may include surrounding image information (e.g., a front image) of a vehicle. In order to obtain such driving state information and driving environment information, the vehicle information acquisition unit 15 may use various sensors (e.g., a vehicle sensor, a gyro sensor, and a camera sensor) mounted on a vehicle. Driving state information and driving environment information of a vehicle obtained by the vehicle information acquisition unit 15 may be used in a process of calculating information on a distance up to a target point, target curvature, and a target steering angle in the fifth application described later.

The controller 20 is a main agent that independently controls the driving and steering of the four wheels of a vehicle through individual driving torque for each of the four wheels, and may be implemented as an electronic control unit (ECU), a central processing unit (CPU), a processor, or a system on chip (SoC). The controller 20 may control a plurality of hardware or software components connected to the controller 20 by driving an operating system or an application, and may perform various data processing and operations. The controller 20 may be configured to execute at least one instruction stored in a memory and store data, that is, a result of the execution, in the memory.

The output unit 30 may correspond to a display, a speaker, etc. which is installed in a cluster of a vehicle or at a specific location within a vehicle.

Hereinafter, the first to fifth applications of the corner module apparatus for a vehicle and detailed operating methods thereof are described chiefly based on an operation of the controller 20.

1. First Application: Individual Steering Architecture

In the first application, the controller 20 may calculate first to fourth target angles of a left front wheel, right front wheel, left rear wheel, and right rear wheel of a vehicle, respectively, based on a steering wheel angle obtained by the steering wheel angle acquisition part 11 and a lever ratio obtained by the lever ratio acquisition part 12, and may independently control the steering of each of the four wheels of the vehicle based on the calculated first to fourth target angles.

Figure 39:
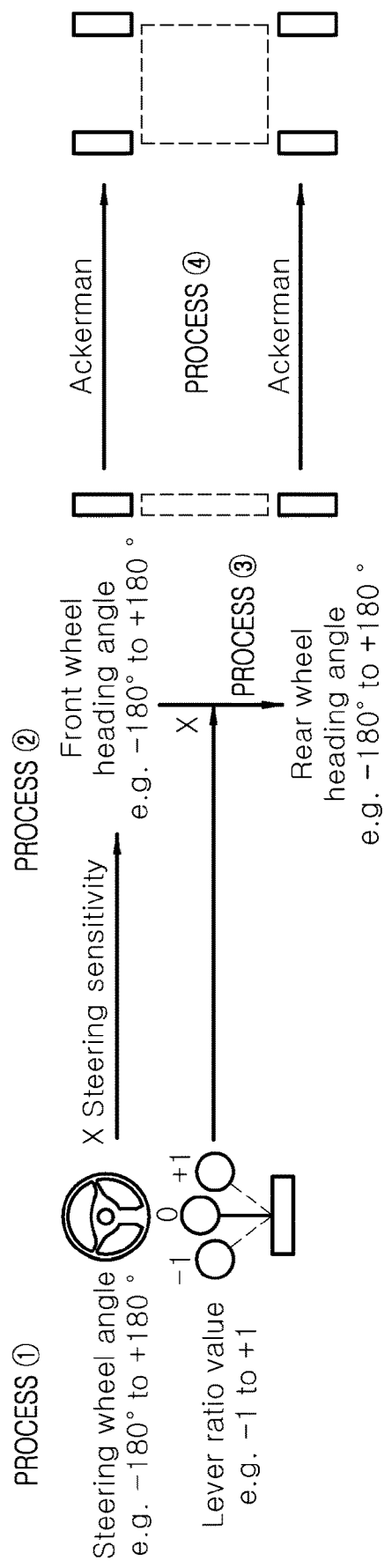
FIG. 39 is a diagram schematically illustrating a series of processes of calculating first to fourth target angles in a first application (individual steering architecture) of a corner module apparatus for a vehicle according to an embodiment of the present disclosure.

FIG. 39 illustrates, as a general example, a series of processes of calculating, by the controller 20, the first to fourth target angles. Referring to FIG. 39, (process ①), first, the controller 20 may receive a steering wheel angle obtained by the steering wheel angle acquisition part 11 and a lever ratio obtained by the lever ratio acquisition part 12. (Process ②) Next, the controller 20 may calculate a front wheel heading angle of the bicycle model from the steering wheel angle. In this case, the controller 20 may calculate the front wheel heading angle by multiplying the steering wheel angle by a preset steering sensitivity. The steering sensitivity may correspond to a total gear ratio (TGR) of a steering gear ratio variable device applied to the vehicle. (Process ③) When the front wheel heading angle is calculated, the controller 20 may calculate a rear wheel heading angle of the bicycle model based on the front wheel heading angle and a lever ratio obtained by the lever ratio acquisition part 12. (Process ④), next, the controller 20 may expand the bicycle model to a four-wheel vehicle model and calculate first to fourth target angles of the left front wheel, right front wheel, left rear wheel, and right rear wheel of the vehicle.

Among the aforementioned processes, the process ④ corresponding to a direct process of calculating the first to fourth target angles may be performed in a differentiated way based on a value of the lever ratio obtained by the lever ratio acquisition part 12. Specifically, in the present embodiment, a steering control mode of the controller 20 for the steering of the four wheels may be divided into a front-wheel steering mode, a four-wheel inphase steering mode, and a four-wheel reversed-phase steering mode based on a value of the lever ratio. The controller 20 may calculate the first to fourth target angles in differentiated ways based on a value of the lever ratio and for each steering control mode determined based on a value of the lever ratio. Hereinafter, a process of calculating the first to fourth target angles based on a value of the lever ratio and a steering control mode is described in detail.

Figure 40:
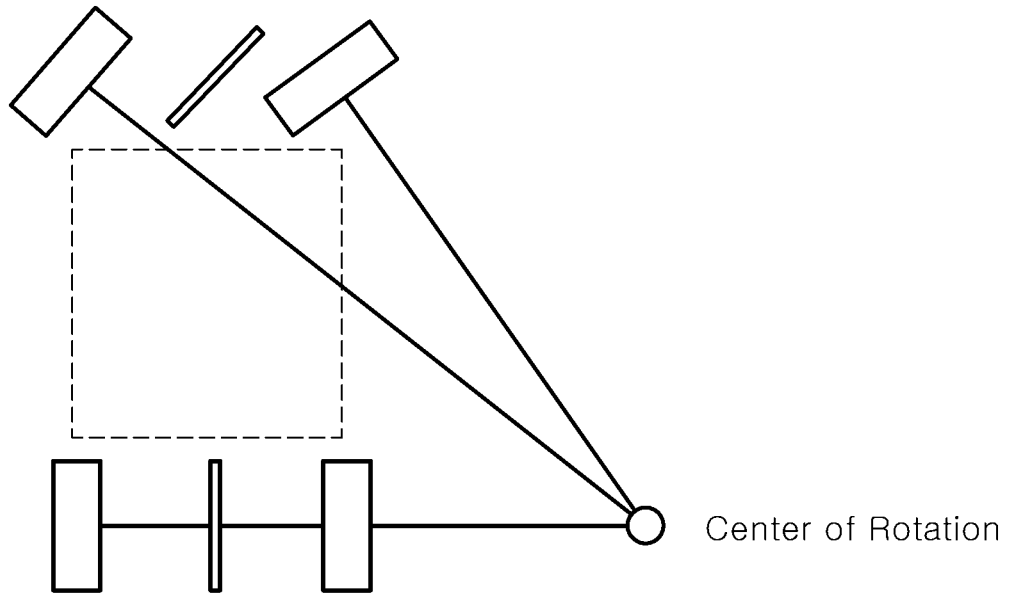
FIG. 40 is a diagram illustrating first to fourth target angles in a front-wheel steering mode in the first application (individual steering architecture) of a corner module apparatus for a vehicle according to an embodiment of the present disclosure.

First, the front-wheel steering mode corresponds to a steering control mode when the lever ratio is 0. That is, since the lever ratio is 0, rear-wheel steering control is not performed, and only common front-wheel steering control is performed. In this case, the controller 20 may calculate first and second target angles by applying the Ackerman geometry model to a front wheel heading angle, and may calculate third and fourth target angles as a neutral angle (i.e., 0°) indicative of the longitudinal direction of the vehicle because the lever ratio is 0. FIG. 40 illustrates an example in which when a front wheel heading angle is 45°, first and second target angles are calculated as given values based on the center of rotation according to the Ackerman geometry model.

Next, the four-wheel inphase steering mode corresponds to a steering control mode when the lever ratio is greater than 0 and equal to or smaller than 1. That is, since the lever ratio is a positive value, the front wheel and the rear wheel are independently controlled in the state in which the lever ratio is inphase. In the four-wheel inphase steering mode, first to fourth target angles are calculated in differentiated ways "when the lever ratio is greater than 0 and smaller than 1" and "when the lever ratio is 1."

Figure 41:
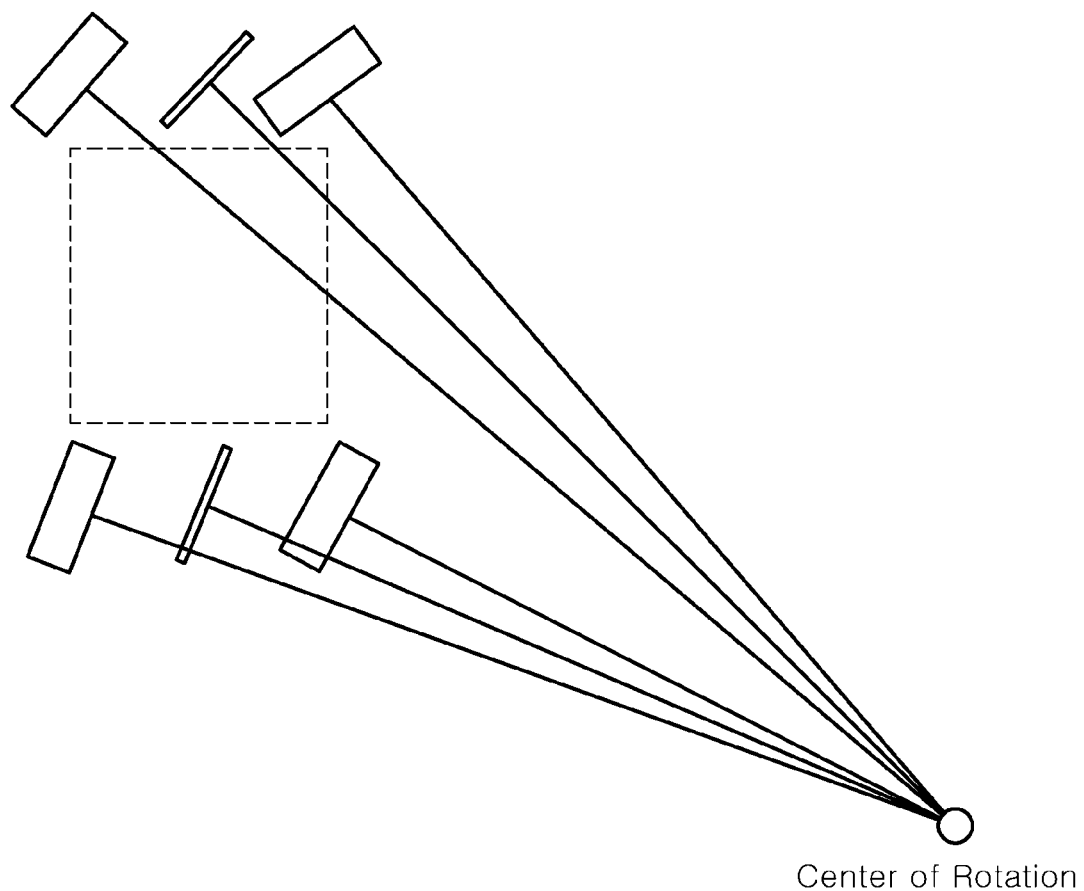
FIGS. 41 and 42 are diagrams illustrating first to fourth target angles in a four-wheel inphase steering mode in the first application (individual steering architecture) of a corner module apparatus for a vehicle according to an embodiment of the present disclosure.

When the lever ratio is greater than 0 and less than 1, the controller 20 may calculate first and second target angles by applying the Ackerman geometry model to a front wheel heading angle. Furthermore, the controller 20 may calculate a rear wheel heading angle of the bicycle model by applying (or multiplying) the lever ratio to the front wheel heading angle, and may calculate third and fourth target angles by applying the Ackerman geometry model to the calculated rear wheel heading angle. FIG. 41 illustrates an example in which when the lever ratio is 0.5, that is, when a front wheel heading angle is 45°, first to fourth target angles are calculated as given values based on the center of rotation according to the Ackerman geometry model.

Figure 42:
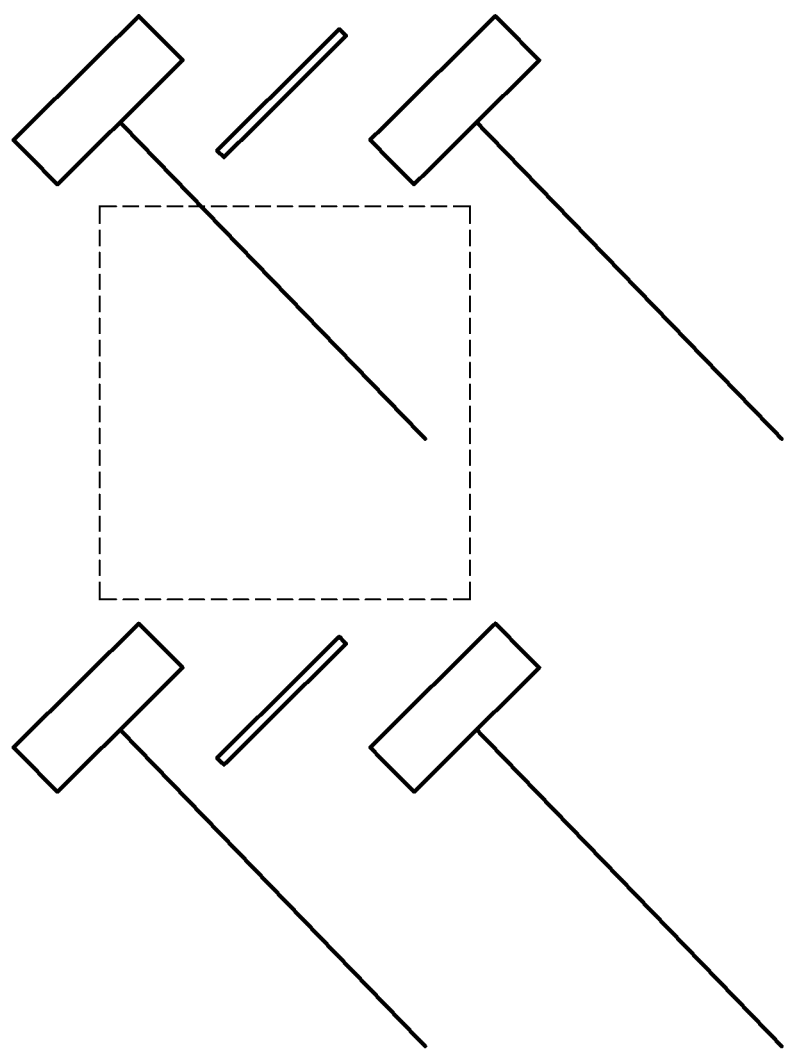

When the lever ratio is 1, the controller 20 may calculate first to fourth target angles as front wheel heading angles. That is, when the lever ratio is 1, this means a state in which the center of rotation according to the Ackerman geometry model is not present, the front wheels and the rear wheels have an inphase state, and steering angles are identically formed. The controller 20 may calculate the first to fourth target angles as front wheel heading angles. FIG. 42 illustrates an example in which when the lever ratio is 1, that is, when a front wheel heading angle is 45°, first to fourth target angles are calculated as front wheel heading angles.

Figure 43:
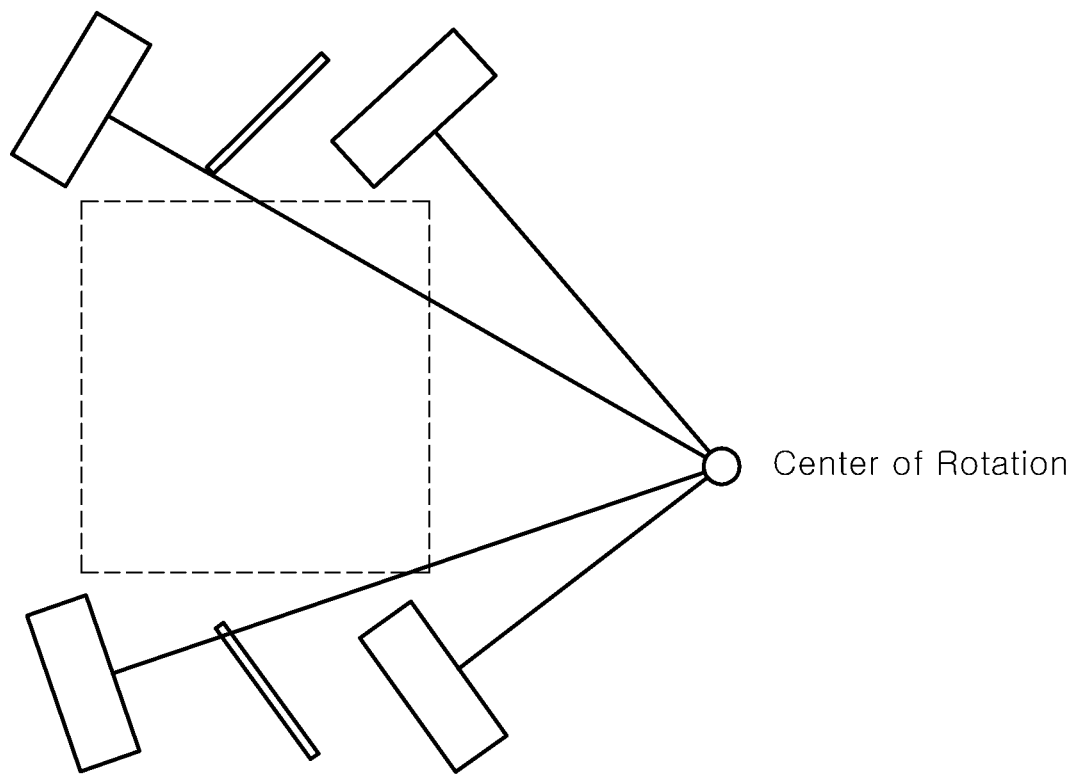
FIGS. 43 and 44 are diagrams illustrating first to fourth target angles in a four-wheel reversed-phase steering mode in the first application (individual steering architecture) of a corner module apparatus for a vehicle according to an embodiment of the present disclosure.
Figure 44:
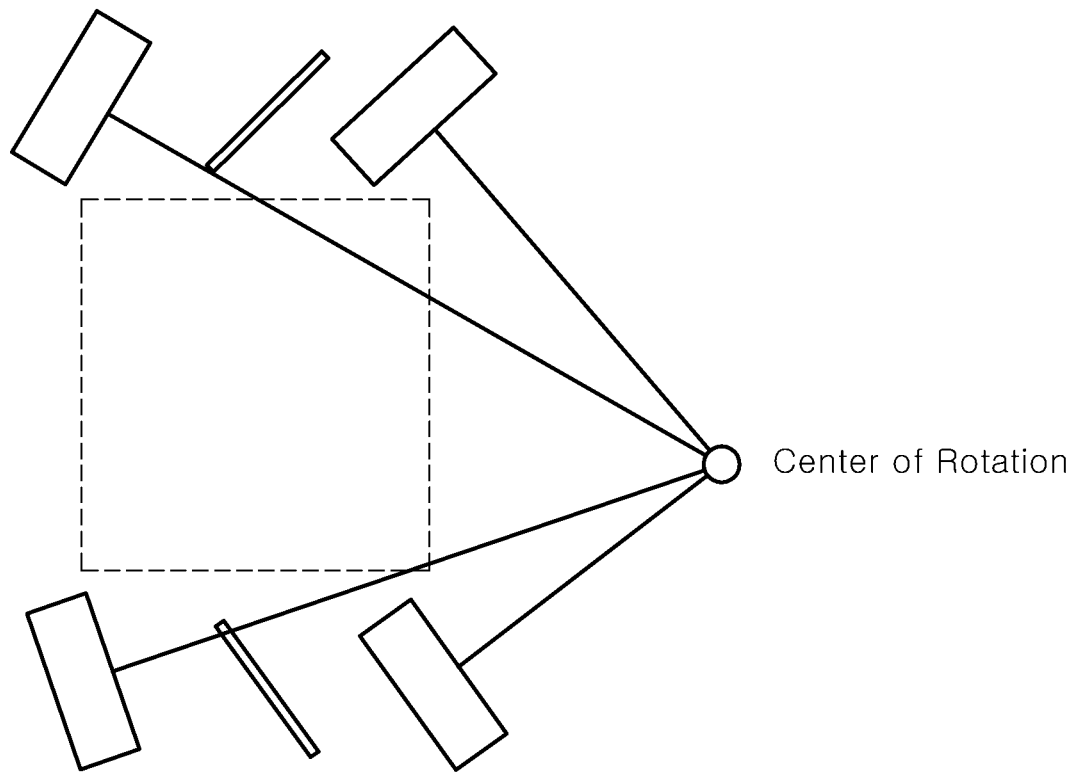

The four-wheel reversed-phase steering mode corresponds to a steering control mode when the lever ratio is equal to greater than −1 and less than 0. That is, since the lever ratio is a negative value, the front wheels and the rear wheels are independently controlled in the state in which the front wheels and the rear wheels have reversed phases. In the four-wheel reversed-phase steering mode, the center of rotation according to the Ackerman geometry model is always present. Accordingly, the controller 20 may calculate first and second target angles by applying the Ackerman geometry model to a front wheel heading angle, and may calculate third and fourth target angles by applying the Ackerman geometry model to a rear wheel heading angle of the bicycle model which is calculated by applying the lever ratio to the front wheel heading angle. FIG. 43 illustrates an example in which when the lever ratio is −0.8, that is, when a front wheel heading angle is 45°, first to fourth target angles are calculated as predetermined values based on the center of rotation according to the Ackerman geometry model. FIG. 44 illustrates an example in which when the lever ratio is −1, that is, when a front wheel heading angle is 45°, first to fourth target angles are calculated as predetermined values based on the center of rotation according to the Ackerman geometry model.

Table 1 below illustrates a method of calculating the first to fourth target angles based on a value of the lever ratio and a steering control mode.

TABLE 1

| Steering control mode | Lever ratio (R) | Method of calculating target angle |
| --- | --- | --- |
| Front-wheel steering mode | 0 | First and second target angles: Ackerman geometry model<br>Third and fourth target angles: neutral angle |
| Four-wheel inphase steering mode | 0 < R < 1<br>R = 1 | First to fourth target angles: Ackerman geometry model<br>First to fourth target angles: front wheel heading angle |
| Four-wheel reversed-phase steering mode | −1 ≤ R < 0 | First to fourth target angles: Ackerman geometry model |

As described above, the lever ratio may be configured to be changed and set based on a manipulation of a driver. Accordingly, if sudden transition of a steering control mode is caused because the lever ratio is changed in a process of a vehicle driving, there occurs a problem in that the driving stability of a vehicle, such as a slip of a vehicle tire to the rollover of a vehicle, is reduced. In order to prevent such a problem, in the present embodiment, when the transition of a steering control mode is caused due to a change in the lever ratio, the controller 20 may perform the transition of the steering control mode during a preset excess time by controlling change speeds of the steering angles of the four wheels at a preset control speed. The control speed may be preset in the controller 20 based on experimental results of a designer so that the control speed has a sufficiently low value within a range in which the driving stability of a vehicle is secured without causing sudden transition of a steering control mode. The excess time may also be preset in the controller 20 as a value corresponding to a control speed. As a detailed example, if transition to the four-wheel reversed-phase steering mode is caused because a driver changes the lever ratio to −0.5 in the state in which a vehicle drives in the four-wheel inphase steering mode, the controller 20 changes a current steering angle of a rear wheel to a target angle (i.e., third and fourth target angles in the four-wheel reversed-phase steering mode), but may slowly change the steering angle of the rear wheel to the third and fourth target angles based on a control speed so that the driving stability of the vehicle can be secured.

Figure 45:
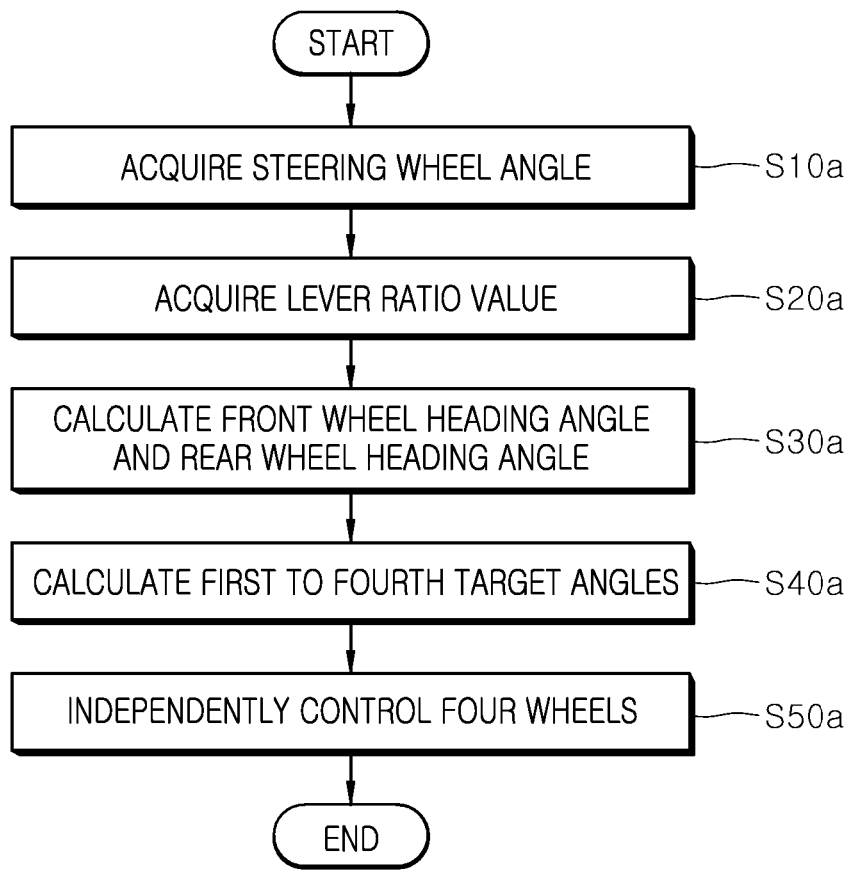
FIG. 45 is a flowchart for describing an operating method in the first application (individual steering architecture) of a corner module apparatus for a vehicle according to an embodiment of the present disclosure.

FIG. 45 is a flowchart for describing an operating method in the first application of the corner module apparatus for a vehicle according to an embodiment of the present disclosure. An operating method of the corner module apparatus for a vehicle according to the present embodiment is described with reference to FIG. 45. A detailed description of a portion redundant with the aforementioned contents is omitted, and a time-series configuration thereof is chiefly described.

First, the steering wheel angle acquisition part 11 obtains a steering wheel angle (S10a). The lever ratio acquisition part 12 obtains a lever ratio indicating whether the front wheels and rear wheels of the bicycle model are inphase and reversed-phased and a steering angle ratio between the front wheels and the rear wheels, which have been defined with respect to a vehicle (S20a). The lever ratio has a value of −1 to 1. A sign of the lever ratio indicates whether the front wheels and rear wheels of the bicycle model are inphase and reversed-phased. The size of the lever ratio indicates a steering angle ratio between the front wheels and rear wheels of the bicycle model.

Next, the controller 20 calculates a front wheel heading angle of the bicycle model based on the steering wheel angle obtained in step S10a, and calculates a rear wheel heading angle of the bicycle model based on the calculated front wheel heading angle and the lever ratio obtained in step S20a (S30a). In step S30a, the controller 20 calculates the front wheel heading angle by multiplying the steering wheel angle by a preset steering sensitivity.

Next, the controller 20 expands the bicycle model to a four-wheel vehicle model, and calculates first to fourth target angles of a left front wheel, right front wheel, left rear wheel, and right rear wheel of the vehicle, respectively (S40a). A method of calculating the first to fourth target angles in step S40a is differentially determined based on the lever ratio obtained in step S20a. Specifically, the first to fourth target angles are calculated in differentiated ways based on a value of the lever ratio and for each steering control mode determined based on a value of the lever ratio. The steering control mode includes the front-wheel steering mode corresponding to a case where the lever ratio is 0, the four-wheel inphase steering mode corresponding to a case where the lever ratio is greater than 0 and equal to or smaller than 1, and the four-wheel reversed-phase steering mode corresponding to a case where the lever ratio is equal to greater than −1 and less than 0.

When a steering control mode of the vehicle is the front-wheel steering mode, in step S40a, the controller 20 calculates the first and second target angles by applying the Ackerman geometry model to the front wheel heading angle, and calculates the third and fourth target angles as a neutral angle indicative of the longitudinal direction of the vehicle.

When a steering control mode of the vehicle is the four-wheel inphase steering mode or the four-wheel reversed-phase steering mode in the state in which the lever ratio is greater than 0 and less than 1, in step S40a, the controller 20 (i) calculates the first and second target angles by applying the Ackerman geometry model to the front wheel heading angle and (ii) calculates a rear wheel heading angle of the bicycle model by applying the lever ratio to the front wheel heading angle and calculates the third and fourth target angles by applying the Ackerman geometry model to the calculated rear wheel heading angle.

When a steering control mode of the vehicle is the four-wheel inphase steering mode in the state in which the lever ratio is 1, in step S40a, the controller 20 calculates the first to fourth target angles as front wheel heading angles.

When the first to fourth target angles are calculated in step S40a, the controller 20 independently controls the steering of each of the four wheels of the vehicle based on the first to fourth target angles (S50a). If the transition of a steering control mode is caused due to a change in the lever ratio, in step S50a, the controller 20 performs the transition of the steering control mode during a preset excess time by controlling change speeds of the steering angles of the four wheels at a preset control speed.

According to the first application, there are advantages in terms of expandability and a degree of freedom because independent control is applied to the steering of each of the four wheels compared to the existing front wheel steering method or rear wheel steering method (RWS). Independent control of the four wheels can be safely performed even in a driving state in addition to a case where a vehicle is parked and stopped because the transition of a steering control mode is implemented to have continuity.

2. Second Application: Braking Mechanism Through Individual Steering

In the second application, when a braking initiation manipulation is obtained by the braking initiation manipulation acquisition unit 13, the controller 20 may perform the braking of a vehicle by independently controlling the steering of four wheels of the vehicle.

In the case of a structure in which the four wheels are independently controlled, the brake of each corner module may be removed depending on a design method, and a method of performing braking through an in-wheel motor may be applied. In this case, since control of the in-wheel motor is impossible in the state in which a power source of the vehicle has been off, a new braking logic is required because braking control is impossible. The present embodiment proposes a method of performing the braking of a vehicle in a way to control the state in which the four wheels of the vehicle have been aligned by independently controlling the steering of each of the four wheels with consideration taken of the design expandability of devices for independently driving the four wheels and the need for corresponding braking logic. The method is described in detail below. In order to help understanding of an embodiment, an example in which a braking operation (i.e., parking braking) for maintaining a parked or stopped state in a slope S is described.

Figure 46:
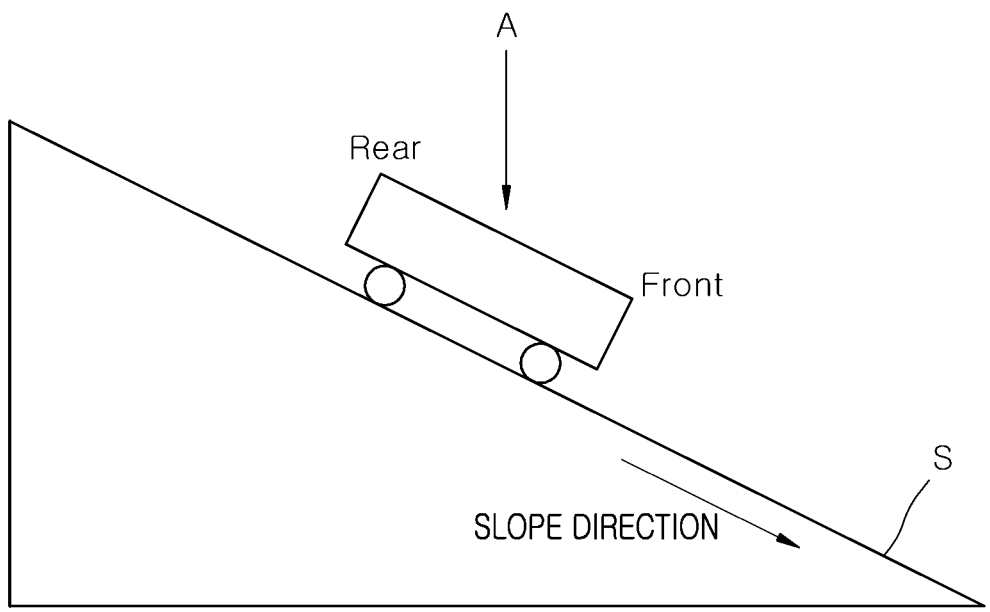
FIGS. 46 to 49 are diagrams illustrating a relation between a slope and a location of a vehicle in a second application (a braking mechanism through individual steering) of a corner module apparatus for a vehicle according to an embodiment of the present disclosure.
Figure 47:
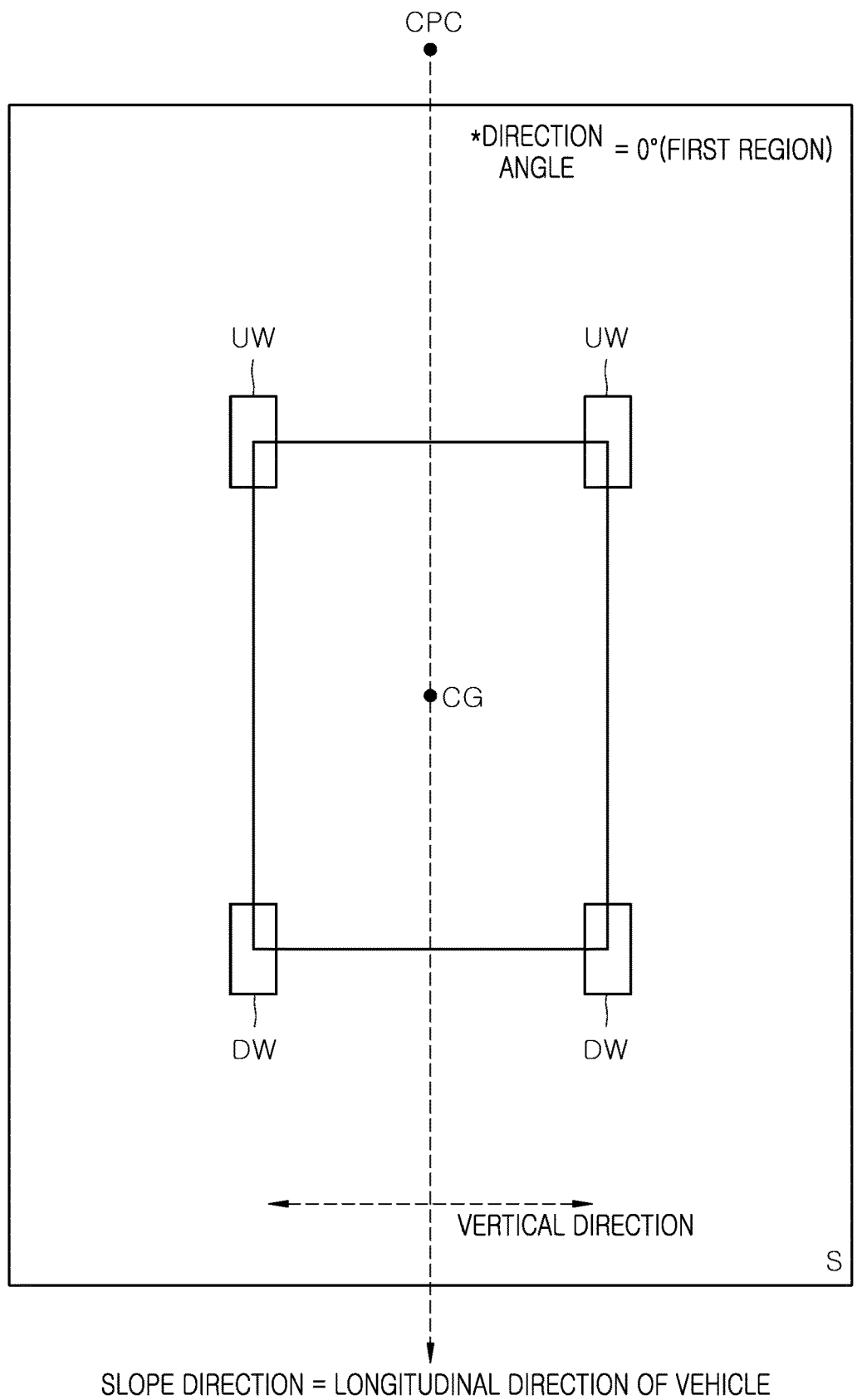
Figure 48:
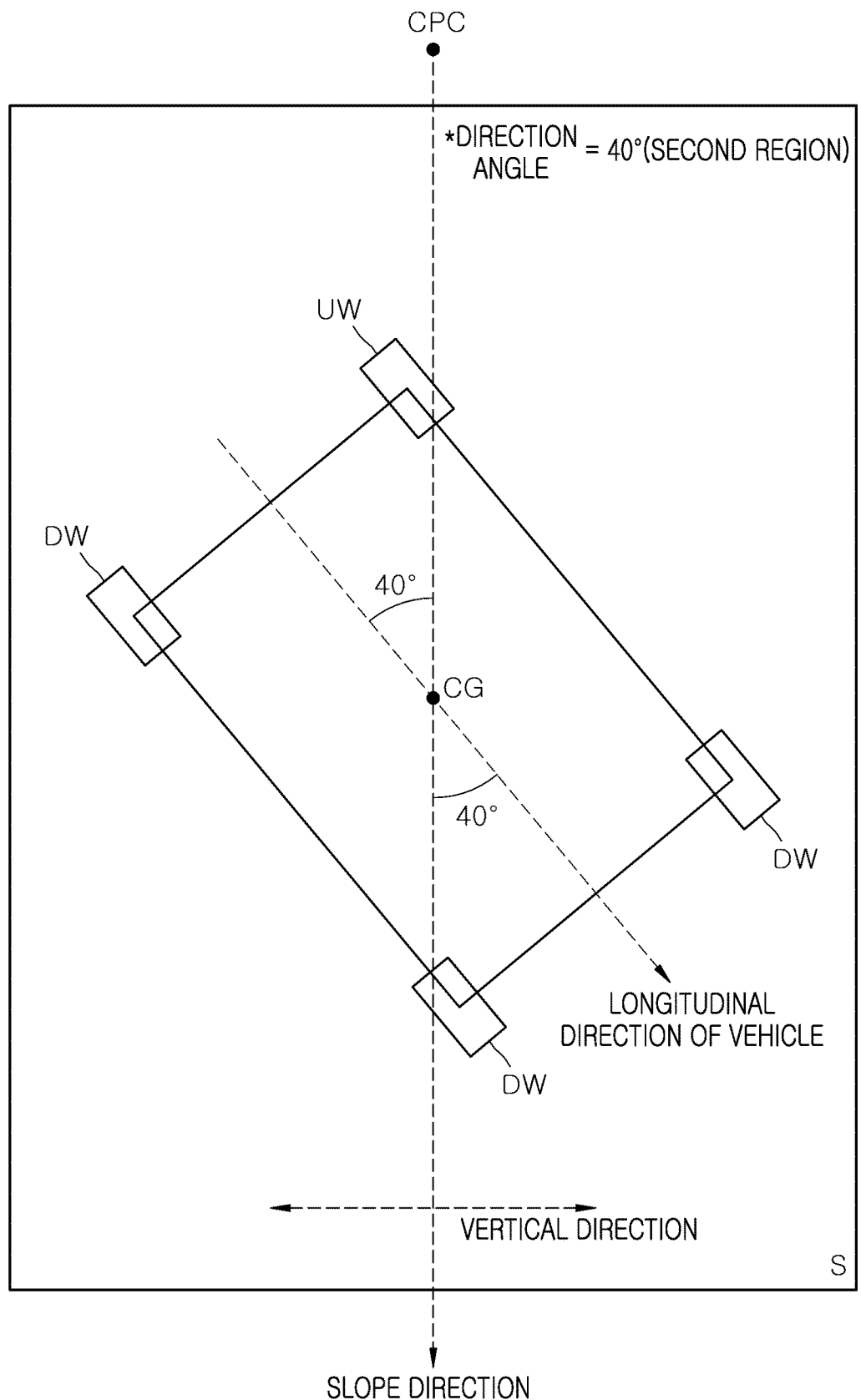
Figure 49:
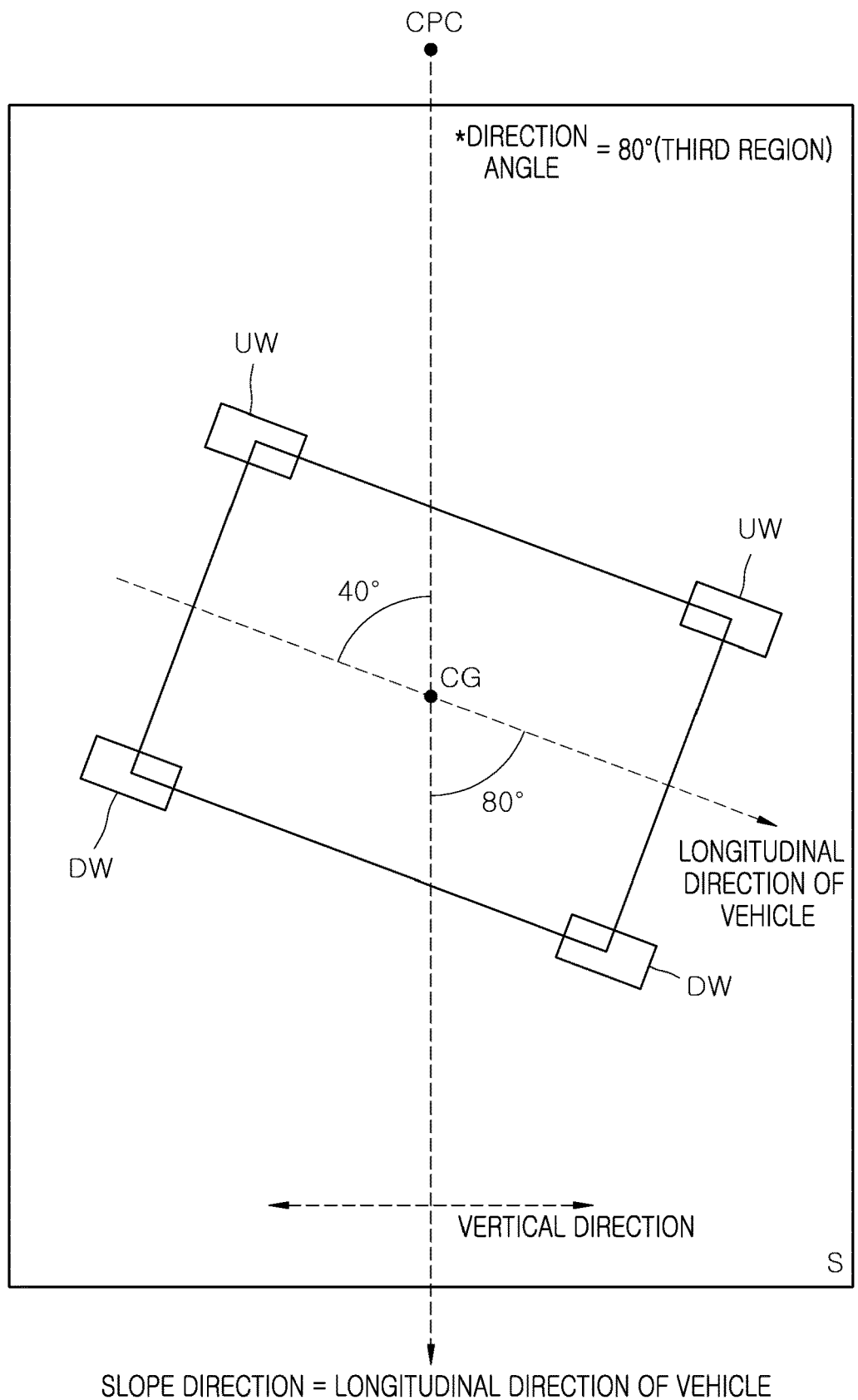

In the present embodiment, when a braking initiation manipulation is obtained by the braking initiation manipulation acquisition unit 13 in the state in which a vehicle has been placed in the slope S, the controller 20 may perform the braking of the vehicle by independently controlling the steering of four wheels of the vehicle based on an angle (acute angle) (defined as a direction angle in the present embodiment) between an inclined direction of the slope S and a longitudinal direction of the vehicle. FIG. 46 illustrates an example in which the vehicle is placed in the slope S. FIGS. 47 to 49 illustrate postures of the vehicle when the vehicle and the slope S are viewed from a direction "A" in FIG. 46 (FIG. 47: the direction angle is 0°, FIG. 48: the direction angle is 40°, FIG. 49: the direction angle is 80°).

In this case, the controller 20 may align the four wheels of the vehicle according to different rules with respect to down wheels DW disposed on the lower side of the slope S and up wheels UW disposed on the upper side of the slope S among the four wheels. The state in which the direction angle is 0° in FIG. 47 is described as an example. A relatively great load is applied to the down wheels DW disposed on the lower side of the slope S and a relatively small load is applied to the up wheels UW disposed on the upper side of the slope S, on the basis of the inclined direction of the slope S. Accordingly, aligning the down wheels DW to which the relatively great load is applied in a way to limit a movement of the vehicle to the inclined direction of the slope S and aligning the up wheels UW to which the relatively small load is applied in a way to limit a movement of the vehicle to a direction perpendicular to the slope direction are effective in prohibiting a movement of the vehicle from the slope S to the longitudinal direction and transverse direction of the vehicle and maintaining the parking and stopping state of the vehicle.

Accordingly, if steering control rules for a down wheel DW and an up wheel UW are indicated as a first rule and a second rule, respectively, the first rule may be predefined in the controller 20 as a rule for limiting a movement of the vehicle to an inclined direction of the slope S. Furthermore, the second rule may be predefined in the controller 20 as a rule for limiting a movement of the vehicle to a direction perpendicular to a slope direction of the slope S on the inclined plane of the slope.

Figure 50:
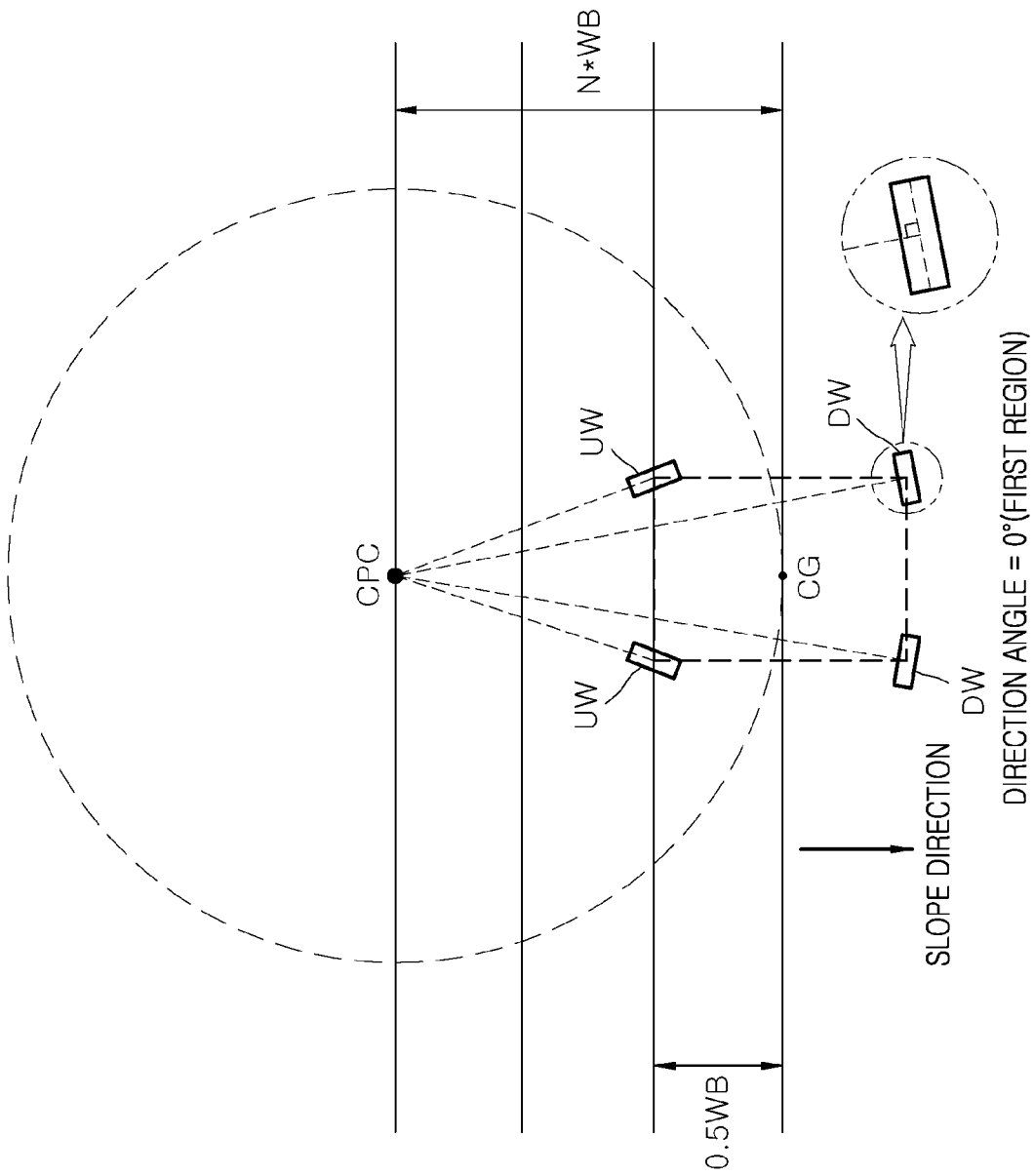
FIGS. 50 to 52 are diagrams illustrating the state in which wheels have been aligned according to a direction angle in the second application (the braking mechanism through individual steering) a corner module apparatus for a vehicle according to an embodiment of the present disclosure.

A process of aligning down wheels DW and up wheels UW according to the first rule and the second rule is described in detail with reference to FIG. 50 illustrating an example in which the direction angle is 0°. When the direction angle is 0°, down wheels DW are defined as two wheels disposed on the lower side of the slope S among the four wheels. Up wheels UW are defined as the remaining two wheels disposed on the upper side of the slope S among the four wheels (the down wheels DW and the up wheels UW are differently defined depending on the direction angle, and is described in detail later).

Figure 51:
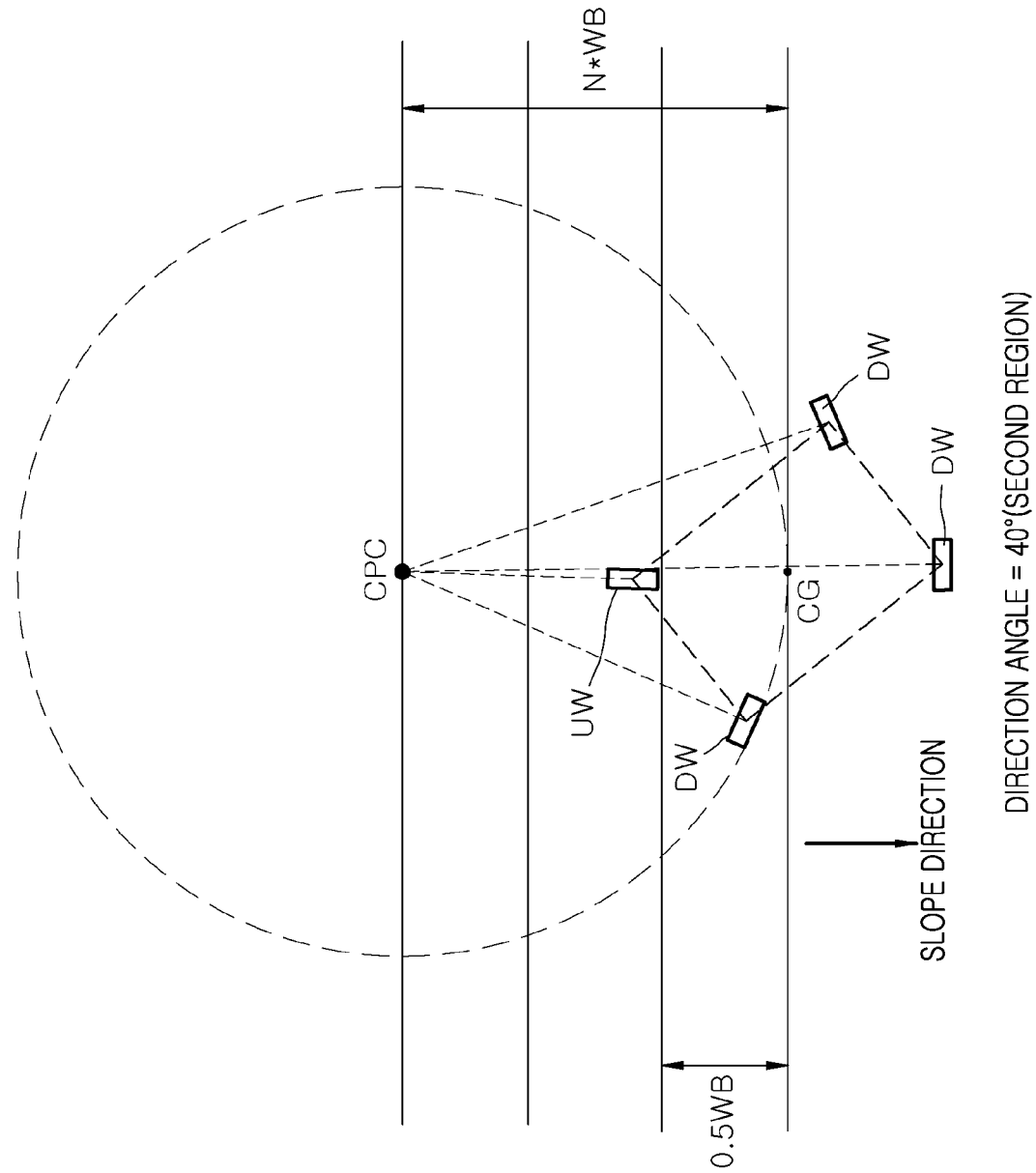
Figure 52:
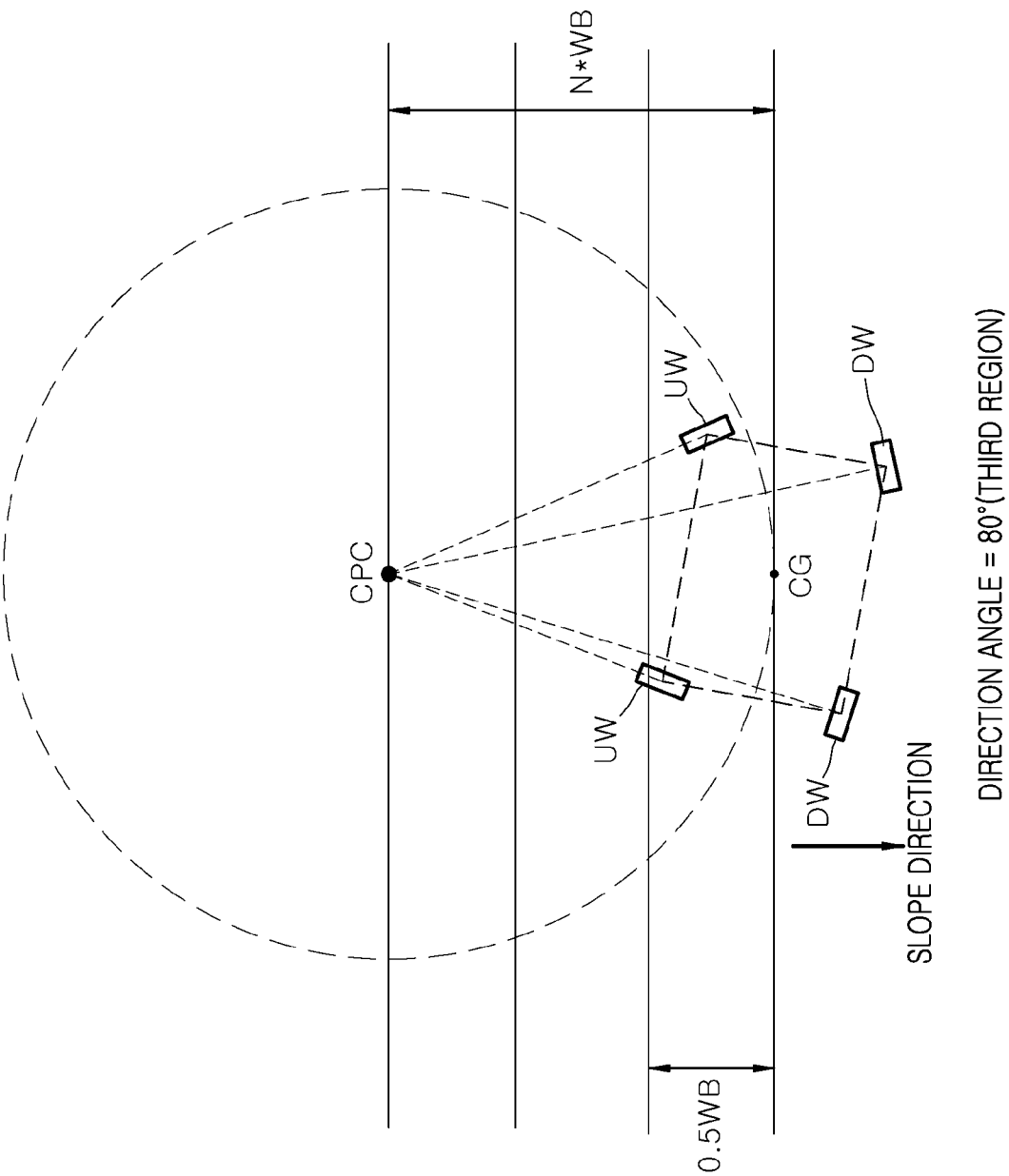

As a criterion for aligning down wheels DW and up wheels UW, the present embodiment adopts a reference point that is defined as a point separated from the center of gravity (GC) of a vehicle by a set distance in a direction opposite to a slope direction. If a circle having the reference point as a center thereof and passing through the center of gravity (GC) of the vehicle is defined as a parking circle, the reference point may be named the center of parking circle (CPC). Wheels may be aligned on the basis of the reference point CPC, and the vehicle may converge on a stable state with respect to the slope S. The set distance may be represented as N*WB. In this case, WB is a distance between a front wheel axle and a rear wheel axle, and N corresponds to a value that is set based on a gradient of the vehicle (e.g., the controller 20 may set a value of N so that N has a higher value as the gradient becomes greater. In FIGS. 50 to 52, N=1.5). An algorithm that defines the reference point CPC may be preset in the controller 20.

If the reference point CPC is defined as described above, the first rule may be defined as a rule for aligning down wheels DW so that a straight line that connects the reference point CPC and a center point of the down wheels DW and long axes of the down wheels DW become perpendicular to each other. The second rule may be defined as a rule for aligning up wheels UW so that a straight line that connects the reference point CPC and a center point of the up wheels UW and long axes of the up wheels UW are placed on the same line.

Accordingly, as illustrated in FIG. 50, the controller 20 may align down wheels DW so that a straight line that connects the reference point CPC and a center point of the down wheels DW and long axes of the down wheels DW become perpendicular to each other according to the first rule, and may align up wheels UW so that a straight line that connects the reference point CPC and a center point of the up wheels UW and long axes of the up wheels UW are placed on the same line according to the second rule.

A case where down wheels DW correspond to two wheels disposed on the lower side of the slope S among the four wheels and up wheels UW correspond to the remaining two wheels disposed on the upper side of the slope S among the four wheels has been described. However, as described above, in the present embodiment, down wheels DW and up wheels UW may be differently defined depending on a direction angle. As described above, a first area to a third area are defined.

The first area: an area in which the direction angle is equal to or greater than 0° and less than a first reference angle The second area: an area in which the direction angle is equal to or greater than the first reference angle and less than a second reference angle The third area: an area in which the direction angle is equal to or greater than the second reference angle or equal to or smaller than 90°

The first reference angle and the second reference angle may be preset in the controller 20 based on specifications of a vehicle and experimental results of a designer. For example, the first reference angle may be set to 20°, and the second reference angle may be set to 70°.

Accordingly, if the direction angle is present in the first area or the third area, down wheels DW may be defined as two wheels disposed on the lower side of the slope S among the four wheels, and up wheels UW may be defined as the remaining two wheels disposed on the upper side of the slope S among the four wheels. Furthermore, if the direction angle is present in the second area, down wheels DW may be defined as three wheels disposed on the lower side of the slope S among the four wheels, and up wheel UW may be defined as the remaining one wheel disposed on the upper side of the slope S. A case where the direction angle is present in the first area has been described with reference to FIG. 50. Accordingly, cases where the direction angle is present in the second area and the third area are described.

FIGS. 48 and 51 illustrate examples of a case where the direction angle is 40° and present in the second area. The controller 20 may align down wheels DW so that a straight line that connects the reference point CPC and a center point of down wheels DW (i.e., three down wheels DW) and long axes of the down wheels DW become perpendicular to each other according to the first rule. Furthermore, the controller 20 may align up wheels UW so that a straight line that connects the reference point CPC and a center point of an up wheel UW (i.e., the remaining one up wheel UW) and long axes of the up wheels UW are placed on the same line according to the second rule.

FIGS. 49 and 52 illustrate examples of a case where the direction angle is 80° and present in the third area. The controller 20 may align down wheels DW so that a straight line that connects the reference point CPC and a center point of down wheels DW (i.e., two down wheels DW) and the long axes of the down wheels DW become perpendicular to each other according to the first rule. Furthermore, the controller 20 may align up wheels UW so that a straight line that connects the reference point CPC and a center point of up wheels UW (i.e., the remaining two up wheels UW) and long axes of the up wheels UW are placed on the same line according to the second rule.

Through such control of the steering of each wheel and braking through alignment, a movement of a vehicle to a longitudinal direction and transverse direction of the vehicle in the slope S can be prohibited, and a parking and stopping state can be effectively maintained.

Figure 53:
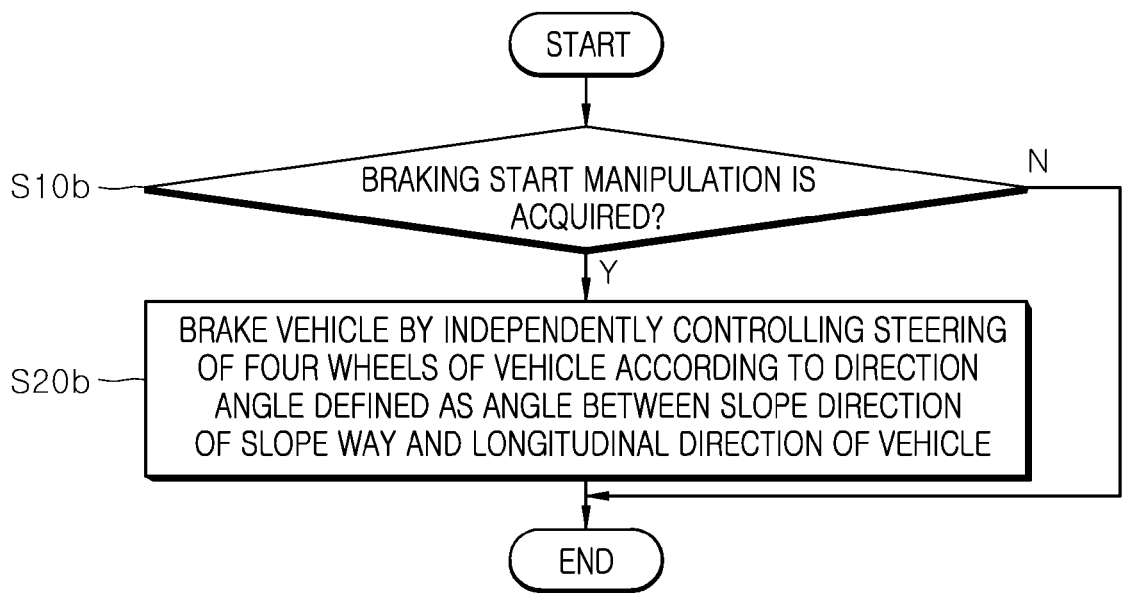
FIG. 53 is a flowchart for describing an operating method in the second application (the braking mechanism through individual steering) of a corner module apparatus for a vehicle according to an embodiment of the present disclosure.

FIG. 53 is a flowchart for describing an operating method in the second application of the corner module apparatus for a vehicle according to an embodiment of the present disclosure. An operating method of the corner module apparatus for a vehicle according to the present embodiment is described with reference FIG. 53. A detailed description of a portion redundant with the aforementioned contents is omitted, and a time-series configuration thereof is chiefly described.

First, the controller 20 determines whether a braking initiation manipulation of a vehicle by a driver has been obtained through the braking initiation manipulation acquisition unit 13 (S10b).

Next, when the braking initiation manipulation is obtained in the state in which the vehicle has been placed in the slope S, the controller 20 performs the braking of the vehicle by independently controlling the steering of four wheels of the vehicle based on a direction angle that is defined as an angle between an inclined direction of the slope S and a longitudinal direction of the vehicle (S20b).

In step S20b, the controller 20 aligns the four wheels of the vehicle according to the first rule and the second rule with respect to down wheels DW disposed on the lower side of the slope S and up wheels UW disposed on the upper side of the slope S among the four wheels of the vehicle. In this case, the down wheel DW and the up wheel UW may be defined based on the direction angle. Specifically, when the direction angle is present in the first area or the third area, the down wheels DW may be defined as two wheels disposed on the lower side of the slope S among the four wheels of the vehicle, and the up wheels UW may be defined as the remaining two wheels disposed on the upper side of the slope S among the four wheels of the vehicle. Furthermore, when the direction angle is present in the second area, the down wheels DW may be defined as three wheels disposed on the lower side of the slope S among the four wheels of the vehicle, and the up wheel UW may be defined as the remaining one wheel disposed on the upper side of the slope S among the four wheels of the vehicle.

The aforementioned first rule is a rule for limiting a movement of a vehicle to a slope direction. Furthermore, the second rule is a rule for limiting a movement of a vehicle to a direction perpendicular to a slope direction on an inclined plane of the slope S. The first rule and the second rule may be predefined in the controller 20. Specifically, if a point isolated from the center of gravity (GC) of the vehicle by a set distance in a direction opposite to the slope direction is defined as the reference point CPC, the first rule is defined as a rule for aligning down wheels DW so that a straight line that connects the reference point CPC and a center point of down wheels DW, and long axes of the down wheels DW become perpendicular to each other. The second rule is defined as a rule for aligning up wheels UW so that a straight line that connects the reference point CPC and a center point of up wheels UW and long axes of the up wheels UW are placed on the same line. Accordingly, in step S20, the controller 20 aligns down wheels DW so that a straight line that connects the reference point CPC and a center point of down wheels DW and long axes of the down wheels DW become perpendicular to each other according to the first rule, and aligns up wheels UW so that a straight line that connects the reference point CPC and a center point of up wheels UW and long axes of the up wheels UW are placed on the same line according to the second rule.

According to the second application, the braking of a vehicle can be safely performed regardless of the on and off state of a power source of the vehicle because the braking of the vehicle is performed in a way to control the state in which the four wheels of the vehicle have been aligned by independently controlling the steering of each of the four wheels.

3. Third Application: Posture Control Mechanism for Improving Straight Driving Performance In the case of the existing vehicle having an internal combustion engine structure, driving power is delivered through an engine—drive shaft—differential—axial shaft. In contrast, in the case of a four-wheel independent-driving method premised by the present embodiment, a speed difference may occur between the four wheels because the four wheels are individually and independently driven and an axial shaft is not present. Such a speed difference between the four wheels becomes a danger element that causes the spin or rollover of a vehicle when the vehicle drives straight ahead. Accordingly, the third application proposes a method of improving straight driving performance of a vehicle through an approach in terms of driving control, not in terms of mechanical or additional steering control of a vehicle.

To this end, the controller 20 may detect an abnormal wheel that causes the deterioration of straight driving performance of a vehicle based on the four wheel velocities obtained by the wheel velocity acquisition part 14, may calculate a compensation parameter for compensating for a deviation between the wheel velocities based on a wheel velocity of the detected abnormal wheel, may determine target driving torque for driving the abnormal wheel based on the calculated compensation parameter, and may control the driving of the abnormal wheel based on the determined target driving torque. Hereinafter, a configuration of the present embodiment is described in detail for each operation of the controller 20.

First, in relation to the method of detecting an abnormal wheel, the controller 20 may detect an abnormal wheel in a way to calculate a first average value of the four wheel velocities and determining whether an error between the calculated first average value and each of the four wheel velocities is equal to or greater than a preset threshold value. If wheel velocities of a left front wheel, right front wheel, left rear wheel, and right rear wheel of a vehicle are $V_{fl}$, $V_{fr}$, $V_{rl}$, and $V_{rr}$, a first average value $V_{avg}$ may be represented as $(V_{fl}+V_{fr}+V_{rl}+V_{rr})/4$. A method of detecting an abnormal wheel may be represented as a conditional expression "$V_{avg}-V_i \geq$ threshold value, i=fl, fr, rl, rr." For example, if a wheel that satisfies the conditional expression corresponds to the left front wheel (fl), an abnormal wheel may be specified as the left front wheel. If a wheel that satisfies the conditional expression corresponds is plural, an abnormal wheel may be specified as a wheel having a lower wheel velocity among the plurality of wheels. Accordingly, an abnormal wheel is specified as a wheel that deteriorates straight driving performance of a vehicle because the abnormal wheel has a lower wheel velocity by a predetermined value or more than other wheels when a vehicle drives straight ahead. In the conditional expression, the threshold value may be defined as another value based on the first average value. For example, by defining that the threshold value has a higher value as the first average value has a higher value, an abnormal wheel may be determined based on a more reinforced criterion for the driving stability of a vehicle in a high-speed area.

When detecting an abnormal wheel, the controller 20 may calculate a compensation parameter for compensating for a deviation between the wheel velocities based on a wheel velocity of the detected abnormal wheel. Compensating for a deviation between the wheel velocities means that a deviation between the wheel velocities of the abnormal wheel and another wheel is reduced by increasing and compensating for driving torque of the abnormal wheel (i.e., by increasing the wheel velocity of the abnormal wheel).

In this case, the controller 20 may calculate a second average value of wheel velocities of three wheels except the abnormal wheel, and may calculate a compensation parameter by using, as factors, a difference value between the calculated second average value and the wheel velocity of the abnormal wheel and a variable gain according to the second average value. In the example in which an abnormal wheel is detected as the left front wheel, the second average value $V_{target}$ may be represented as $(V_{fr}+V_{rl}+V_{rr})/3$, and the compensation parameter may be represented as $\alpha*V_{target}*(V_{target}-V_{fl})$ In the equation of the compensation parameter, the second term $V_{target}$ functions as a term for taking into consideration a target wheel velocity that is the subject of tracking in the process of calculating the compensation parameter, and the third term $V_{target}-V_{fl}$ functions as a term for taking into consideration a deviation between the wheel velocity of the abnormal wheel and a target wheel velocity in the process of calculating the compensation parameter. The first term a is a variable gain, and functions as a scaling factor for scaling the size of the compensation parameter.

Figure 54:
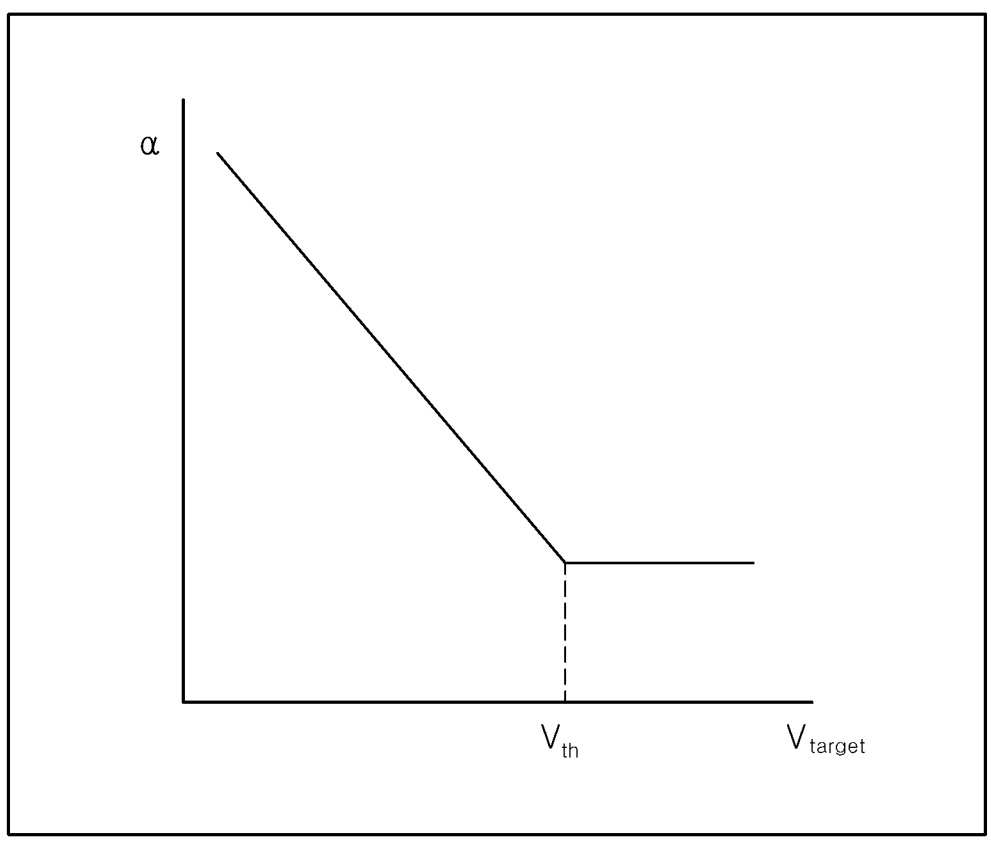
FIG. 54 is a diagram illustrating a method of determining a variable gain in a third application (a posture control mechanism for improving straight driving performance) of a corner module apparatus for a vehicle according to an embodiment of the present disclosure.

As illustrated in FIG. 54, the variable gain may be determined as a value that is decreased as the second average value is increased when the second average value ($V_{target}$) is placed in a predefined middle and low-speed area (e.g., an area having a predefined threshold velocity ($V_{th}$) or less), and may be determined as a predefined fixed when the second average value ($V_{target}$) is placed in a predefined high-speed area (e.g., an area having more than the predefined threshold velocity ($V_{th}$)). That is, as the second average value $V_{target}$ functioning as a target wheel velocity has a higher value, the compensation parameter functioning as compensation for driving torque of an abnormal wheel is calculated as a lower value. In this case, it is suitable to secure the driving stability of a vehicle without a sudden change in a current driving control state of the vehicle. If the second average value $V_{target}$ is greater than the threshold velocity, it is suitable to maintain the driving stability of the vehicle in calculating the compensation parameter as a lower limit value (i.e., the fixed value). Accordingly, the controller 20 may calculate the compensation parameter so that the compensation parameter has a different value based on the second average value as illustrated in FIG. 54.

When calculating the compensation parameter, the controller 20 may determine target driving torque for driving the abnormal wheel based on the calculated compensation parameter. In this case, the controller 20 may determine the target driving torque by applying current driving torque (i.e., the existing driving torque) for driving the abnormal wheel to the compensation parameter (i.e., target driving torque=current driving torque*compensation parameter). Thereafter, the controller 20 may control the driving of the abnormal wheel based on the target driving torque determined as described above. Since the driving torque for driving the abnormal wheel is compensated for compared to a conventional technology, straight driving performance of the vehicle can be improved.

The controller 20 may recalculate a first average value of the four wheel velocities in the state in which the driving of the abnormal wheel is controlled based on the target driving torque, and may output alarm through the output unit 30 when an error between the recalculated first average value and a wheel velocity of the abnormal wheel is equal to or greater than the threshold value. That is, the controller 20 may determine whether straight driving performance of the vehicle has been improved in a way to determine whether an error between the recalculated first average value and the wheel velocity of the abnormal wheel is less than the threshold value, and may calculate target driving torque through the aforementioned process. Even though the driving of the abnormal wheel has been controlled, if it is determined that the error between the recalculated first average value and the wheel velocity of the abnormal wheel is equal to or greater than the threshold value, such a situation is a situation in which a danger element, such as the spin or rollover of the vehicle, is present because a deviation between the wheel velocities of the four wheels is equal to or greater than a predetermined value. Accordingly, the controller 20 may output alarm through the output unit 30 so that a driver can recognize the corresponding situation.

Figure 55:
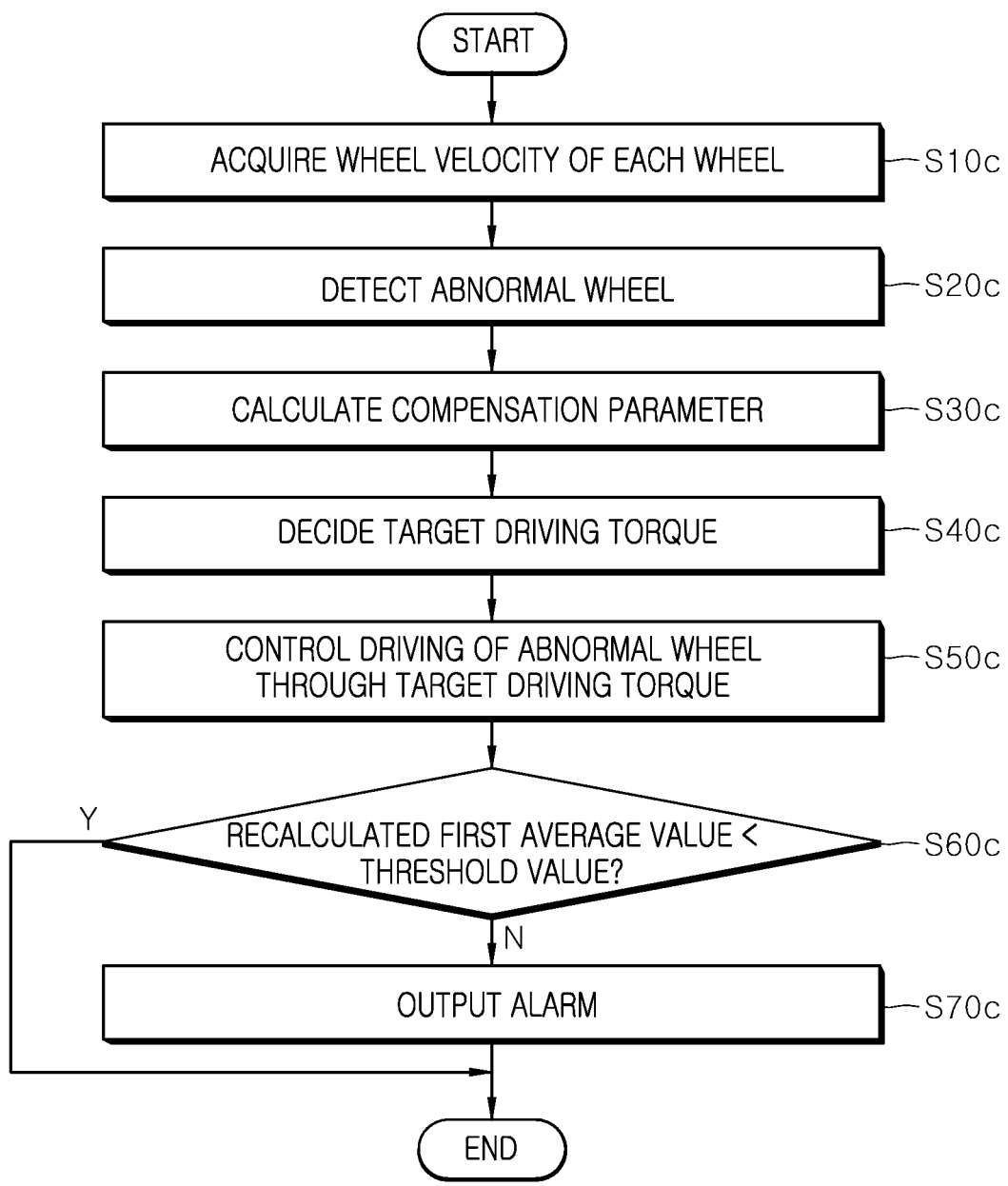
FIG. 55 is a flowchart for describing an operating method in the third application (the posture control mechanism for improving straight driving performance) of a corner module apparatus for a vehicle according to an embodiment of the present disclosure.

FIG. 55 is a flowchart for describing an operating method in the third application of the corner module apparatus for a vehicle according to an embodiment of the present disclosure. The operating method of the corner module apparatus for a vehicle according to the present embodiment is described with reference to FIG. 55. A detailed description of a portion redundant with the aforementioned contents is omitted, and a time-series configuration thereof is chiefly described.

First, the controller 20 obtains four wheel velocities of a vehicle through the wheel velocity acquisition part 14 (S10c).

Next, the controller 20 detects an abnormal wheel that causes the deterioration of straight driving performance of the vehicle based on the four wheel velocities obtained in step S10c (S20c). In step S20c, the controller 20 calculates a first average value of the four wheel velocities, and detects an abnormal wheel in a way to determine whether an error between the calculated first average value and each of the four wheel velocities is equal to or greater than a preset threshold value.

Next, the controller 20 calculates a compensation parameter for compensating for a deviation between the four wheel velocities based on a wheel velocity of the abnormal wheel detected in step S20c (S30c). In step S30c, the controller 20 calculates a second average value of wheel velocities of three wheels except the abnormal wheel, and calculates the compensation parameter by using, as factors, a difference value between the calculated second average value and the wheel velocity of the abnormal wheel, a variable gain according to the second average value, and the second average value. The variable gain is determined as a value that is decreased as the second average value is increased when the second average value is placed in a predefined middle and low-speed area, and is determined as a predefined fixed value when the second average value is placed in a predefined high-speed area.

Next, the controller 20 determines target driving torque for driving the abnormal wheel based on the compensation parameter calculated in step S30c (S40c). Specifically, the controller 20 determines the target driving torque by applying the compensation parameter to current driving torque for driving the abnormal wheel.

Next, the controller 20 controls the driving of the abnormal wheel based on the target driving torque determined in step in S40c (S50c), and controls other wheels except the abnormal wheel based on the existing driving torque.

Next, the controller 20 recalculates a first average value of the four wheel velocities, and compares an error between the recalculated first average value and a wheel velocity of the abnormal wheel with the threshold value (S60c). When determining that the error between the recalculated first average value and the wheel velocity of the abnormal wheel is equal to or greater than the threshold value in step S60c, the controller 20 outputs alarm through the output unit 30 (S70c).

According to the third application, straight driving performance of the vehicle can be improved by compensating for a deviation between wheel velocities through only control of driving torque for four wheels without additional instrument to additional steering control for a vehicle.

4. Fourth Application: Posture Control Mechanism for Solving Slip

In the case of the existing front wheel driving vehicle, there is a limit in that battery consumption of a vehicle is increased because posture control over the vehicle is performed through electronic control systems, such as an anti-lock brake system (ABS), an electronic stability program (ESP), and electronic controlled suspension (ECS). In the present embodiment, posture control over a vehicle is possible in a way to control the driving and steering of each wheel compared to a conventional posture control over system of a vehicle because the driving of each wheel is independently controlled by applying the four wheel-independent driving method. Hereinafter, a detailed configuration for performing posture control over a vehicle in a way to control the driving and steering of each wheel is described on the basis of an operation of the controller 20.

In the fourth application, the controller 20 may determine whether a predefined slip condition has been satisfied based on a wheel velocity of each wheel obtained by the wheel velocity acquisition part 14, and may perform posture control over a vehicle through driving torque control for controlling driving torque of each wheel when determining that the slip condition has been satisfied.

The slip condition is a case where a slip has occurred in a wheel, and corresponds to a condition for determining whether posture control for the driving stability of a vehicle is required. In this case, the controller 20 may calculate a slip rate of each wheel based on a wheel velocity of each wheel (as noted, the slip rate of each wheel may be calculated as a ratio of "a difference between a vehicle speed and each wheel velocity" and "a vehicle speed"), may determine a maximum slip rate having a maximum value among the calculated slip rates of the wheels, and may determine that the slip condition has been satisfied when the determined maximum slip rate is equal to or greater than a preset threshold value.

If it is determined that the slip condition has been satisfied, the controller 20 may perform posture control over the vehicle through the aforementioned driving torque control. In this case, the controller 20 may control the driving of each wheel based on target driving torque having a lower value compared to current driving torque of each wheel (the target driving torque may be determined as a value lower than a minimum value among values of current driving torque of the four wheels now applied for the driving of the wheels). That is, the controller 20 may perform control for reducing driving torque of the wheels in order to solve the slip state of a current wheel, and may control the driving of each wheel based on the same target driving torque. In this case, in order to solve the corresponding slip state, it is necessary to decrease the driving torque of each wheel to a lower value as a maximum slip rate is greater. Accordingly, the target driving torque may be determined to have a lower value as the maximum slip rate has a higher value. For example, the target driving torque and the maximum slip rate may be defined to have a negative linear relation in the controller 20.

After performing the driving torque control, the controller 20 may determine whether the slip state has been solved through driving torque control by re-determining whether the slip condition has been satisfied. If it is determined that the state in which the slip condition has been satisfied is maintained (i.e., if the slip state has not been solved), the controller 20 may perform posture control over the vehicle by subsequently performing steering control for controlling the steering of each wheel.

When performing the steering control, the controller 20 may perform the steering control in a way to displace the steering of two wheels on the opposite side of the transverse direction of a wheel having a maximum slip rate by a target steering angle. For example, if a wheel having a maximum slip rate corresponds to a right front wheel, the controller 20 may perform steering control in a way to displace the steering of a left front wheel and a left rear wheel by a target steering angle. In the above example, the steering control over the left front wheel and the left rear wheel is for solving the slip state of the right front wheel by deriving the braking effect of the vehicle, and a corresponding steering direction may be any one the left or the right. In this case, in order to solve the corresponding slip state, it is necessary to form greater steering angles of the two wheels on the opposite side of the transverse direction of the wheel as the maximum slip rate becomes greater. Accordingly, the target steering angle may be determined to have a higher value as the maximum slip rate has a higher value. For example, the target steering angle and the maximum slip rate may be defined to have a positive linear relation in the controller 20. In order to prevent a phenomenon in which a behavior of the vehicle becomes unstable due to sudden steering control over the two wheels on the opposite side of the transverse direction of the wheel, a control time until the steering angles of the two wheels on the opposite side of the transverse direction reach the target steering angle may be set as a sufficiently set time based on experimental results of a designer, and may be set in the controller 20.

Figure 56:
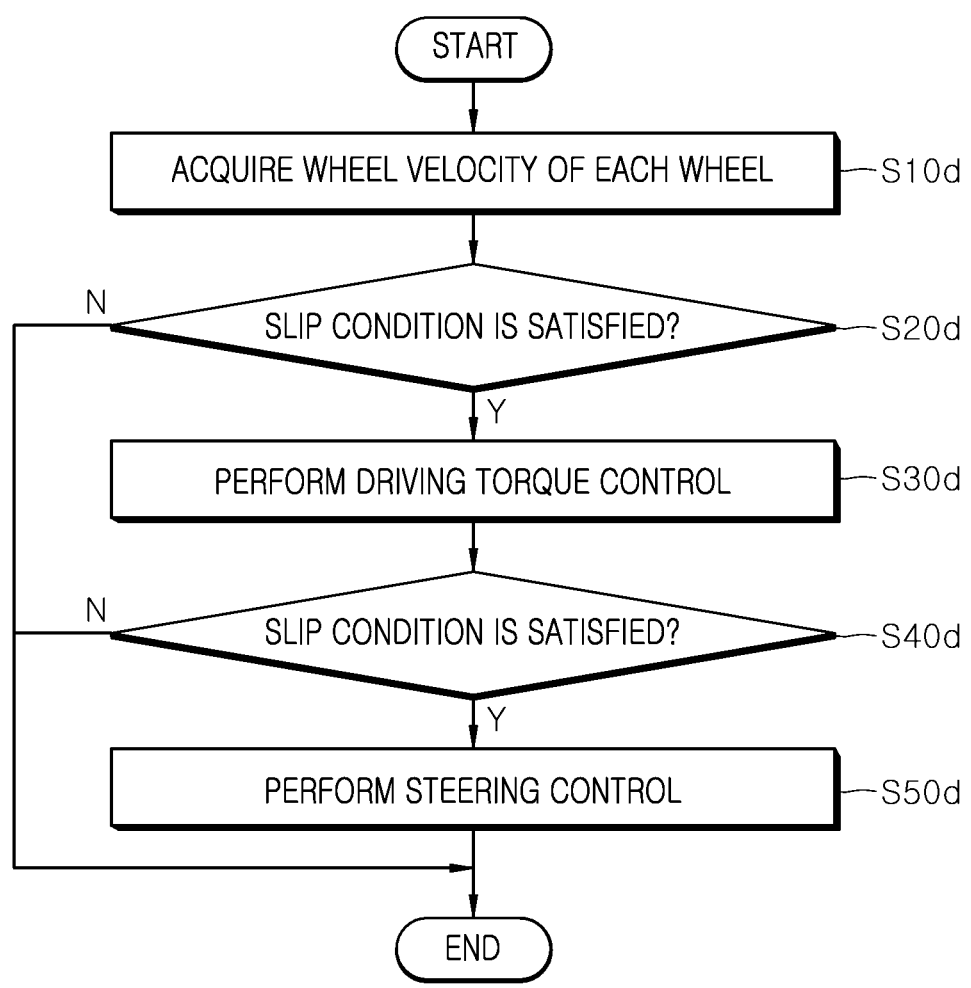
FIG. 56 is a flowchart for describing an operating method in a fourth application (a posture control mechanism for solving a slip) of a corner module apparatus for a vehicle according to an embodiment of the present disclosure.

FIG. 56 is a flowchart for describing an operating method in the fourth application of the corner module apparatus for a vehicle according to an embodiment of the present disclosure. The operating method of the corner module apparatus for a vehicle according to the present embodiment is described with reference to FIG. 56. A detailed description of a portion redundant with the aforementioned contents is omitted, and a time-series configuration thereof is chiefly described.

First, the controller 20 obtains a wheel velocity of each of four wheels of a vehicle through the wheel velocity acquisition part 14 (S10*d*).

Next, the controller 20 determines whether a predefined slip condition has been satisfied based on the wheel velocity of each wheel obtained in step S10*d* (S20*d*). In step S20*d*, the controller 20 calculates a slip rate of each wheel based on the wheel velocity of each wheel, determines a maximum slip rate having a maximum value among the calculated slip rates of the four wheels, and determines that the slip condition has been satisfied when the determined maximum slip rate is equal to or greater than the preset threshold value.

If it is determined that the slip condition has been satisfied in step S20*d*, the controller 20 performs posture control over the vehicle through driving torque control for controlling driving torque of each wheel (S30*d*). In step S30*d*, the controller 20 controls the driving of each wheel based on target driving torque having a lower value compared to current driving torque of each wheel. In this case, the target driving torque may be determined to have a lower value as the maximum slip rate has a higher value.

After step S30*d*, the controller 20 re-determines whether the slip condition has been satisfied (S40*d*).

If it is determined that the state in which the slip condition has been satisfied is maintained in step S40*d*, the controller 20 performs posture control over the vehicle through steering control for controlling the steering of each wheel (S50*d*). In step S50*d*, the controller 20 displaces the steering of two wheels on the opposite side of the transverse direction of a wheel having the maximum slip rate by a target steering angle. In this case, the target steering angle may be determined to have a higher value as the maximum slip rate has a higher value.

Steps S40*d* and S50*d* may be repeatedly performed within a predefined repetition number until it is determined that the slip condition has not been satisfied in step S40*d* (i.e., until the slip state is solved).

According to the fourth application, dependency on a conventional posture control system of a vehicle can be removed, and posture control over a vehicle is possible by using only a method of controlling the driving and steering of each wheel. Accordingly, there is an effect in that an available battery capacity can be increased by reducing battery consumption required for posture control over a vehicle.

5. Fifth Application: Target Trajectory Generation and Tracking Control Mechanism In the case of the four wheel-independent driving method, the steering of each wheel needs to be independently controlled because the four wheels are not mechanically connected. In particular, in order to secure the driving stability of a vehicle upon rotation driving, a quantitative control mechanism for steering control over each wheel needs to be provided. Accordingly, the fifth application proposes a method of independently controlling the steering of each of four wheels of a vehicle by differentially calculating a target steering angle of each wheel, if the vehicle to which the four wheel-independent driving method has been applied rotates and drives on a crossroad having a predetermined curvature (specifically, when the slip of each wheel does not occur, which corresponds to a case where the vehicle rotates at a low speed at a vehicle speed less than a set speed).

In the fifth application, the controller 20 may calculate information on a distance up to a target point, that is, a target of a movement of a vehicle, based on driving state information and driving environment information obtained by the vehicle information acquisition unit 15, may calculate, based on the calculated information on the distance, target curvature defined as curvature of a target trajectory up to the target point, may calculate a target steering angle of each of four wheels of a vehicle based on the calculated target curvature, and may independently control the steering of each of the four wheels based on the target steering angles. Hereinafter, a configuration of the present embodiment is described in detail for each operation of the controller 20.

First, in relation to a method of calculating the information on the distance up to the target point, the controller 20 may calculate the information on the distance up to the target point by using a vehicle speed of the vehicle, an offset distance of the vehicle from the middle (Ⓡ in FIG. 57) of a carriageway calculated from surrounding image information, and a curvature radius of the carriageway based on the middle of the carriageway (the offset distance and the curvature radius of the carriageway may be calculated by analyzing a lane and the carriageway included in the surrounding image information). The information on the distance may include a straight-line distance, a longitudinal distance, and a transverse distance from a current location (C in FIG. 57) of the vehicle to the target point (A in FIG. 57).

Specifically, the controller 20 may calculate the straight-line distance up to the target point in a way to apply the vehicle speed of the vehicle to a predefined distance calculation algorithm. In this case, the distance calculation algorithm may be predefined in the controller 20 as an algorithm for calculating a greater straight-line distance as a vehicle speed becomes higher. For example, the distance calculation algorithm may be defined in a linear expression form of L=A*$V_x$+B (L is the straight-line distance, $V_x$ is the vehicle speed, and A and B are constant values designed based on experimental results of a designer).

Figure 57:
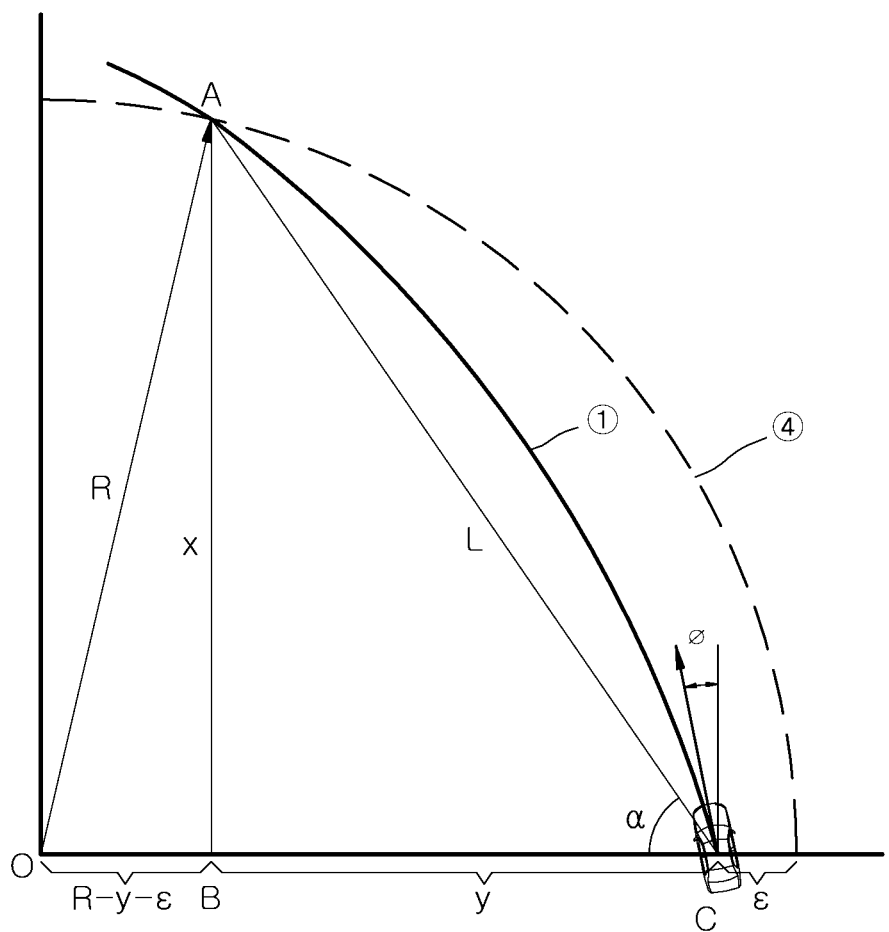
FIG. 57 is a diagram illustrating a process of calculating distance information and center target curvature in a fifth application (a target trajectory generation and tracking control mechanism) of a corner module apparatus for a vehicle according to an embodiment of the present disclosure.

When calculating the straight-line distance up to the target point, the controller 20 may calculate a longitudinal distance and transverse distance up to the target point by using the offset distance, a heading angle of the vehicle, the curvature radius of the carriageway, and the straight-line distance up to the target point. Referring to FIG. 57, Equation 1 below may be derived.

$$R^2 = (R - y - \varepsilon)^2 + x^2 \quad \text{[Equation 1]}$$

$$(x^2 = L^2 - y^2) \Rightarrow R^2 =$$

$$R^2 + y^2 + \varepsilon^2 - 2Ry + 2y\varepsilon - 2\varepsilon R + L^2 - y^2 \Rightarrow 2y(R - \varepsilon) =$$

$$\varepsilon^2 - 2\varepsilon R + L^2 \Rightarrow y = \frac{L^2 + \varepsilon^2 - 2\varepsilon R}{2(R - \varepsilon)} =$$

$$\frac{\rho_k(L^2 + \varepsilon^2) - 2\varepsilon}{2(1 - \rho_k \varepsilon)} \Rightarrow y = \frac{L^2 - \varepsilon^2 - 2\varepsilon(R - \varepsilon)}{2(R - \varepsilon)} = \frac{\rho_k(L^2 - \varepsilon^2)}{2(1 - \rho_k \varepsilon)} - \varepsilon$$

Equation 2 below is obtained by arranging Equation 1 with respect to x and y.

$$x = \sqrt{L^2 - y^2} \quad \text{[Equation 2]}$$

$$y = \frac{\rho_k(L^2 + \varepsilon^2) - 2\varepsilon}{2(1 - \rho_k \varepsilon)} = \frac{\rho_k(L^2 - \varepsilon^2)}{2(1 - \rho_k \varepsilon)} - \varepsilon$$

In Equations 1 and 2, L, x, and y are the straight-line distance, the longitudinal distance, and the transverse distance up to the target point, respectively. R is the curvature radius of the carriageway. $\rho_k$ is curvature (1/R) of the carriageway. $\varepsilon$ is the offset distance.

When calculating the information on the distance up to the target point as described above, the controller 20 may calculate target curvature defined as curvature of a target trajectory up to the target point, based on the calculated information on the distance. In the present embodiment, the target curvature may be divided into center target curvature defined as curvature of a target trajectory based on the center of the vehicle (i.e., a moving target trajectory of the center of the vehicle, ① in FIGS. 57 and 58), left target curvature defined as curvature of a target trajectory based on a left wheel of the vehicle (i.e., a moving target trajectory of the left wheel of the vehicle, ② in FIG. 58), and right target curvature defined as curvature of a target trajectory based on a right wheel of the vehicle (i.e., a moving target trajectory of the right wheel of the vehicle, ③ in FIG. 58). After preferentially calculating the center target curvature, the controller 20 may expand the center target curvature to the left target curvature and the right target curvature by using wheel track information of the vehicle.

Figure 58:
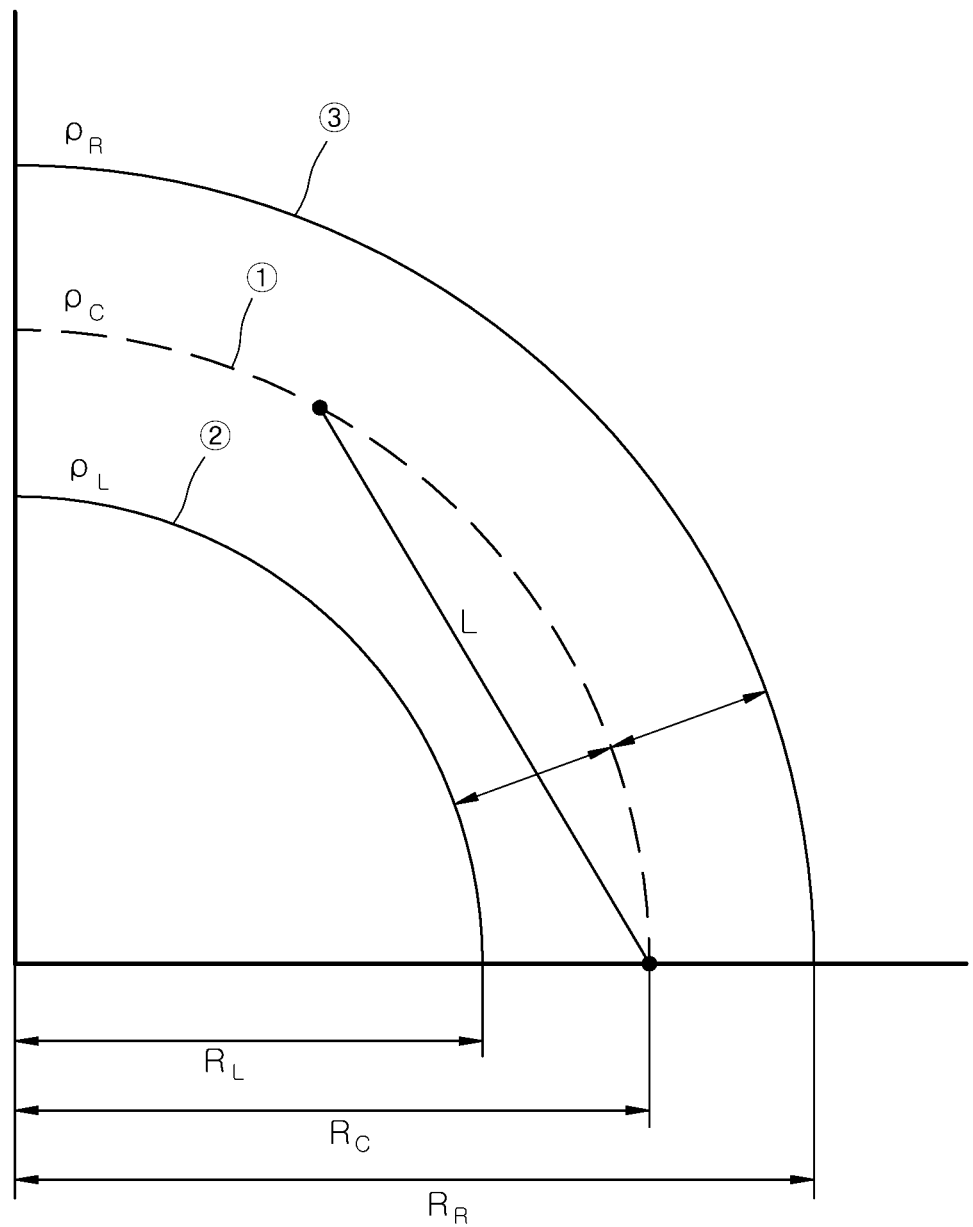
FIG. 58 is a diagram illustrating a process of calculating left target curvature and right target curvature in the fifth application (the target trajectory generation and tracking control mechanism) of a corner module apparatus for a vehicle according to an embodiment of the present disclosure.

Referring to FIGS. 57 and 58, the center target curvature may be calculated according to Equation 3 below.

$$R_c \cos(\phi + \alpha) = \frac{R_c}{L}(y\cos\phi - x\sin\phi) = \frac{L}{2} \quad \text{[Equation 3]}$$

-continued $$\rho_c = \frac{1}{R_c} = \frac{2}{L^2}(y\cos\phi - x\sin\phi)$$

In Equation 3, $R_c$ is the curvature radius of the moving target trajectory of the center of the vehicle, φ is the heading angle of the vehicle, a is an angle formed by the vehicle and the target point, L is the straight-line distance up to the target point, and $\rho_c$ is the center target curvature (1/$R_c$).

After calculating the center target curvature, the controller 20 may calculate the left target curvature and the right target curvature based on the center target curvature by using the wheel track information of the vehicle. Referring to FIG. 58 illustrating an example in which the vehicle rotates and drives to the left, the left target curvature and the right target curvature may be calculated according to Equations 4 and 5 below, respectively.

$$R_L = R_C - w_L \quad \text{[Equation 4]}$$

$$\rho_L = \frac{1}{R_L} = \frac{1}{R_C - w_L} = \frac{\rho_c}{1 - \rho_c w_L}$$

$$R_L = R_C + w_R \quad \text{[Equation 5]}$$

$$\rho_R = \frac{1}{R_R} = \frac{1}{R_C - w_R} = \frac{\rho_c}{1 - \rho_c w_R}$$

In Equation 4, $R_L$ is a curvature radius of a moving target trajectory of a left wheel of the vehicle, $R_C$ is a curvature radius of a moving target trajectory of the center of the vehicle, is a half value of a wheel track of the vehicle (w/2, w is the wheel track), and $\rho_L$ is the left target curvature. In Equation 5, $R_R$ is a curvature radius of a moving target trajectory of a right wheel of the vehicle, $R_C$ is the curvature radius of the moving target trajectory of the center of the vehicle, $w_R$ is a half value of a wheel track of the vehicle (w/2, w is the wheel track), and $\rho_R$ is the right target curvature.

FIG. 58 and Equations 4 and 5 describe the left rotation driving of the vehicle as an example. In the case of the right rotation driving of the vehicle, since a rotation-inner wheel and a rotation-outer wheel are reversed, the left target curvature and the right target curvature are calculated according to Equation 6 below.

$$\rho_L = \frac{\rho_c}{1 + \rho_c w_L} \quad \text{[Equation 6]}$$

$$\rho_R = \frac{\rho_c}{1 + \rho_c w_R}$$

When calculating the left target curvature and the right target curvature as described above, the controller 20 may calculate a target steering angle of each of the four wheels of the vehicle based on each calculated target curvature.

Specifically, target yaw rates of a left wheel and a right wheel may be represented like Equation 7 based on the calculated left target curvature and right target curvature.

$$YR_{des,L} = \beta_L v_x$$

$$YR_{des,R} = \beta_R v_x \quad \text{[Equation 7]}$$

In Equation 7, $YR_{des,L}$ is the target yaw rate of the left wheel, $\rho_L$ is the left target curvature, $YR_{des,R}$ is the target yaw rate of the right wheel, $\rho_R$ is the right target curvature, and $v_x$ is the vehicle speed.

Figure 59:
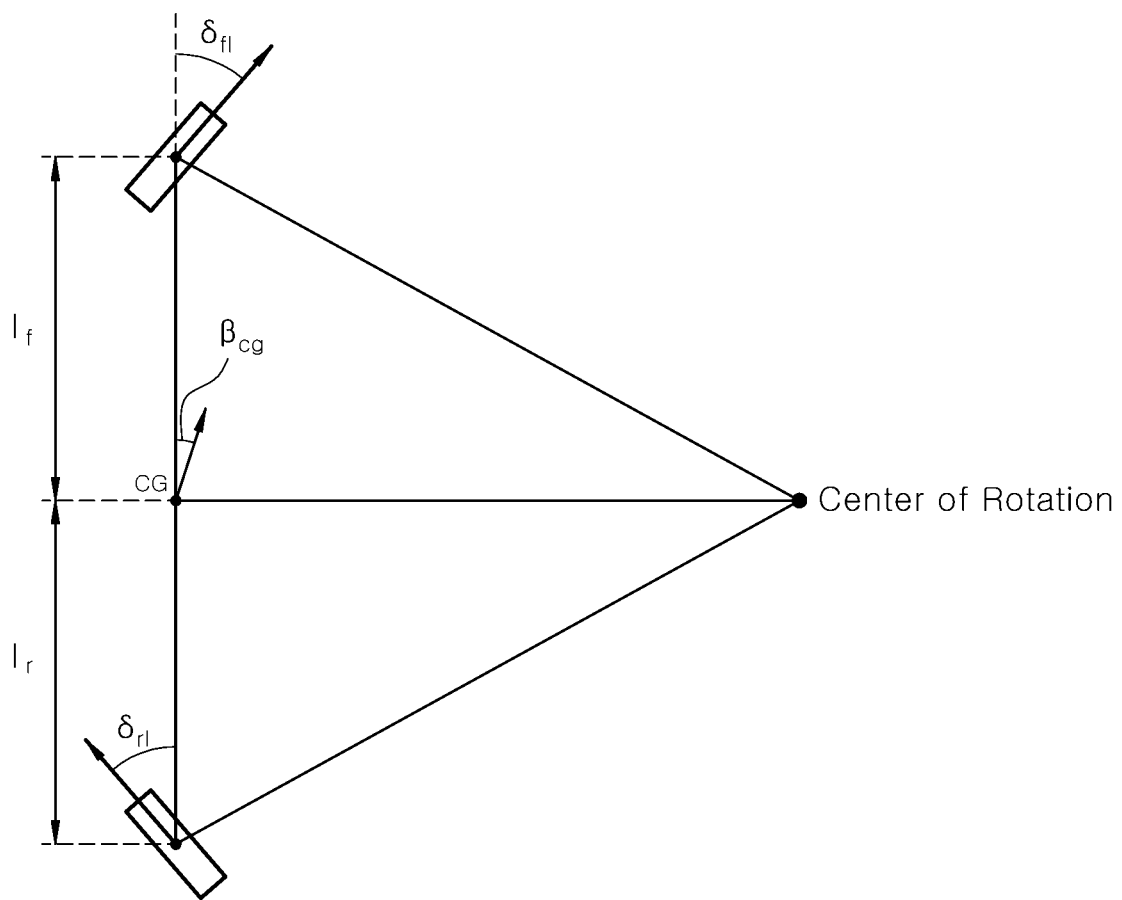
FIG. 59 is a diagram illustrating a process of calculating a target steering angle in the fifth application (the target trajectory generation and tracking control mechanism) of a corner module apparatus for a vehicle according to an embodiment of the present disclosure.

FIG. 59 illustrates an example of a vehicle kinetics model having a degree of 2 freedoms (only front and rear left wheels are illustrated in FIG. 59, for convenience sake). According to the vehicle kinetics model of FIG. 59, the slip angle of each wheel may be represented based on Equation 8 below.

$$\alpha_{fl} = \delta_{fl} - \frac{\beta_{cg}v_x + l_f YR_{des,L}}{v_x}$$
$$\alpha_{fr} = \delta_{fr} - \frac{\beta_{cg}v_x + l_f YR_{des,R}}{v_x}$$
$$\alpha_{rl} = \delta_{rl} - \frac{\beta_{cg}v_x - l_r YR_{des,L}}{v_x}$$
$$\alpha_{rr} = \delta_{rr} - \frac{\beta_{cg}v_x - l_f YR_{des,R}}{v_x}$$
[Equation 8]

In Equation 8, $\alpha_{fl}$, $\alpha_{fr}$, $\alpha_{rl}$, and $\alpha_{rr}$ are a slip angle of a left front wheel, a slip angle of a right front wheel, a slip angle of a left rear wheel, and a slip angle of a right rear wheel, respectively. $\beta_{cg}$ is a slip angle of the center of the vehicle. $v_x$ is the vehicle speed. $l_f$ is a distance between the axle of the front wheel of the vehicle and the center (cg) of the vehicle. $I_r$ is the axle of the rear wheel of the vehicle and the center (cg) of the vehicle. $YR_{des,L}$ and $YR_{des,R}$ are the target yaw rates of the left wheel and the right wheel. $\delta_{fl}$, $\delta_{fr}$, $\delta_{rl}$, and $\delta_{rr}$ are a target steering angle of the left front wheel, a target steering angle of the right front wheel, a target steering angle of the left rear wheel, and a target steering angle of the right rear wheel, respectively, which are subjects of calculation.

As described above, the present embodiment is a case where a vehicle rotates at a low speed and is subject to a case where the slip of each wheel does not occur. Accordingly, in Equation 8, $\alpha_{fl}$, $\alpha_{fr}$, $\alpha_{rl}$, $\alpha_{rr}$, and $\beta_{cg}$ may be approximated as a value of 0. Furthermore, the target steering angle of the left front wheel, the target steering angle of the right front wheel, the target steering angle of the left rear wheel, and the target steering angle of the right rear wheel may be calculated according to Equation 9 below.

$$\delta_{fl} = \frac{l_f YR_{des,L}}{v_x} = l_f \rho_L$$
$$\delta_{fr} = \frac{l_f YR_{des,R}}{v_x} = l_f \rho_R$$
$$\delta_{rl} = -\frac{l_r YR_{des,L}}{v_x} = -l_r \rho_L$$
$$\delta_{rr} = -\frac{l_r YR_{des,R}}{v_x} = -l_r \rho_R$$
[Equation 9]

The above case is a process of calculating the target steering angles the front wheel and the rear wheel in the reverse-phased state. The target steering angles of the front wheel and the rear wheel in the inphase state may be calculated through the following process.

First, the vehicle kinetics model in the inphase state may be represented according to Equation 10 below.

$$\frac{d}{dt}\begin{bmatrix}\beta\\\psi\end{bmatrix} = \begin{bmatrix}a_{11} & a_{12}\\a_{21} & a_{22}\end{bmatrix}\begin{bmatrix}\beta\\\psi\end{bmatrix} + \begin{bmatrix}b_{11} & b_{12}\\b_{21} & b_{22}\end{bmatrix}\begin{bmatrix}\delta_f\\\delta_r\end{bmatrix}$$
[Equation 10]

where

-continued $$a_{11} = -\frac{C_f + C_r}{mv_x}$$
$$a_{12} = -1 - \frac{C_f l_f - C_r l_r}{mv_x^2}$$
$$a_{21} = -\frac{C_f l_f - C_r l_r}{I}$$
$$a_{22} = -\frac{C_f l_f^2 - C_r l_r^2}{I}$$
$$b_{11} = \frac{C_f}{mv_x}$$
$$b_{12} = \frac{C_r}{mv_x}$$
$$b_{21} = \frac{C_f l_f}{I}$$
$$b_{22} = \frac{C_r l_r}{I}$$

In Equation 10, $\beta$ and $\psi$ are the slip angle and direction angle of the center of the vehicle. For each of factors that define a matrix parameter, reference is made to Table 2 below.

TABLE 2

| | |
|---|---|
| $V_x$ | Vehicle Speed |
| m | Vehicle Mass |
| I | Yaw moment of Inertia |
| lf | Distance from the axle of the front wheel to C.G |
| lr | Distance from the axle of the rear wheel to C.G |
| Cf | Front cornering coefficient |
| Cr | Rear cornering coefficient |

Since a case where the slip angle of the vehicle is 0 is presupposed, Equation 11 is derived because the left side and $\beta$ in Equation 10 become 0.

$$\begin{bmatrix}\beta\\\psi\end{bmatrix} = \begin{bmatrix}a_{11} & a_{12}\\a_{21} & a_{22}\end{bmatrix}^{-1}\begin{bmatrix}b_{11} & b_{12}\\b_{21} & b_{22}\end{bmatrix}\begin{bmatrix}\delta_f\\\delta_r\end{bmatrix} =$$

$$\begin{bmatrix}\frac{-a_{22}b_{11}+a_{12}b_{21}}{a_{11}a_{22}-a_{12}a_{21}} & \frac{-a_{22}b_{12}+a_{12}b_{21}}{a_{11}a_{22}-a_{12}a_{21}}\\\frac{a_{22}b_{11}+a_{11}b_{21}}{a_{11}a_{22}-a_{12}a_{21}} & \frac{-a_{21}b_{12}+a_{11}b_{22}}{a_{11}a_{22}-a_{12}a_{21}}\end{bmatrix}\begin{bmatrix}\delta_f\\\delta_r\end{bmatrix}$$
[Equation 11]

In the condition in which $\beta=0$, a relation between $\delta_f$ and $\delta_r$ is derived like Equation 12 below.

$$\delta_r = \frac{-l_r + [ml_f/C_v(l_f+l_r)]v_x^2}{l_f + [ml_r/C_f(l_f+l_r)]v_x^2}\delta_f$$
[Equation 12]

The target steering angle of the left front wheel and the target steering angle of the right front wheel are calculated according to Equation 9. The target steering angle of the left rear wheel and the target steering angle of the right rear wheel are calculated according to a relation with Equation 12. Accordingly, in the inphase state, the target steering angle of the left front wheel, the target steering angle of the right front wheel, the target steering angle of the left rear wheel, and the target steering angle of the right rear wheel may be calculated according to Equation 13 below.

$$\delta_{fl} = \frac{l_f YR_{des,L}}{v_x} = l_f \rho_L \quad \text{[Equation 13]}$$

$$\delta_{fr} = \frac{l_f YR_{des,R}}{v_x} = l_f \rho_R$$

$$\delta_{rl} = \frac{-l_r + [ml_f/C_r(l_f + l_r)]v_x^2}{l_f + [ml_r/C_f(l_f + l_r)]v_x^2} \cdot (l_f \rho_L)$$

$$\delta_{rr} = \frac{-l_r + [ml_f/C_r(l_f + l_r)]v_x^2}{l_f + [ml_r/C_f(l_f + l_r)]v_x^2} \cdot (l_f \rho_R)$$

As a result, based on the predefined vehicle kinetics model, the controller 20 may calculate the target steering angle of the left front wheel by using a distance between the axle of the front wheel and center of the vehicle and the left target curvature, may calculate the target steering angle of the right front wheel by using a distance between the axle of the front wheel and center of the vehicle and the right target curvature, may calculate the target steering angle of the left rear wheel by using a distance between the axle of the rear wheel and center of the vehicle and the left target curvature, and may calculate the target steering angle of the right rear wheel by using a distance between the axle of the rear wheel and center of the vehicle and the right target curvature.

Figure 60:
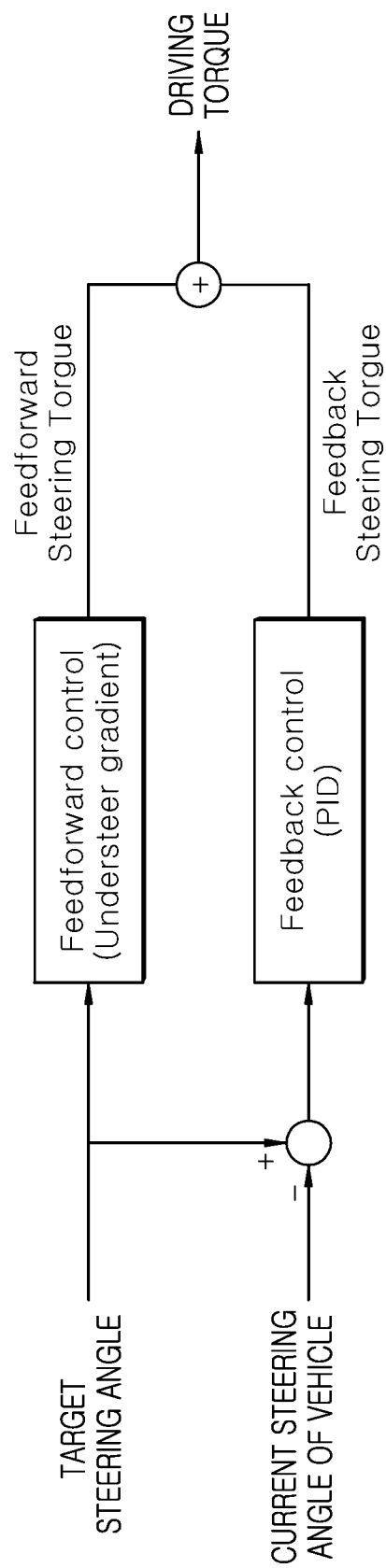
FIG. 60 is a block diagram illustrating a method of independently controlling the steering of each wheel in the fifth application (the target trajectory generation and tracking control mechanism) of a corner module apparatus for a vehicle according to an embodiment of the present disclosure.

When calculating the target steering angle of each wheel, the controller 20 may independently control the steering of each of the four wheels based on each of the calculated target steering angles. In this case, as illustrated in FIG. 60, the controller 20 may calculate driving torque for driving the four wheels through feedforward control (understeer gradient) and feedback control (PID control) for each of the target steering angles and a current steering angle of the vehicle, and may independently control the steering of each of the four wheels in a way to control the driving of the four wheels.

Figure 61:
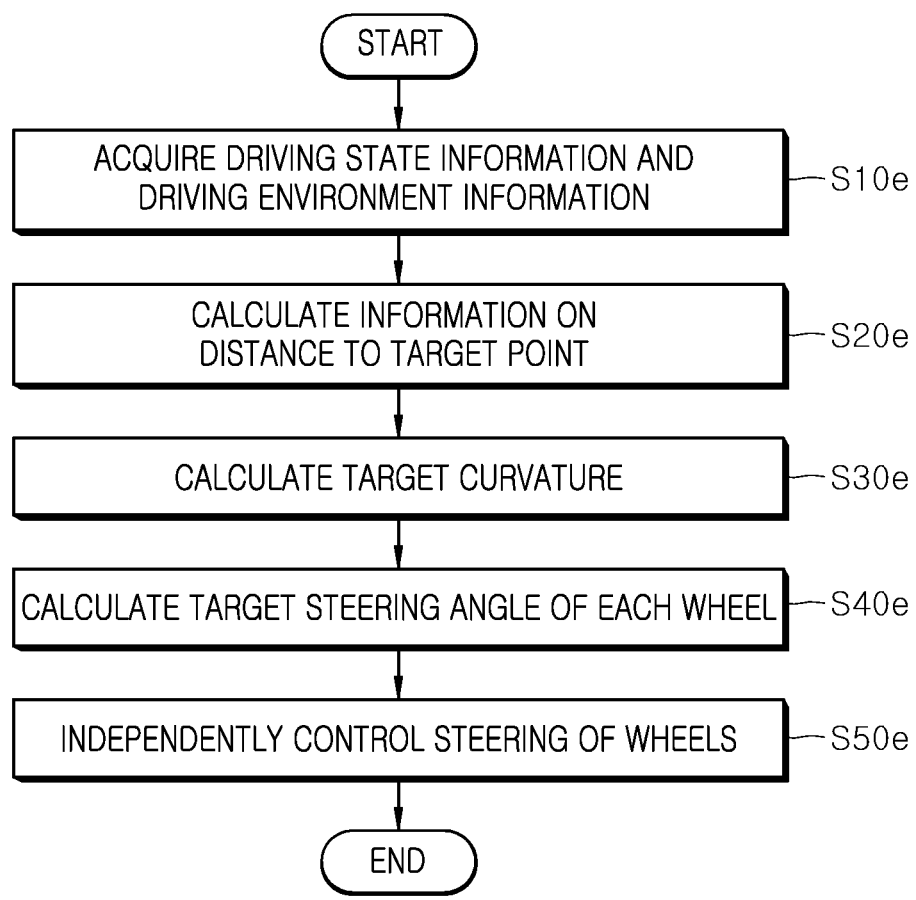
FIG. 61 is a flowchart for describing an operating method in the fifth application (the target trajectory generation and tracking control mechanism) of a corner module apparatus for a vehicle according to an embodiment of the present disclosure.

FIG. 61 is a flowchart for describing an operating method in the fifth application of the corner module apparatus for a vehicle according to an embodiment of the present disclosure. The operating method of the corner module apparatus for a vehicle according to the present embodiment is described with reference to FIG. 61. A detailed description of a portion redundant with the aforementioned contents is omitted, and a time-series configuration thereof is chiefly described.

First, the controller 20 obtains driving state information and driving environment information of a vehicle through the vehicle information acquisition unit 15 (S10e). The driving state information may include a vehicle speed and heading angle of the vehicle. The driving environment information may include surrounding image information (e.g., a front image) of the vehicle.

Next, the controller 20 calculates information on a distance up to a target point, that is, a target of a movement of the vehicle, based on the driving state information and driving environment information of the vehicle (S20e). In step S20e, the controller 20 calculates a straight-line distance, a longitudinal distance, and a transverse distance from the vehicle to the target point as the information on the distance up to the target point, by using the vehicle speed of the vehicle, an offset distance of the vehicle from the middle of a carriageway calculated based on the surrounding image information, and curvature radius of the carriageway based on the middle of the carriageway.

Next, the controller 20 calculates target curvature, defined as curvature of a target trajectory up to the target point, based on the information on the distance calculated in step S20e (S30e). The target curvature may be divided into center target curvature defined as curvature of a target trajectory based on the center of the vehicle, left target curvature defined as curvature of a target trajectory based on a left wheel of the vehicle, and right target curvature defined as curvature of a target trajectory based on a right wheel of the vehicle. Accordingly, in step S30e, after calculating the center target curvature by using the straight-line distance, the longitudinal distance, and the transverse distance from the vehicle to the target point, and the heading angle of the vehicle, the controller 20 calculates the left target curvature and the right target curvature based on the center target curvature by using wheel track information of the vehicle.

Next, the controller 20 calculates a target steering angle of each of the four wheels of the vehicle based on the target curvature calculated in step S30e (S40e). In step S40e, based on the predefined vehicle kinetics model, the controller 20 calculates a target steering angle of the left front wheel based on a distance between the axle of the front wheel and center of the vehicle and the left target curvature, calculates a target steering angle of the right front wheel based on a distance between the axle of the front wheel and center of the vehicle and the right target curvature, calculates a target steering angle of the left rear wheel based on a distance between the axle of the rear wheel and center of the vehicle and the left target curvature, and calculates a target steering angle of the right rear wheel based on a distance between the axle of the rear wheel and center of the vehicle and the right target curvature. In this case, the controller 20 calculates the target steering angle of each of the four wheels in a condition in which a slip angle of each wheel of the vehicle is 0.

Next, the controller 20 independently controls the steering of each of the four wheels based on each of the target steering angles calculated in step S40e (S50e). In step S50e, the controller 20 calculates driving torque for driving each of the four wheels through feedforward and feedback control over each of the target steering angles and the current steering angle of the vehicle, and independently controls the steering of each of the four wheels in a way to control the driving of the four wheels.

According to the fifth application, there is proposed a quantitative control mechanism for independently controlling the steering of each of the four wheels by differentially calculating a target steering angle of each wheel upon rotation driving of a vehicle to which the four wheel-independent driving method has been applied. Accordingly, rotation driving performance and rotation driving stability of the vehicle can be improved.

The term "part" used in this specification may include a unit implemented as hardware, software or firmware, and may be interchangeably used with a term, such as logic, a logical block, a unit, or a circuit. The "part" may be an integrated part, or a minimum unit of the part or a part thereof, which performs one or more functions. For example, according to an embodiment, the "part" may be implemented in the form of an application-specific integrated circuit (ASIC). Furthermore, an implementation described in this specification may be realized as a method or process, an apparatus, a software program, a data stream or a signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A corner module apparatus for a vehicle, comprising:
a driving unit configured to provide driving power to a wheel of the vehicle;
a braking unit, coupled with the driving unit, configured to apply or release braking power;
a steering unit configured to adjust a steering angle of the wheel;
an upper arm module, connected between the steering unit and the driving unit, adjustable to vary a camber angle of the wheel; and
a lower arm module, connected between the steering unit and the driving unit, configured to absorb road surface impact while the vehicle moves, wherein the lower arm module is spaced apart from the upper arm module and is configured to rotate in accordance with up and down movements of the wheel, independent of the upper arm module,
wherein the upper arm module comprises:
a first upper bracket, rotatably connected to the driving unit,
a second upper bracket, rotatably connected to the steering unit, spaced apart from the first upper bracket,
an upper link unit disposed between the first upper bracket and the second upper bracket and being configured to vary a distance between the first upper bracket and the second upper bracket, and
a first driving module, disposed between the first upper bracket and the second upper bracket, configured to vary the distance between the first upper bracket and the second upper bracket by adjusting an internal angle of the upper link unit,
wherein the upper link unit comprises:
a pair of first upper links having first ends rotatably connected to the first upper bracket, wherein the pair of first upper links have the same length and angles of the pair of first upper links that are inclined are identically set, and
a pair of second upper links having first ends rotatably connected to the second upper bracket and second ends rotably connected to second ends of the pair of first upper links, respectively, wherein the pair of second upper links have the same length and angles of the pair of second upper links that are inclined are identically set, and
wherein the first driving module comprises:
a first actuator configured to generate rotatory power from an external power source,
a first lead screw, disposed on the first actuator to move forward and backward, configured to widen or narrow a gap between the first upper bracket and the second upper bracket in a moving direction thereof, and
a first nut screw configured to convert a rotary motion of the first actuator into a rectilineal and reciprocating motion of the first lead screw.

2. The corner module apparatus of claim 1, wherein the upper arm module, connected to an upper side of the driving unit, has a variable length in a width direction of the vehicle and is configured to adjust an inclination of the wheel relative to ground.

3. The corner module apparatus of claim 1, wherein the pair of first upper links and the pair of second upper links are connected in a pantograph form.

4. The corner module apparatus of claim 1, wherein:
the first actuator is fixed to one of the first upper bracket or the second upper bracket, and
the first lead screw has an end fixed to another one of the first upper bracket or the second upper bracket.

5. The corner module apparatus of claim 1, wherein the first actuator is a hollow motor.

6. The corner module apparatus of claim 1, wherein an outer circumferential surface of the first lead screw is threaded into an inner circumferential surface of the first nut screw.

7. The corner module apparatus of claim 1, further comprising an arm control unit configured to control the upper arm module.

8. A corner module apparatus for a vehicle, comprising:
a driving unit configured to provide driving power to a wheel of the vehicle;
a braking unit, coupled with the driving unit, configured to apply or release braking power;
a steering unit configured to adjust a steering angle of the wheel;
an upper arm module, connected between the steering unit and the driving unit, adjustable to vary a camber angle of the wheel; and
a lower arm module, connected between the steering unit and the driving unit, adjustable to vary a wheel track of the wheel, wherein the lower arm module is spaced apart from the upper arm module and is configured to rotate, in accordance with up and down movements of the wheel, independent of the upper arm module,
wherein the lower arm module comprises:
a first lower bracket rotably connected to the driver unit,
a second lower bracket rotatably, connected to the steering unit, spaced apart from the first lower bracket,
a lower link unit, disposed between the first lower bracket and the second lower bracket, configured to have an adjustable internal angle, and
a second driving module, disposed between the first lower bracket and the second lower bracket, configured to vary the distance between the first lower bracket and the second lower bracket by adjusting an internal angle of the lower link unit,
wherein the lower link unit comprises:
   a pair of first lower links having first ends rotatably connected to the first lower bracket, wherein the pair of first upper links have the same length and angles of the pair of first upper links that re inlined are identically set, and
   a pair of second lower links having first ends rotatably connected to the second lower bracket and second ends rotatably connected to second ends of the pair of first lower links, respectively, wherein the pair of second upper links have the same length and angles of the pair of second upper links that are inclined are identically set, and
wherein the second driving module comprises:
   a second actuator configured to generate rotatory power from and external power source,
   a second lead screw, disposed on the second actuator to move forward and backward, configured to widen or narrow a gap between the first lower bracket and the second lower bracket in a moving direction thereof, and
   a second nut screw configured to convert the rotary motion of the second actuator into a rectilineal and reciprocating motion of the second lead screw.

9. The corner module apparatus of claim 8, wherein the lower arm module, connected to a lower side of the driving unit, has a variable length in a width direction of the vehicle and configured to adjust a contact location of the wheel relative to ground.

10. The corner module apparatus of claim 8, wherein the pair of first lower links and the pair of second lower links are connected in a pantograph form.

11. The corner module apparatus of claim 8, wherein:
   the second actuator is fixed to one of the first lower bracket or the second lower bracket, and
   the second lead screw has an end fixed to another one of the first lower bracket or the second lower bracket.

12. The corner module apparatus of claim 8, wherein an outer circumferential surface of the second lead screw is threaded into an inner circumferential surface of the second nut screw.

13. The corner module apparatus of claim 8, further comprising an arm control unit configured to control the upper arm module and the lower arm module.

14. The corner module apparatus of claim 13, wherein the arm control unit varies the lower arm module length when the wheel drives.

\* \* \* \* \*